United States Patent
Qing et al.

(10) Patent No.: US 11,414,017 B2
(45) Date of Patent: Aug. 16, 2022

(54) VEHICLE STEP APPARATUS AND VEHICLE

(71) Applicant: T-MAX (HANGZHOU) TECHNOLOGY CO., LTD., Hangzhou (CN)

(72) Inventors: Zhaobo Qing, Hangzhou (CN); Huizhong Yang, Hangzhou (CN); Xinfa Du, Hangzhou (CN); Qi Zhang, Hangzhou (CN); Songfeng Wang, Hangzhou (CN); Xing Fan, Hangzhou (CN); Yiming Wang, Hangzhou (CN); Yongyong Zhan, Hangzhou (CN); Tao He, Hangzhou (CN)

(73) Assignee: T-MAX (HANGZHOU) TECHNOLOGY CO., LTD., Hangzhou (CN)

( * ) Notice: Subject to any disclaimer, the term of this patent is extended or adjusted under 35 U.S.C. 154(b) by 162 days.

(21) Appl. No.: 16/810,637

(22) Filed: Mar. 5, 2020

(65) Prior Publication Data

US 2020/0282913 A1 Sep. 10, 2020

(30) Foreign Application Priority Data

Mar. 5, 2019 (CN) .......................... 201910164940.7
Mar. 5, 2019 (CN) .......................... 201910164946.4
(Continued)

(51) Int. Cl.
*B60R 3/02* (2006.01)

(52) U.S. Cl.
CPC ..................................... *B60R 3/02* (2013.01)

(58) Field of Classification Search
CPC ......................................................... B60R 3/02
See application file for complete search history.

(56) References Cited

U.S. PATENT DOCUMENTS

| 7,591 A | 8/1850 | Burdett |
| 634,385 A | 10/1899 | Wolfe et al. |
| (Continued) | | |

FOREIGN PATENT DOCUMENTS

| CA | 1021826 | 11/1977 |
| CA | 2082177 | 5/1994 |
| (Continued) | | |

OTHER PUBLICATIONS

International Search Report and Written Opinion of the International Searching Authority for PCT International Application No. PCT/CN2019/082919 dated Oct. 11, 2019.
(Continued)

*Primary Examiner* — Bryan A Evans
(74) *Attorney, Agent, or Firm* — Perkins Coie LLP

(57) ABSTRACT

Embodiments of the present disclosure disclose a vehicle step apparatus and a vehicle. The vehicle step apparatus includes a step, a retractable device, and a locking member. The step is movable between an extended position and a retracted position. The retractable device is connected to the step and configured to drive the step to move between the extended position and the retracted position. The locking member is configured to lock the step in the retracted position or to allow the step to move away from the retracted position towards the extended position.

23 Claims, 20 Drawing Sheets

(30) Foreign Application Priority Data

| Date | Country | Number |
|---|---|---|
| Mar. 5, 2019 | (CN) | 201910164949.8 |
| Mar. 5, 2019 | (CN) | 201910164950.0 |
| Mar. 5, 2019 | (CN) | 201910164953.4 |
| Mar. 5, 2019 | (CN) | 201910165436.9 |
| Mar. 5, 2019 | (CN) | 201910165448.1 |
| Mar. 5, 2019 | (CN) | 201910165449.6 |
| Mar. 5, 2019 | (CN) | 201910165450.9 |
| Mar. 5, 2019 | (CN) | 201910165451.3 |
| Mar. 5, 2019 | (CN) | 201920277492.7 |
| Mar. 5, 2019 | (CN) | 201920278322.0 |
| Mar. 5, 2019 | (CN) | 201920278332.4 |
| Mar. 5, 2019 | (CN) | 201920278413.4 |
| Mar. 5, 2019 | (CN) | 201920278416.8 |
| Mar. 5, 2019 | (CN) | 201920278420.4 |
| Mar. 5, 2019 | (CN) | 201920278524.5 |
| Mar. 5, 2019 | (CN) | 201920285654.1 |
| Mar. 5, 2019 | (CN) | 201920285655.6 |
| Mar. 5, 2019 | (CN) | 201920285701.2 |

(56) References Cited

U.S. PATENT DOCUMENTS

| | | |
|---|---|---|
| 724,155 A | 3/1903 | Besse |
| 752,031 A | 2/1904 | Chadwick |
| 817,224 A | 4/1906 | Clifford |
| 955,658 A | 4/1910 | Mitchell et al. |
| 1,063,643 A | 6/1913 | Blake et al. |
| 1,169,140 A | 1/1916 | Fassett et al. |
| 1,176,538 A | 3/1916 | Warner |
| 1,182,169 A | 5/1916 | Hansen |
| 1,222,127 A | 4/1917 | Perri |
| 1,239,892 A | 9/1917 | Dunderdale |
| 1,242,828 A | 10/1917 | Lyle |
| 1,250,604 A | 12/1917 | Lorenc |
| 1,268,335 A | 6/1918 | Fairchild |
| 1,364,697 A | 1/1921 | Branch |
| 1,437,648 A | 12/1922 | Gore |
| 1,449,031 A | 3/1923 | Blake |
| 1,471,972 A | 10/1923 | Miller |
| 1,621,479 A | 3/1927 | Cleveland et al. |
| 1,755,942 A | 4/1930 | Woolson |
| 1,800,162 A | 4/1931 | Stroud |
| 2,029,745 A | 2/1936 | Stiner |
| 2,041,640 A | 5/1936 | Goss |
| 2,118,557 A | 5/1938 | Hamilton |
| 2,122,040 A | 6/1938 | Machovec |
| 2,125,085 A | 7/1938 | Pool |
| 2,197,266 A | 4/1940 | Fredell |
| 2,209,576 A | 7/1940 | McDonald |
| 2,246,986 A | 6/1941 | Pellegrini |
| 2,436,961 A | 3/1948 | Gabriel |
| 2,487,921 A | 11/1949 | Culver |
| 2,492,068 A | 12/1949 | Schofield et al. |
| 2,566,401 A | 9/1951 | Bustin |
| 2,575,615 A | 11/1951 | Crump |
| 2,583,894 A | 1/1952 | Shuck |
| 2,645,504 A | 7/1953 | Branstrator et al. |
| 2,669,613 A | 2/1954 | Despard |
| 2,678,832 A | 5/1954 | Wright |
| 2,682,671 A | 7/1954 | Faure |
| 2,764,422 A | 9/1956 | McDonald |
| 2,774,494 A | 12/1956 | Malmström |
| 2,825,582 A | 3/1958 | McDonald |
| 2,921,643 A | 1/1960 | Vanderveld |
| 2,925,876 A | 2/1960 | Wagner |
| 2,998,265 A | 8/1961 | Kozicki |
| 3,008,533 A | 11/1961 | Haberle |
| 3,012,633 A | 12/1961 | Magee |
| 3,039,562 A | 6/1962 | Wagner |
| 3,095,216 A | 6/1963 | Browne et al. |
| 3,164,394 A | 1/1965 | Husko |
| 3,172,499 A | 3/1965 | Stairs |
| 3,266,594 A | 8/1966 | Antosh et al. |
| 3,329,443 A | 7/1967 | Lowder et al. |
| 3,392,990 A | 7/1968 | Wolf |
| 3,488,066 A | 1/1970 | Hansen |
| 3,494,634 A | 2/1970 | De Paula |
| 3,515,406 A | 6/1970 | Endsley |
| 3,517,942 A | 6/1970 | Cuffe et al. |
| 3,522,396 A | 7/1970 | Norden |
| 3,528,574 A | 9/1970 | Denner et al. |
| 3,572,754 A | 3/1971 | Fowler |
| 3,608,957 A | 9/1971 | Maneck |
| 3,650,423 A | 3/1972 | O'Brien |
| 3,671,058 A | 6/1972 | Kent |
| 3,745,595 A | 7/1973 | Nagy |
| 3,756,622 A | 9/1973 | Pyle et al. |
| 3,762,742 A | 10/1973 | Bucklen |
| 3,784,227 A | 1/1974 | Rogge |
| 3,799,288 A | 3/1974 | Manuel |
| 3,807,757 A | 4/1974 | Carpenter et al. |
| 3,833,240 A | 9/1974 | Weiler |
| 3,853,369 A | 12/1974 | Holden |
| 3,863,890 A | 2/1975 | Ruffing |
| 3,865,399 A | 2/1975 | Way |
| 3,869,022 A | 3/1975 | Wallk |
| 3,869,169 A | 3/1975 | Johnson et al. |
| 3,887,217 A | 6/1975 | Thomas |
| 3,889,997 A | 6/1975 | Schoneck |
| 3,891,261 A | 6/1975 | Finneman |
| 3,913,497 A | 10/1975 | Maroshick |
| 3,915,475 A | 10/1975 | Casella et al. |
| 3,957,284 A | 5/1976 | Wright |
| 3,961,809 A | 6/1976 | Clugston |
| 3,980,319 A | 9/1976 | Kirkpatrick |
| 3,981,515 A | 9/1976 | Rosborough |
| 3,986,724 A | 10/1976 | Rivinius |
| 3,997,211 A | 12/1976 | Graves |
| 4,020,920 A | 5/1977 | Abbott |
| 4,053,172 A | 10/1977 | McClure |
| 4,058,228 A | 11/1977 | Hall |
| 4,068,542 A | 1/1978 | Brand et al. |
| 4,073,502 A | 2/1978 | Frank et al. |
| 4,089,538 A | 5/1978 | Eastridge |
| 4,098,346 A | 7/1978 | Stanfill |
| 4,103,872 A | 8/1978 | Hirasuka |
| 4,106,790 A * | 8/1978 | Weiler ............... B60R 3/02 182/88 |
| 4,110,673 A | 8/1978 | Nagy et al. |
| 4,116,457 A | 9/1978 | Nerem et al. |
| 4,124,099 A | 11/1978 | Dudynskyj |
| 4,145,066 A | 3/1979 | Shearin |
| 4,164,292 A | 8/1979 | Karkau |
| 4,168,764 A | 9/1979 | Walters |
| 4,174,021 A | 11/1979 | Barlock |
| 4,180,143 A | 12/1979 | Clugston |
| 4,185,849 A | 1/1980 | Jaeger |
| 4,188,889 A | 2/1980 | Favrel |
| 4,194,754 A | 3/1980 | Hightower |
| 4,205,862 A | 6/1980 | Tarvin |
| 4,219,104 A | 8/1980 | MacLeod |
| 4,231,583 A | 11/1980 | Learn |
| 4,275,664 A | 6/1981 | Reddy |
| 4,325,668 A | 4/1982 | Julian et al. |
| 4,369,984 A | 1/1983 | Hagen |
| 4,424,751 A | 1/1984 | Blochlinger |
| 4,440,364 A | 4/1984 | Cone et al. |
| 4,462,486 A | 7/1984 | Dignan |
| 4,536,004 A | 8/1985 | Brynielsson et al. |
| 4,542,805 A | 9/1985 | Hamlin et al. |
| 4,570,962 A | 2/1986 | Chavira |
| 4,623,160 A | 11/1986 | Trudell |
| D287,001 S | 12/1986 | Jarvie et al. |
| 4,676,013 A | 6/1987 | Endo |
| 4,679,810 A | 7/1987 | Kimball |
| 4,696,349 A | 9/1987 | Harwood et al. |
| D292,904 S | 11/1987 | Bielby |
| 4,708,355 A | 11/1987 | Tiede |
| 4,711,613 A | 12/1987 | Fretwell |
| 4,720,116 A | 1/1988 | Williams et al. |
| 4,733,752 A | 3/1988 | Sklar |

(56) References Cited

U.S. PATENT DOCUMENTS

| | | |
|---|---|---|
| 4,757,876 A | 7/1988 | Peacock |
| 4,846,487 A | 7/1989 | Criley |
| 4,858,888 A | 8/1989 | Cruz et al. |
| 4,909,700 A | 3/1990 | Fontecchio et al. |
| 4,911,264 A | 3/1990 | McCafferty |
| 4,926,965 A | 5/1990 | Fox |
| 4,930,973 A | 6/1990 | Robinson |
| 4,958,979 A | 9/1990 | Svensson |
| 4,982,974 A | 1/1991 | Guidry |
| 4,991,890 A | 2/1991 | Paulson |
| D316,394 S | 4/1991 | Carr |
| 5,005,667 A | 4/1991 | Anderson |
| 5,005,850 A | 4/1991 | Baughman |
| 5,007,654 A | 4/1991 | Sauber |
| 5,028,063 A | 7/1991 | Andrews |
| 5,039,119 A | 8/1991 | Baughman |
| 5,085,450 A | 2/1992 | DeHart, Sr. |
| 5,137,294 A * | 8/1992 | Martin ................... B60R 3/02 280/166 |
| 5,154,125 A | 10/1992 | Renner et al. |
| 5,195,609 A | 3/1993 | Ham et al. |
| 5,199,731 A | 4/1993 | Martin |
| 5,228,707 A | 7/1993 | Yoder |
| 5,228,761 A | 7/1993 | Huebschen et al. |
| 5,238,300 A | 8/1993 | Slivon et al. |
| 5,253,973 A | 10/1993 | Fretwell |
| D340,905 S | 11/1993 | Orth et al. |
| 5,257,767 A | 11/1993 | McConnell |
| 5,257,847 A | 11/1993 | Yonehara |
| 5,261,779 A | 11/1993 | Goodrich |
| 5,280,934 A | 1/1994 | Monte |
| 5,284,349 A | 2/1994 | Bruns et al. |
| 5,286,049 A | 2/1994 | Khan |
| 5,342,073 A | 8/1994 | Poole |
| 5,358,268 A | 10/1994 | Hawkins |
| 5,375,864 A | 12/1994 | McDaniel |
| 5,423,463 A | 6/1995 | Weeks |
| 5,425,615 A | 6/1995 | Hall et al. |
| 5,439,342 A | 8/1995 | Hall et al. |
| 5,462,302 A | 10/1995 | Leitner |
| 5,478,124 A | 12/1995 | Warrington |
| 5,498,012 A | 3/1996 | McDaniel et al. |
| 5,501,475 A | 3/1996 | Bundy |
| 5,505,476 A | 4/1996 | Maccabee |
| 5,513,866 A | 5/1996 | Sisson |
| 5,538,100 A | 7/1996 | Hedley |
| 5,538,265 A | 7/1996 | Chen et al. |
| 5,538,269 A | 7/1996 | McDaniel et al. |
| 5,547,040 A | 8/1996 | Hanser et al. |
| 5,549,312 A | 8/1996 | Garvert |
| 5,584,493 A | 12/1996 | Demski et al. |
| 5,601,300 A | 2/1997 | Fink et al. |
| 5,624,127 A | 4/1997 | Arreola et al. |
| 5,697,623 A | 12/1997 | Bermes et al. |
| 5,697,626 A | 12/1997 | McDaniel |
| 5,727,840 A | 3/1998 | Ochiai et al. |
| 5,779,208 A | 7/1998 | McGraw |
| 5,842,709 A | 12/1998 | Maccabee |
| 5,876,051 A | 3/1999 | Sage |
| 5,897,125 A | 4/1999 | Bundy |
| 5,937,468 A | 8/1999 | Wiedeck et al. |
| 5,941,342 A | 8/1999 | Lee |
| 5,957,237 A | 9/1999 | Tigner |
| 5,980,449 A | 11/1999 | Benson et al. |
| 5,988,970 A | 11/1999 | Holtom |
| 6,012,545 A | 1/2000 | Faleide |
| 6,027,090 A | 2/2000 | Liu |
| 6,042,052 A | 3/2000 | Smith et al. |
| 6,055,780 A | 5/2000 | Yamazaki |
| 6,065,924 A | 5/2000 | Budd |
| 6,082,693 A | 7/2000 | Benson et al. |
| 6,082,751 A | 7/2000 | Hanes et al. |
| 6,112,152 A | 8/2000 | Tuttle |
| 6,135,472 A | 10/2000 | Wilson et al. |
| 6,149,172 A | 11/2000 | Pascoe et al. |
| 6,158,756 A | 12/2000 | Hansen |
| 6,168,176 B1 | 1/2001 | Mueller |
| 6,170,842 B1 | 1/2001 | Mueller |
| 6,179,312 B1 | 1/2001 | Paschke et al. |
| 6,179,546 B1 | 1/2001 | Citrowske |
| 6,203,040 B1 | 3/2001 | Hutchins |
| 6,213,486 B1 | 4/2001 | Kunz et al. |
| 6,224,317 B1 | 5/2001 | Kann |
| 6,264,222 B1 | 7/2001 | Johnston et al. |
| 6,270,099 B1 | 8/2001 | Farkash |
| 6,325,397 B1 | 12/2001 | Pascoe |
| 6,352,295 B1 | 3/2002 | Leitner |
| 6,357,992 B1 | 3/2002 | Ringdahl et al. |
| 6,375,207 B1 | 4/2002 | Dean et al. |
| 6,412,799 B1 | 7/2002 | Schrempf |
| 6,422,342 B1 | 7/2002 | Armstrong et al. |
| 6,425,572 B1 | 7/2002 | Lehr |
| 6,430,164 B1 | 8/2002 | Jones et al. |
| 6,435,534 B1 | 8/2002 | Stone |
| 6,439,342 B1 | 8/2002 | Boykin |
| 6,460,915 B1 | 10/2002 | Bedi et al. |
| 6,471,002 B1 | 10/2002 | Weinermen |
| 6,511,086 B2 | 1/2003 | Schlicht |
| 6,511,402 B2 | 1/2003 | Shu |
| 6,513,821 B1 | 2/2003 | Heil |
| 6,533,303 B1 | 3/2003 | Watson |
| 6,536,790 B1 | 3/2003 | Ojanen |
| 6,588,783 B2 | 7/2003 | Fichter |
| 6,612,596 B2 | 9/2003 | Jeon et al. |
| 6,641,158 B2 | 11/2003 | Leitner |
| 6,659,484 B2 | 12/2003 | Knodle et al. |
| 6,663,125 B1 | 12/2003 | Cheng |
| 6,746,033 B1 | 6/2004 | McDaniel |
| 6,769,704 B2 | 8/2004 | Cipolla |
| 6,810,995 B2 | 11/2004 | Warford |
| 6,812,466 B2 | 11/2004 | O'Connor et al. |
| 6,830,257 B2 | 12/2004 | Leitner |
| 6,834,875 B2 | 12/2004 | Leitner |
| 6,840,526 B2 | 1/2005 | Anderson et al. |
| 6,874,801 B2 | 4/2005 | Fichter |
| 6,880,843 B1 | 4/2005 | Greer, Jr. |
| 6,912,912 B2 | 7/2005 | Reichinger et al. |
| 6,918,624 B2 | 7/2005 | Miller et al. |
| 6,926,295 B2 | 8/2005 | Berkebile et al. |
| 6,938,909 B2 | 9/2005 | Leitner |
| 6,942,233 B2 | 9/2005 | Leitner et al. |
| 6,942,272 B2 | 9/2005 | Livingston |
| 6,948,903 B2 | 9/2005 | Ablabutyan et al. |
| 6,951,357 B2 | 10/2005 | Armstrong et al. |
| 6,955,370 B2 | 10/2005 | Fabiano et al. |
| 6,959,937 B2 | 11/2005 | Schneider et al. |
| 6,966,597 B2 | 11/2005 | Tegtmeier |
| 6,971,652 B2 | 12/2005 | Bobbert et al. |
| 6,997,469 B2 | 2/2006 | Lanoue et al. |
| 7,000,932 B2 | 2/2006 | Heil et al. |
| 7,007,961 B2 | 3/2006 | Leitner |
| 7,017,927 B2 | 3/2006 | Henderson et al. |
| 7,055,839 B2 | 6/2006 | Leitner |
| 7,090,276 B1 | 8/2006 | Bruford et al. |
| 7,111,859 B2 | 9/2006 | Kim et al. |
| 7,118,120 B2 | 10/2006 | Lee et al. |
| 7,163,221 B2 | 1/2007 | Leitner |
| 7,258,386 B2 | 8/2007 | Leitner |
| 7,287,771 B2 | 10/2007 | Lee et al. |
| 7,360,779 B2 | 4/2008 | Crandall |
| 7,367,574 B2 | 5/2008 | Leitner |
| 7,380,807 B2 | 6/2008 | Leitner |
| 7,398,985 B2 | 7/2008 | Leitner et al. |
| 7,413,204 B2 | 8/2008 | Leitner |
| 7,416,202 B2 | 8/2008 | Fichter |
| 7,487,986 B2 | 2/2009 | Leither et al. |
| 7,516,703 B2 | 4/2009 | Tazreiter |
| 7,566,064 B2 | 7/2009 | Leitner et al. |
| 7,584,975 B2 | 9/2009 | Leitner |
| 7,637,519 B2 | 12/2009 | Leitner et al. |
| 7,673,892 B2 | 3/2010 | Kuntze et al. |
| 7,717,444 B2 | 5/2010 | Fichter |
| 7,793,596 B2 | 9/2010 | Hirtenlehner |
| 7,823,896 B2 | 11/2010 | VanBelle |

(56) References Cited

U.S. PATENT DOCUMENTS

| | | |
|---|---|---|
| 7,874,565 B2 | 1/2011 | Duncan |
| D634,687 S | 3/2011 | Vukel |
| 7,900,944 B2 | 3/2011 | Watson |
| 7,909,344 B1 | 3/2011 | Bundy |
| 7,934,737 B2 | 5/2011 | Okada |
| 7,976,042 B2 | 7/2011 | Watson et al. |
| 8,038,164 B2 | 10/2011 | Stahl et al. |
| 8,042,821 B2 | 10/2011 | Yang |
| D649,100 S | 11/2011 | Cheng |
| 8,052,162 B2 | 11/2011 | Yang et al. |
| 8,056,913 B2 | 11/2011 | Kuntze et al. |
| 8,070,173 B2 | 12/2011 | Watson |
| 8,136,826 B2 | 3/2012 | Watson |
| 8,146,935 B1 | 4/2012 | Adams |
| 8,157,277 B2 | 4/2012 | Leitner et al. |
| 8,177,247 B1 | 5/2012 | Carr |
| 8,205,901 B2 | 6/2012 | Yang et al. |
| D665,713 S | 8/2012 | Pochurek et al. |
| 8,262,113 B1 | 9/2012 | Chafey et al. |
| 8,297,635 B2 | 10/2012 | Agoncillo et al. |
| D671,874 S | 12/2012 | Kekich et al. |
| 8,342,550 B2 | 1/2013 | Stickles et al. |
| 8,342,551 B2 | 1/2013 | Watson et al. |
| 8,360,455 B2 | 1/2013 | Leitner et al. |
| 8,408,571 B2 | 4/2013 | Leitner et al. |
| 8,419,034 B2 | 4/2013 | Leitner et al. |
| 8,469,380 B2 | 6/2013 | Yang et al. |
| 8,602,431 B1 | 12/2013 | May |
| 8,827,294 B1 | 9/2014 | Leitner et al. |
| 8,833,782 B2 | 9/2014 | Huotari et al. |
| 8,844,957 B2 | 9/2014 | Leitner et al. |
| D720,674 S | 1/2015 | Stanesic et al. |
| 8,936,266 B2 | 1/2015 | Leitner et al. |
| 8,944,451 B2 | 2/2015 | Leitner et al. |
| 9,156,406 B2 | 10/2015 | Stanesic et al. |
| 9,272,667 B2 | 3/2016 | Smith |
| 9,302,626 B2 | 4/2016 | Leitner et al. |
| 9,346,404 B1 | 5/2016 | Bundy |
| 9,346,405 B2 | 5/2016 | Leitner et al. |
| 9,511,717 B2 | 12/2016 | Smith |
| 9,522,634 B1 | 12/2016 | Smith |
| 9,527,449 B2 | 12/2016 | Smith |
| 9,550,458 B2 | 1/2017 | Smith et al. |
| 9,561,751 B2 | 2/2017 | Leitner et al. |
| 9,573,467 B2 | 2/2017 | Chen et al. |
| 9,656,609 B2 | 5/2017 | Du et al. |
| 9,669,766 B2 | 6/2017 | Du et al. |
| 9,669,767 B2 | 6/2017 | Du et al. |
| 9,688,205 B2 | 6/2017 | Du et al. |
| 9,701,249 B2 | 7/2017 | Leitner et al. |
| 9,764,691 B2 | 9/2017 | Stickles et al. |
| 9,809,172 B2 | 11/2017 | Stanesic et al. |
| 9,834,147 B2 | 12/2017 | Smith |
| 9,902,328 B1 | 2/2018 | Mazur |
| 9,944,231 B2 | 4/2018 | Leitner et al. |
| 10,053,017 B2 | 8/2018 | Leitner et al. |
| 10,065,486 B2 | 9/2018 | Smith et al. |
| 10,077,016 B2 | 9/2018 | Smith et al. |
| 10,081,302 B1 | 9/2018 | Frederick et al. |
| 10,106,069 B2 | 10/2018 | Rasekhi |
| 10,106,086 B1 | 10/2018 | Eckstein et al. |
| 10,106,087 B2 | 10/2018 | Stojkovic et al. |
| 10,106,088 B2 | 10/2018 | Smith |
| 10,118,557 B2 | 11/2018 | Pribisic |
| 10,124,735 B2 | 11/2018 | Du et al. |
| 10,124,839 B2 | 11/2018 | Povinelli et al. |
| 10,144,345 B2 | 12/2018 | Stinson et al. |
| 10,150,419 B2 | 12/2018 | Derbis et al. |
| 10,155,474 B2 | 12/2018 | Salter et al. |
| 10,173,595 B1 | 1/2019 | Ulrich |
| 10,183,623 B2 | 1/2019 | Kirshnan et al. |
| 10,183,624 B2 | 1/2019 | Leitner et al. |
| 10,189,517 B2 | 1/2019 | Povinelli et al. |
| 10,195,997 B2 | 2/2019 | Smith |
| 10,207,598 B2 | 2/2019 | Reynolds et al. |
| 10,214,963 B2 | 2/2019 | Simula et al. |
| 10,384,614 B1 | 8/2019 | Du et al. |
| 10,618,472 B2 | 4/2020 | Du |
| 10,649,483 B2 | 5/2020 | Liu et al. |
| 10,682,960 B2 | 6/2020 | Du |
| 10,821,904 B2 | 11/2020 | Du |
| 11,021,108 B2 | 6/2021 | Du |
| 2003/0011164 A1 | 1/2003 | Cipolla |
| 2003/0038446 A1 | 2/2003 | Anderson et al. |
| 2003/0090081 A1 | 5/2003 | Oakley |
| 2003/0094781 A1 | 5/2003 | Jaramillo et al. |
| 2003/0132595 A1 | 7/2003 | Fabiano |
| 2003/0200700 A1 | 10/2003 | Leitner |
| 2004/0100063 A1 | 5/2004 | Henderson et al. |
| 2004/0108678 A1 | 6/2004 | Berkebile et al. |
| 2004/0135339 A1 | 7/2004 | Kim |
| 2005/0035568 A1 | 2/2005 | Lee et al. |
| 2005/0146157 A1 | 7/2005 | Leitner |
| 2005/0231149 A1 | 10/2005 | Numauchi |
| 2005/0280242 A1 | 12/2005 | Fabiano et al. |
| 2006/0082096 A1 | 4/2006 | Sukonthapanich et al. |
| 2006/0214386 A1 | 9/2006 | Watson |
| 2006/0219484 A1 | 10/2006 | Ogura |
| 2006/0284440 A1 | 12/2006 | Leitner |
| 2008/0042396 A1 | 2/2008 | Watson |
| 2008/0100023 A1 | 5/2008 | Ross |
| 2008/0100025 A1 | 5/2008 | Leitner et al. |
| 2009/0250896 A1 | 10/2009 | Watson |
| 2009/0295114 A1 | 12/2009 | Yang et al. |
| 2010/0044993 A1 | 2/2010 | Watson |
| 2011/0115187 A1 | 5/2011 | Leitner et al. |
| 2012/0025485 A1 | 2/2012 | Yang et al. |
| 2012/0046846 A1 | 2/2012 | Dollens |
| 2013/0154230 A1 | 6/2013 | Ziaylek |
| 2015/0197199 A1 | 7/2015 | Kuo |
| 2015/0321612 A1 | 11/2015 | Leitner et al. |
| 2015/0321613 A1 | 11/2015 | Leitner et al. |
| 2016/0039346 A1 | 2/2016 | Yang et al. |
| 2016/0193964 A1 | 7/2016 | Stanesic et al. |
| 2017/0008459 A1 | 1/2017 | Leitner et al. |
| 2017/0036607 A1 | 2/2017 | Du et al. |
| 2017/0144606 A1 | 5/2017 | Smith |
| 2017/0190308 A1 | 6/2017 | Smith |
| 2017/0246993 A1 | 8/2017 | Smith |
| 2017/0267182 A1 | 9/2017 | Leitner |
| 2017/0355315 A1 | 12/2017 | Leitner |
| 2018/0118530 A1 | 5/2018 | August |
| 2018/0141497 A1 | 5/2018 | Smith |
| 2018/0201194 A1 | 7/2018 | Stanesic |
| 2018/0257572 A1 | 9/2018 | Du et al. |
| 2018/0281687 A1 | 10/2018 | Derbis et al. |
| 2018/0326911 A1 | 11/2018 | Leitner |
| 2019/0009725 A1 | 1/2019 | Stojkovic et al. |
| 2019/0047477 A1 | 2/2019 | Crandall |
| 2019/0054961 A1 | 2/2019 | Ngo |
| 2019/0071021 A1 | 3/2019 | Pribisic |
| 2019/0071042 A1 | 3/2019 | Smith |
| 2019/0084482 A1 | 3/2019 | Long et al. |
| 2019/0084628 A1 | 3/2019 | Povinelli et al. |
| 2019/0292026 A1 | 9/2019 | Felps |
| 2020/0023779 A1 | 1/2020 | Du et al. |
| 2020/0023780 A1 | 1/2020 | Du et al. |
| 2020/0047674 A1 | 2/2020 | Du et al. |
| 2020/0262354 A1 | 8/2020 | Du et al. |
| 2020/0265658 A1 | 8/2020 | Du et al. |
| 2020/0269763 A1 | 8/2020 | Du et al. |
| 2020/0277169 A1 | 9/2020 | Zhan |
| 2020/0282913 A1 | 9/2020 | Qing |
| 2020/0290424 A1 | 9/2020 | Zhan |
| 2020/0299116 A1 | 9/2020 | Fan |
| 2020/0282914 A1 | 10/2020 | Du et al. |
| 2020/0331396 A1 | 10/2020 | Du et al. |

FOREIGN PATENT DOCUMENTS

| | | |
|---|---|---|
| CA | 2218280 A1 | 6/1999 |
| CA | 2332193 A1 | 9/2001 |
| CA | 2370618 A1 | 11/2007 |
| CN | 2174368 Y | 8/1994 |

(56) References Cited

FOREIGN PATENT DOCUMENTS

| | | | |
|---|---|---|---|
| CN | 2806241 | Y | 8/2006 |
| CN | 1976833 | A | 6/2007 |
| CN | 101279594 | A | 10/2008 |
| CN | 102394918 | A | 3/2012 |
| CN | 202806579 | U | 3/2013 |
| CN | 103507719 | A | 1/2014 |
| CN | 203728468 | U | 7/2014 |
| CN | 104192070 | A | 12/2014 |
| CN | 2044474223 | U | 7/2015 |
| CN | 105083136 | A | 11/2015 |
| CN | 105083137 | A | 11/2015 |
| CN | 105128751 | A | 12/2015 |
| CN | 105450762 | A | 3/2016 |
| CN | 106249641 | A | 12/2016 |
| CN | 106499293 | A | 3/2017 |
| CN | 107601333 | A | 1/2018 |
| CN | 207361653 | U | 5/2018 |
| CN | 108263303 | A | 7/2018 |
| CN | 108454518 | A | 8/2018 |
| CN | 207758678 | U | 8/2018 |
| CN | 108583446 | A | 9/2018 |
| CN | 108632335 | A | 10/2018 |
| CN | 108791086 | A | 11/2018 |
| CN | 208037900 | U | 11/2018 |
| CN | 108973868 | A | 12/2018 |
| CN | 208232903 | U | 12/2018 |
| CN | 109253888 | A | 1/2019 |
| CN | 208325054 | U | 1/2019 |
| CN | 208344082 | U | 1/2019 |
| CN | 208532082 | U | 2/2019 |
| DE | 1042403 | B | 10/1958 |
| DE | 1220276 | B | 6/1966 |
| DE | 2555468 | A1 | 6/1977 |
| DE | 7922488 | U1 | 7/1982 |
| DE | 3151621 | A1 | 7/1983 |
| DE | 3932142 | | 4/1990 |
| DE | 8910933 | U1 | 10/1990 |
| EP | 0066493 | | 12/1982 |
| EP | 373842 | A1 | 6/1990 |
| EP | 0418615 | A1 | 3/1991 |
| EP | 0559624 | B1 | 8/1995 |
| EP | 0966367 | A1 | 9/1998 |
| EP | 0901783 | A2 | 3/1999 |
| EP | 1116840 | A2 | 7/2001 |
| EP | 1213185 | B1 | 12/2004 |
| EP | 3002157 | | 4/2016 |
| EP | 3176038 | B1 | 1/2019 |
| EP | 3237254 | B1 | 2/2019 |
| FR | 1271901 | A | 9/1961 |
| FR | 1350593 | A | 12/1963 |
| FR | 2225612 | A | 8/1974 |
| FR | 2651739 | A1 | 3/1991 |
| FR | 2764254 | A1 | 12/1998 |
| GB | 191315077 | | 8/1913 |
| GB | 254426 | | 7/1926 |
| GB | 340162 | A | 12/1930 |
| GB | 381672 | | 10/1932 |
| GB | 745918 | | 3/1956 |
| GB | 934387 | | 8/1963 |
| GB | 936846 | | 9/1963 |
| GB | 987846 | A | 3/1965 |
| GB | 1430813 | A | 4/1976 |
| GB | 1471256 | A | 4/1977 |
| GB | 2045699 | A | 11/1980 |
| GB | 2055705 | A | 3/1981 |
| GB | 2129378 | | 5/1984 |
| GB | 2201511 | A | 9/1988 |
| GB | 2288014 | A | 10/1995 |
| IN | 201741011829 | | 10/2018 |
| JP | 63-255144 | A | 10/1988 |
| JP | H04138944 | A | 5/1992 |
| JP | H04339040 | A | 11/1992 |
| JP | H04342629 | A | 11/1992 |
| JP | H05310061 | A | 11/1993 |
| JP | H05310081 | A | 11/1993 |
| JP | H08132967 | A | 5/1996 |
| JP | H10287182 | A | 10/1998 |
| JP | 2018-177089 | A | 11/2018 |
| JP | 2019-001222 | A | 1/2019 |
| KR | 2000-0003099 | | 1/2000 |
| KR | 101719102 | B1 | 3/2017 |
| MX | 2017001699 | A | 8/2018 |
| MX | 2017001700 | A | 8/2018 |
| MX | 2017006328 | A | 8/2018 |
| MX | 2017008032 | A | 9/2018 |
| MX | 2017010183 | A | 9/2018 |
| SU | 403594 | | 11/1973 |
| SU | 783097 | A1 | 11/1980 |
| WO | 1988/05759 | A1 | 8/1988 |
| WO | 1995/00359 | A1 | 1/1995 |
| WO | 1997/027139 | A1 | 7/1997 |
| WO | 1998/43856 | A2 | 10/1998 |
| WO | 2000/047449 | A1 | 8/2000 |
| WO | 2001/000441 | A1 | 1/2001 |
| WO | 2003/039910 | A1 | 5/2003 |
| WO | 2003/039920 | A1 | 5/2003 |
| WO | 2003/066380 | A1 | 8/2003 |
| WO | 2003/069294 | A1 | 8/2003 |
| WO | 2006/050297 | A2 | 5/2006 |
| WO | 2009/103163 | A1 | 8/2009 |
| WO | 2017/176226 | A1 | 10/2017 |
| WO | 2018/148643 | A1 | 8/2018 |
| WO | 2018/197393 | A1 | 11/2018 |
| WO | 2019/009131 | A1 | 1/2019 |
| WO | 2019/034493 | A1 | 2/2019 |

OTHER PUBLICATIONS

International Search Report and Written Opinion of the International Searching Authority for PCT International Application No. PCT/CN2015/097930 dated May 10, 2016.
U.S. Office Action dated Nov. 18, 2019 for U.S. Appl. No. 16/510,775, filed Jul. 12, 2019. (9 pages).
U.S. Office Action dated Dec. 20, 2019 for U.S. Appl. No. 16/655,149, filed Oct. 16, 2019. (11 pages).
International Search Report of the International Searching Authority for PCT International Application No. PCT/CN2019/077842 dated Oct. 12, 2019. (English Translation, p. 1-20).
International Search Report and Written Opinion of the International Searching Authority for PCT International Application No. PCT/CN2019/075535 dated Nov. 11, 2019. (English translation, p. 1-21).
U.S. Office Action dated Jun. 9, 2020 for U.S. Appl. No. 16/826,094, filed Mar. 20, 2020 (10 pages).
U.S. Office Action dated Jun. 9, 2020 for U.S. Appl. No. 15/931,474, filed May 13, 2020 (12 pages).
U.S. Notice of Allowance for U.S. Appl. No. 16/510,775 dated Feb. 3, 2020.
U.S. Notice of Allowance for U.S. Appl. No. 16/655,149 dated Feb. 20, 2020.
U.S. Notice of Allowance for U.S. Appl. No. 16/826,083 dated Oct. 9, 2020.
Australian Application No. 2019250149 Office Action dated Oct. 6, 2020, pp. 1-4).
Final Office Action dated Oct. 27, 2020 for U.S. Appl. No. 15/931,474, filed Oct. 27, 2020 (13 pages).
Final Office Action dated Feb. 16, 2021 for U.S. Appl. No. 16/826,094, filed Mar. 20, 2020 (15 pages).
Non-Final Office Action dated Jun. 10, 2021 for U.S. Appl. No. 16/517,527, filed Jul. 19, 2019 (6 pages).
U.S. Appl. No. 16/742,632 Notice of Allowance dated Jun. 29, 2021, pp. 1-7.
Chinese Application No. 201910125764.6 Office Action dated May 6, 2021, pp. 1-13.
U.S. Appl. No. 16/810,637 Office Action dated Oct. 14, 2021, pp. 1-9.
U.S. Appl. No. 16/517,527 Notice of Allowance dated Sep. 17, 2021, pp. 1-7.

(56) References Cited

OTHER PUBLICATIONS

U.S. Appl. No. 15/931,474, Notice of Allowance dated Nov. 17, 2021, pp. 1-5.

* cited by examiner

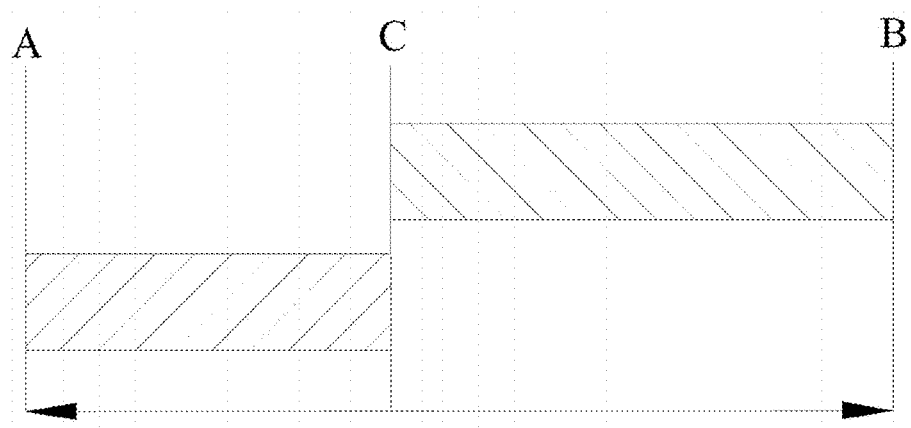
FIG. 30
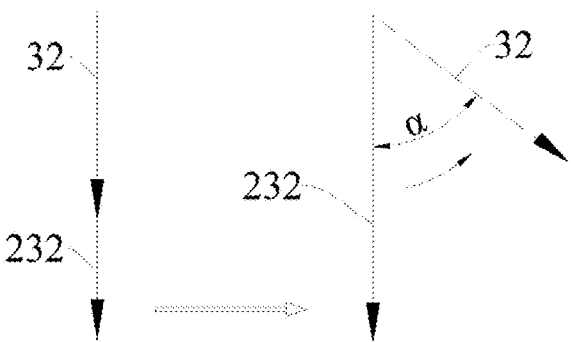 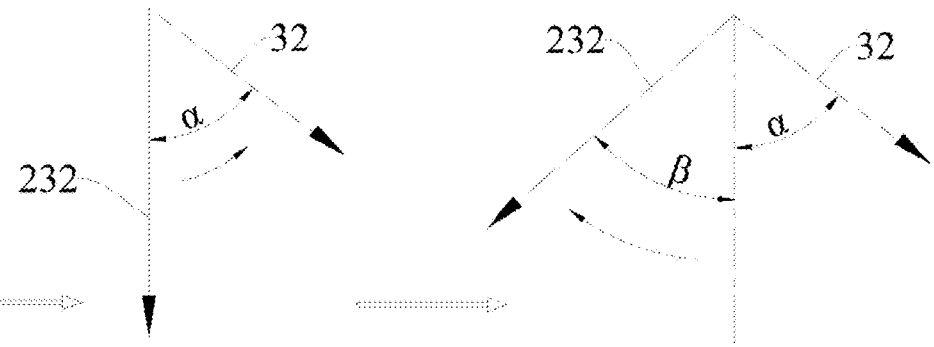
FIG. 30(A)  FIG. 30(B)  FIG. 30(C)
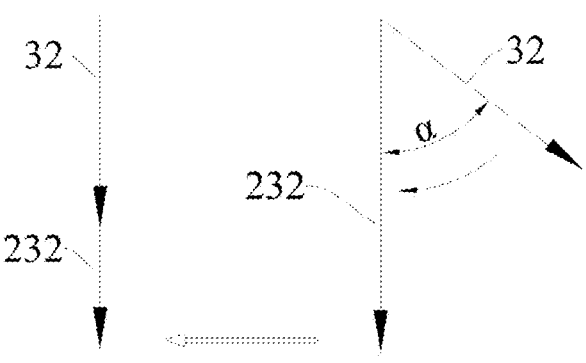 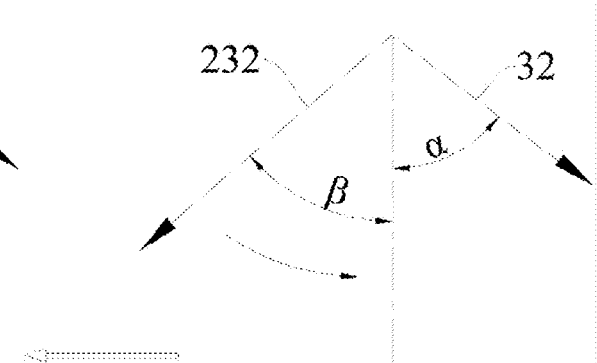
FIG. 30(F)  FIG. 30(E)  FIG. 30(D)

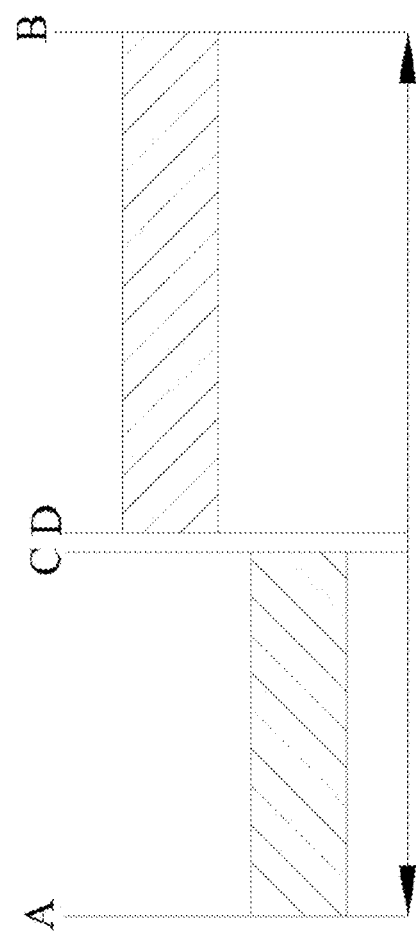
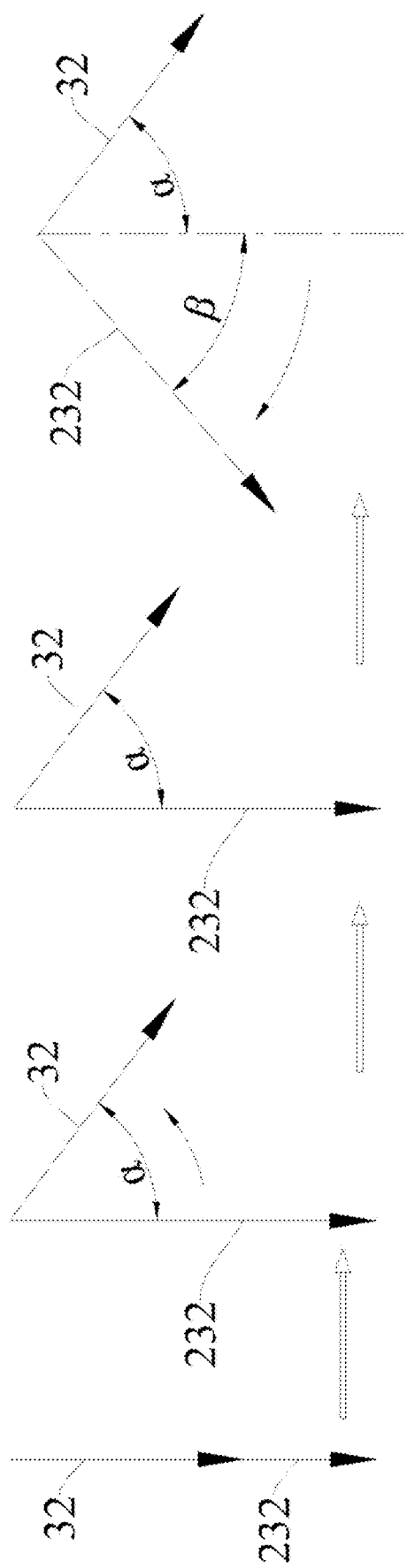
FIG. 31
FIG. 31(A) FIG. 31(B) FIG. 31(C) FIG. 31(D)

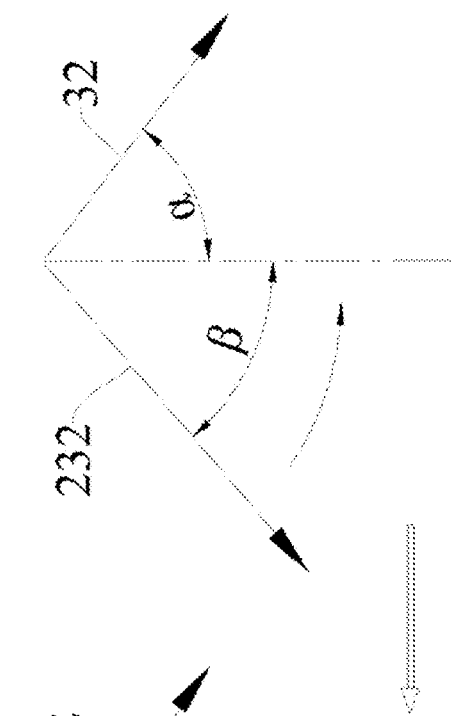
*FIG. 31(E)*
*FIG. 31(F)*
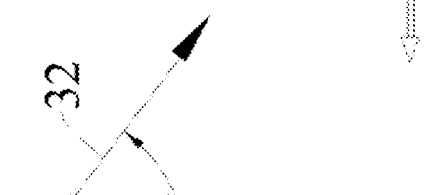
*FIG. 31(G)*
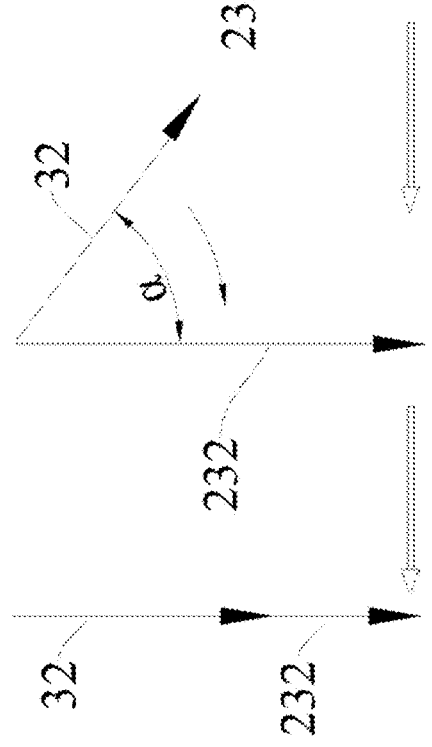
*FIG. 31(H)*

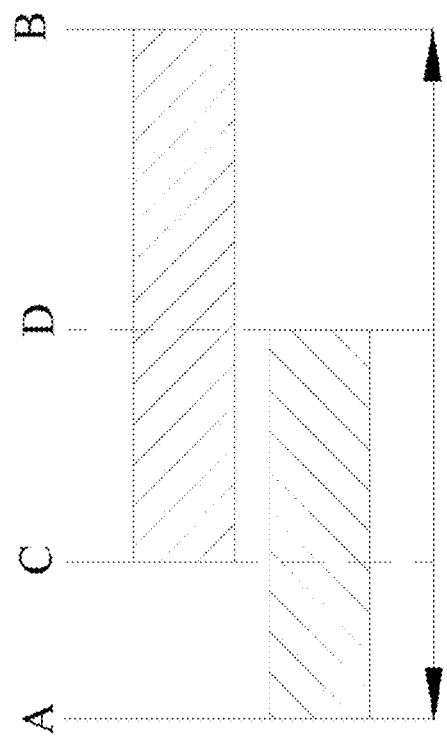
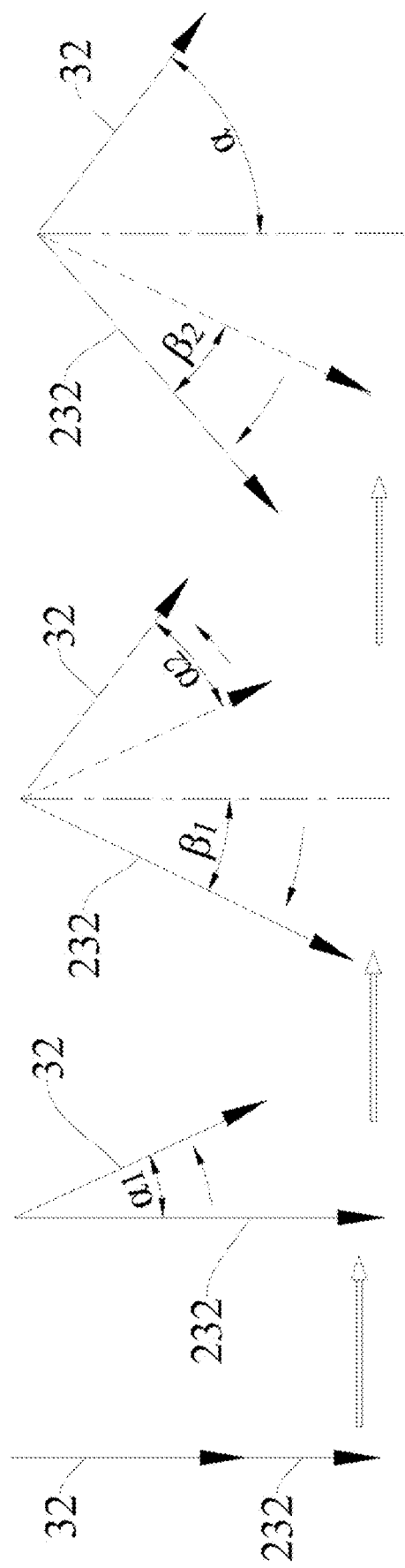
FIG. 33
FIG. 33(A)  FIG. 33(B)  FIG. 33(C)  FIG. 33(D)

VEHICLE STEP APPARATUS AND VEHICLE

CROSS-REFERENCE TO RELATED APPLICATIONS

This application claims priority to and benefits of Chinese Patent Applications Nos. 201920285654.1, 201910164946.4, 201910164953.4, 201920278420.4, 201910164950.0, 201910165448.1, 201910165449.6, 201910165436.9, 201920285655.6, 201910165450.9, 201910165451.3, 201920278416.8, 201920278413.4, 201910164949.8, 201920278524.5, 201920278322.0, 201920278332.4, 201920285701.2, 201920277492.7, and 201910164940.7, each filed with National Intellectual Property Administration of People's Republic of China (PRC) on Mar. 5, 2019, the entire contents of which are incorporated herein by reference.

TECHNICAL FIELD

The present disclosure relates to the field of vehicles, and more particularly to a vehicle step apparatus and a vehicle having the same.

BACKGROUND

A vehicle step is usually installed to a chassis below a vehicle door for people to get on and off the vehicle. The vehicle step is driven by a retractable mechanism to move between an extended position and a retracted position, and the retractable mechanism is connected with the chassis of the vehicle. In the related art, the vehicle step in the retracted position is supported by the retractable mechanism and has poor stability, and the retractable mechanism tends to be damaged when the step is subjected to an external force.

SUMMARY

The present disclosure aims to solve technical problems in the related art at least to some extent.

To this end, embodiments of the present disclosure provide a vehicle step apparatus whose step is locked and supported by a locking member when in a retracted position, thereby enhancing stability of the step, and reducing damage to a retractable device when the step is impacted by an external force.

Embodiments of the present disclosure also provide a vehicle having the above vehicle step apparatus.

The vehicle step apparatus according to embodiments of a first aspect of the present disclosure includes: a step movable between an extended position and a retracted position; a retractable device connected to the step and configured to drive the step to move between the extended position and the retracted position; and a locking member configured to lock the step in the retracted position or to allow the step to move away from the retracted position towards the extended position.

In the vehicle step apparatus according to embodiments of the present disclosure, the step in the retracted position is locked in the retracted position by the locking member, thereby enhancing the stability of the step, and damage to the retractable device can be reduced when the step is impacted by an external force.

The vehicle according to embodiments of a second aspect of the present disclosure includes: a vehicle body; and a vehicle step apparatus. The vehicle step apparatus includes: a step movable between an extended position and a retracted position; a retractable device connected to the step and configured to drive the step to move between the extended position and the retracted position; and a locking member configured to lock the step in the retracted position or to allow the step to move away from the retracted position towards the extended position.

BRIEF DESCRIPTION OF THE DRAWINGS

FIG. 30 is a schematic view showing a relationship of a driving gear of a transmission device driving a first driven gear and a second driven gear to rotate according to an embodiment of the present disclosure.

FIGS. 30(A) to 30(C) are schematic views illustrating that a single drive motor drives an arm assembly to move a step from a retracted position to an extended position and drives a locking swing arm to swing from a locking position to a maximum release position by means of the transmission device shown in FIG. 30.

FIGS. 30(D) to 30(F) are schematic views illustrating that the single drive motor drives the arm assembly to move the step from the extended position to the retracted position and drives the locking swing arm to swing from the maximum release position to the locking position by means of the transmission device shown in FIG. 30.

FIG. 31 is a schematic view showing a relationship of a driving gear of a transmission device driving a first driven gear and a second driven gear to rotate according to another embodiment of the present disclosure.

FIGS. 31(A) to 31(D) are schematic views illustrating that a single drive motor drives an arm assembly to move a step from a retracted position to an extended position and drives a locking swing arm to swing from a locking position to a maximum release position by means of the transmission device shown in FIG. 31.

FIGS. 31(E) to 31(H) are schematic views illustrating that the single drive motor drives the arm assembly to move the step from the extended position to the retracted position and drives the locking swing arm to swing from the maximum release position to the locking position by means of the transmission device shown in FIG. 31.

FIG. 33 is a schematic view showing a relationship of a driving gear of a transmission device driving a first driven gear and a second driven gear to rotate according to yet another embodiment of the present disclosure.

FIGS. 33(A) to 33(D) are schematic views illustrating that a single drive motor drives an arm assembly to move a step from a retracted position to an extended position and drives a locking swing arm to swing from a locking position to a maximum release position by means of the transmission device shown in FIG. 33.

DETAILED DESCRIPTION

Figure 1:
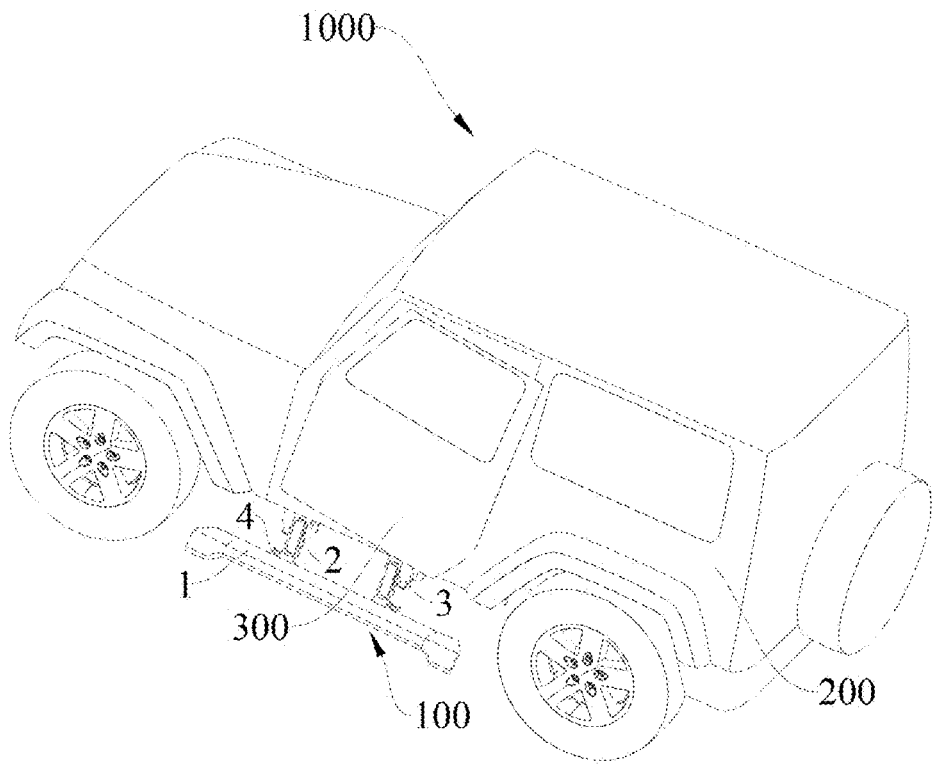
FIG. 1 is a perspective view of a vehicle according to embodiments of the present disclosure, in which a step is in an extended position.

Embodiments of the present disclosure will be described in detail and examples of the embodiments will be illustrated in the drawings. The embodiments described below with reference to the drawings are illustrative and used to generally understand the present disclosure. The embodiments shall not be construed to limit the present disclosure. In the specification, it is to be understood that terms such as "central," "longitudinal," "transverse," "length," "width," "thickness," "upper," "lower," "front," "rear," "left," "right," "vertical," "horizontal," "top," "bottom," "inner," "outer," "clockwise," "counterclockwise," "axial," "radial," and "circumferential" should be construed to refer to the orientation or position relationship as then described or as shown in the drawings under discussion. These relative terms are only for convenience of description and do not indicate or imply that in the present disclosure they have a particular orientation, or are constructed and operated in a particular orientation. Thus, these terms shall not be construed to limit the present disclosure.

A vehicle step apparatus and a vehicle according to embodiments of the present disclosure will be described with reference to the drawings.

Figure 2:
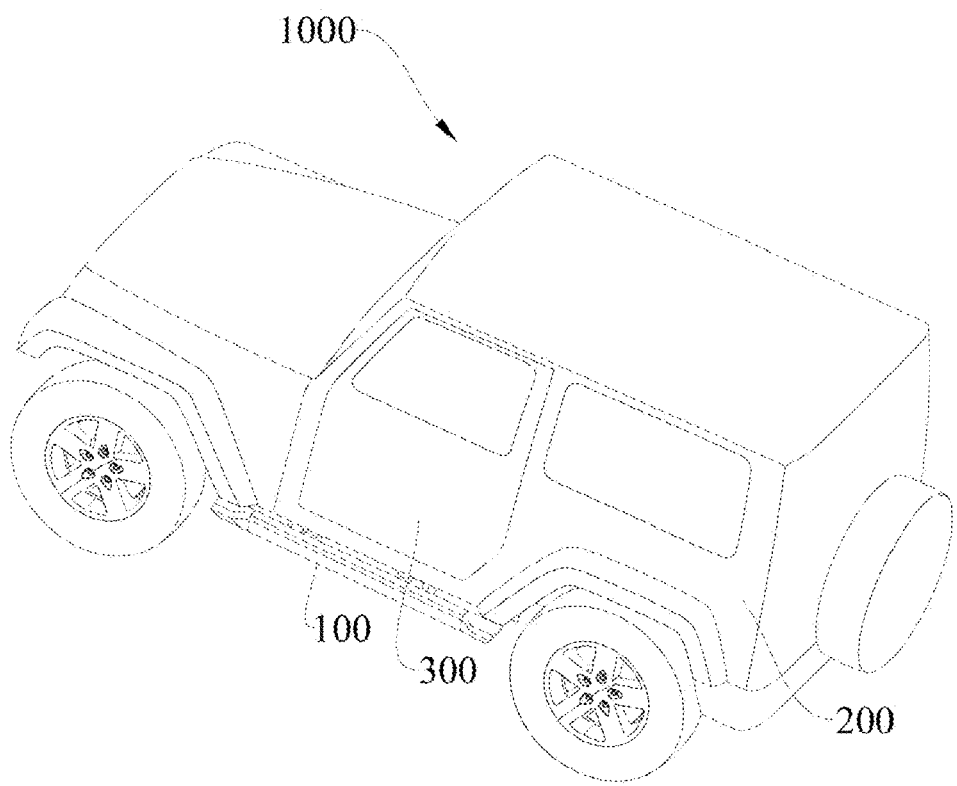
FIG. 2 is a perspective view of the vehicle shown in FIG. 1, in which the step is in a retracted position.
Figure 3:
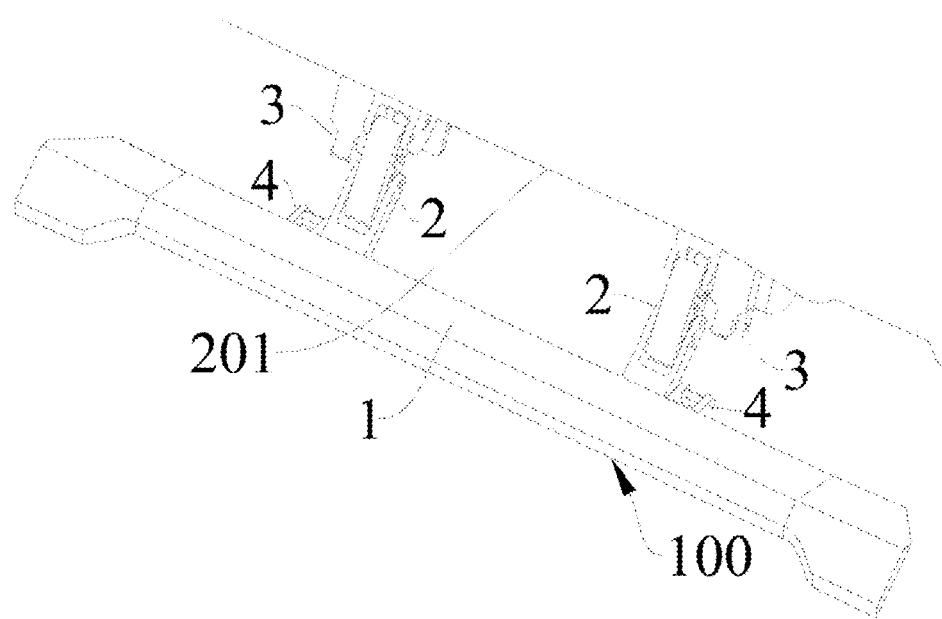
FIG. 3 is a perspective view of a vehicle step apparatus according to an embodiment of the present disclosure, in which one step is supported by two retractable devices.

As illustrated in FIGS. 1-3, a vehicle 1000 according to an embodiment of the present disclosure includes a vehicle body 200 and a vehicle step apparatus 100 mounted to a bottom surface 201 of the vehicle body 200. In other words, the vehicle step apparatus 100 is mounted to a chassis of the vehicle body 200.

As illustrated in FIGS. 1 and 2, the vehicle 1000 includes a vehicle door 300, and the vehicle step apparatus 100 is disposed adjacent to the vehicle door 300 and located below the vehicle door 300. In an example shown in FIGS. 1 and 2, the vehicle 1000 has two vehicle doors 300, and the vehicle doors 300 are lateral doors. The present disclosure is not limited thereto, and for instance, the vehicle 1000 may have four vehicle doors (lateral doors) 300, and the vehicle body 200 is provided with two lateral doors 300 on each side and is provided with one vehicle step apparatus 100 on each side. Optionally, the vehicle 1000 may further have a tail door (not shown), and one vehicle step apparatus 100 adjacent to the tail door is provided at the tail of the vehicle body 200.

The vehicle step apparatus according to embodiments of the present disclosure will be described with reference to the drawings.

Figure 4:
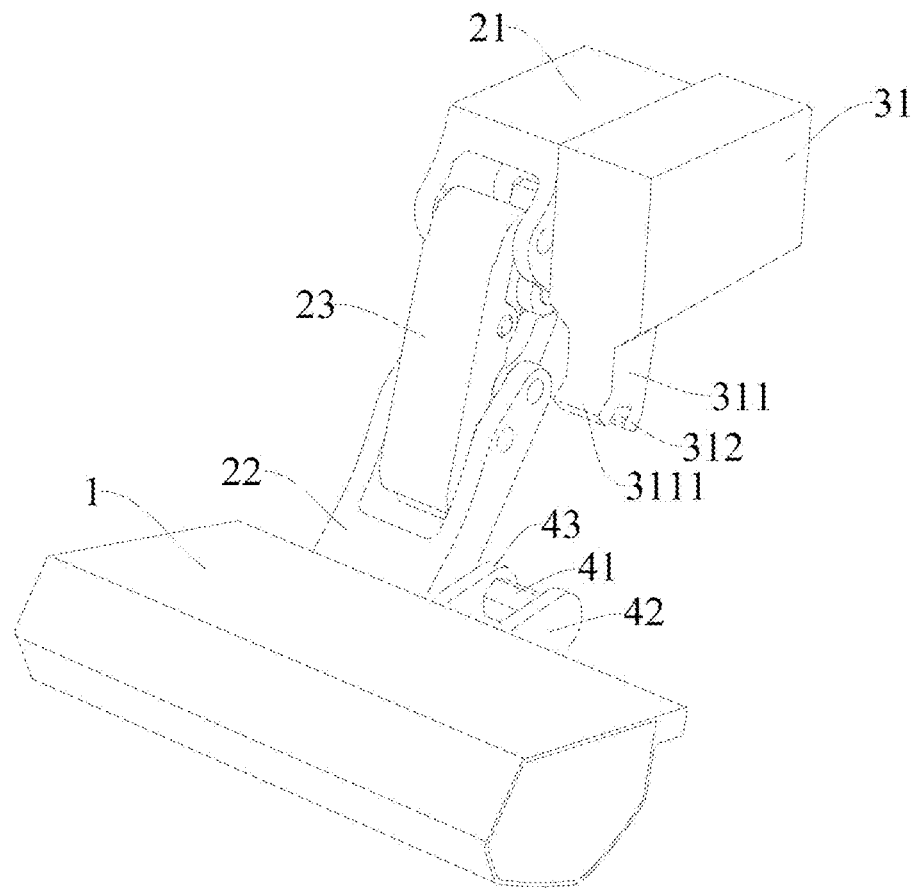
FIG. 4 is a perspective view of the vehicle step apparatus shown in FIG. 3.

As illustrated in FIG. 4, the vehicle step apparatus 100 according to embodiments of the present disclosure includes a step 1, a retractable device 2, and a locking member 3, in which the step 1 is movable between an extended position and a retracted position.

The retractable device 2 includes a mounting bracket 21, a step bracket 22, and an arm assembly 23. The step 1 is mounted on the step bracket 22, and the arm assembly 23 is pivotally connected to the mounting bracket 21 and the step bracket 22, respectively, so as to drive the step 1 to move between the extended position and the retracted position. In other words, one end of the arm assembly 23 is pivotally connected to the mounting bracket 21, and the other end of the arm assembly 23 is pivotally connected to the step bracket 22. The arm assembly 23 is driven by a driving device (such as a motor) to move the step 1 between the extended position and the retracted position. Specifically, the mounting bracket 21 can be mounted to the bottom surface 201 of the vehicle body 200.

The locking member 3 can engage with one of the step 1 and the step bracket 22 and is separable from the one of the step 1 and the step bracket 22. In the retracted position, the locking member 3 engages with one of the step 1 and the step bracket 22 to lock the step 1 in the retracted position. In an embodiment, the locking member 3 directly engages with the step 1 and separates from the step 1. Specifically, when the step 1 moves to the retracted position, the locking member 3 engages with the step 1 to lock the step 1 in the retracted position, and the locking member 3 separates from the step 1 to allow the step 1 to move from the retracted position towards the extended position. In another embodiment, the step 1 is mounted on the step bracket 22, and the locking member 3 engages with or separates from the step bracket 22 to realize the locking or release of the step 1 by the locking member 3, in which the locking member 3 engages with the step bracket 22 to lock the step 1 in the retracted position, and the locking member 3 separates from the step bracket 22 to allow the step bracket 22 to move the step 1 from the retracted position to the extended position.

Herein, it is to be understood that the locking member 3 can release the step 1 or the step bracket 22 before the step 1 leaves the retracted position, or the locking member 3 can release the step 1 or the step bracket 22 while the step 1 is leaving the retracted position; that is, a process of separating the step 1 or the step bracket 22 from the locking member 3 can be performed simultaneously with a process of the step 1 leaving the retracted position.

In some embodiments, in the retracted position, the step 1 abuts against a lower edge of a lateral surface of the vehicle body 200. For example, the step 1 is oriented in a vertical direction and abuts against the lower edge of the lateral surface of the vehicle body 200, whereby the step 1 covers the lower edge of the vehicle body 200.

In other embodiments, in the retracted position, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role so as to protect the vehicle body and prevent the vehicle 1000 from being hit or scratched.

With the vehicle step apparatus according to embodiments of the present disclosure, the step 1 in the retracted position is locked in the retracted position by the locking member 3, thereby enhancing the stability of the step 1 in the retracted position, and by locking and supporting the step 1 through the locking member 3, damage to the retractable device can be avoided when the step 1 is impacted by an external force. Moreover, the step 1 in the retracted position can act as the bumper of the vehicle to play a protective role so as to prevent the vehicle from being hit or scratched.

In some embodiments, when the step 1 moves from the retracted position towards the extended position, one of the step 1 and the step bracket 22 separates from the locking member 3 against a locking force of the locking member 3.

In some embodiments, one of the step 1 and the step bracket 22 has an engagement member 4, and the locking member 3 can engage with or separate from the engagement member 4. In other words, the step 1 has the engagement member 4, or the step bracket 22 has the engagement member 4. When the step 1 moves to the retracted position, the locking member 3 can engage with the engagement member 4 to lock the step 1 in the retracted position. When the step 1 moves away from the retracted position towards the extended position, the locking member 3 separates from the engagement member 4; that is, the locking member 3 releases the step 1 so that the step 1 can move from the retracted position to the extended position.

As illustrated in FIG. 1, when the vehicle door 300 is opened, the locking member 3 separates from the engagement member 4, and the retractable device 2 drives the step 1 to move to the extended position, such that people can get on the vehicle by the step 1. As shown in FIG. 2, when the vehicle door 300 is closed, the retractable device 2 drives the step 1 to move to the retracted position, and when the step 1 moves to the retracted position, the locking member 3 engages with the engagement member 4 to lock the step 1. It could be appreciated that, in some embodiments, after the step 1 moves to the retracted position, the locking member 3 engages with the engagement member 4 to lock the step 1, and in some other embodiments, during the movement of the step 1 towards the retracted position, the step 1 gradually enters a position where it is locked by the locking member 3, and when the step 1 reaches the retracted position, the locking member 3 completes the locking of the step 1.

The manner in which the engagement member 4 is connected with the step 1 or the step bracket 22 is not limited to the described embodiments. For example, the engagement member 4 is detachably connected to the step 1 or the step bracket 22, or the engagement member 4 is integrally formed with the step 1 or the step bracket 22. For example, as shown in FIG. 4, the engagement member 4 is coupled to the step 1, and the engagement member 4 is integrally formed with the step 1. When the engagement member 4 is detachably connected to the step 1, the engagement member 4 and the step 1 can be regarded as separate members that are different from each other. When the engagement member 4 is integrally formed with the step 1, the engagement member 4 and the step 1 can be regarded as a whole.

In some specific examples, as shown in FIGS. 4-8, the engagement member 4 includes an engagement shaft 41, and the locking member 3 includes a locking seat 31. The locking seat 31 has a locking groove 312, and the engagement shaft 41 can engage in the locking groove 312 and separate from the locking groove 312.

Specifically, the step 1 is locked in the retracted position by a clamping force exerted on the engagement shaft 41 by the locking groove 312, and when the step 1 moves from the retracted position towards the extended position, the engagement shaft 41 separates from the locking groove 312 against the clamping force of the locking groove 312.

Figure 5:
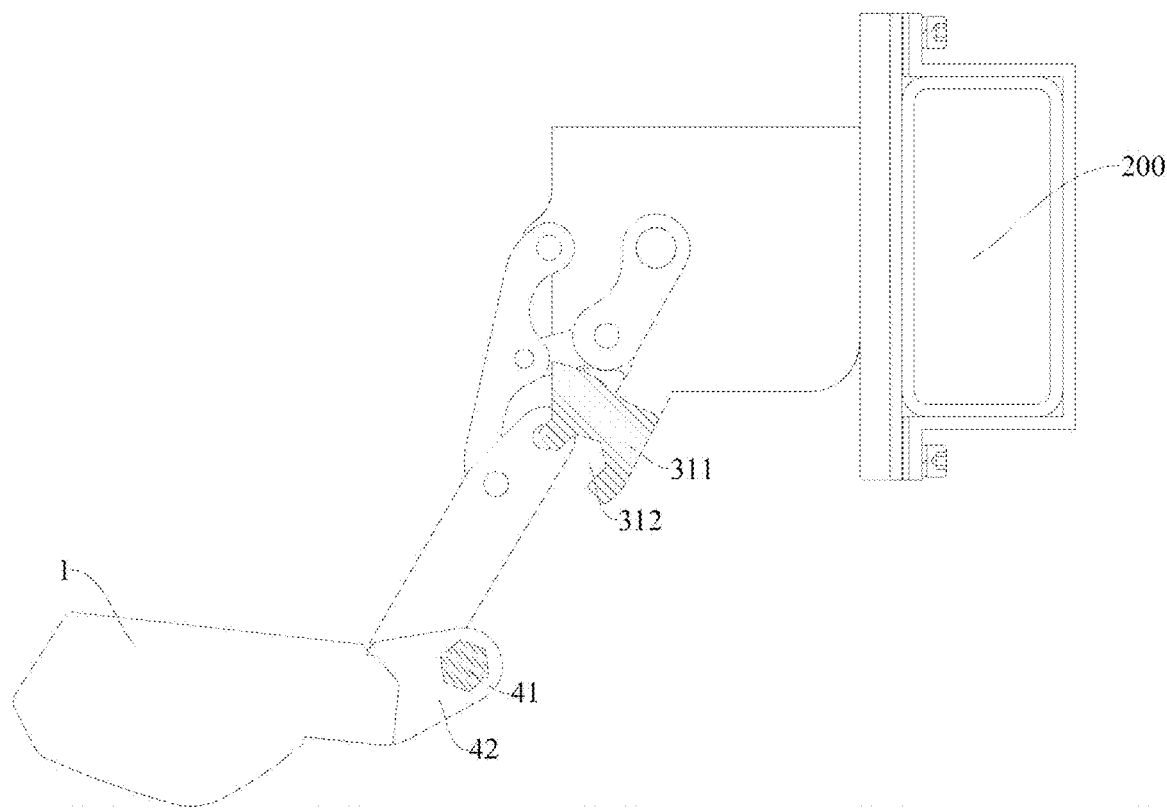
FIG. 5 is a side view of the vehicle step apparatus shown in FIG. 4, in which the step is in an extended position.
Figure 6:
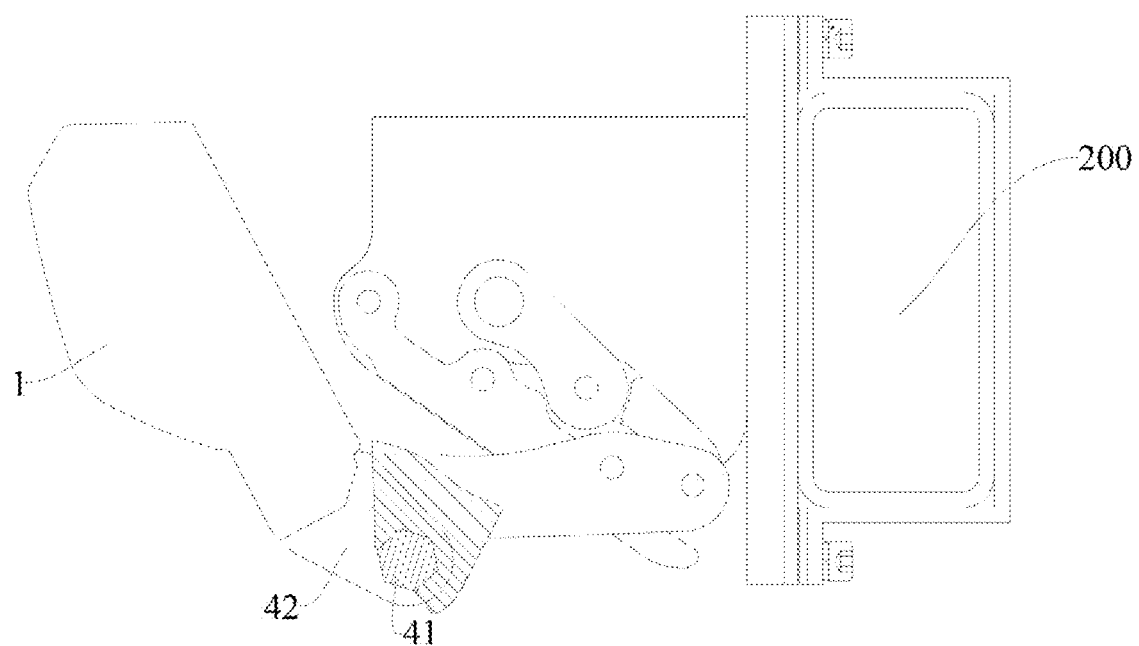
FIG. 6 is a side view of the vehicle step apparatus shown in FIG. 4, in which the step is in a retracted position.
Figure 7:
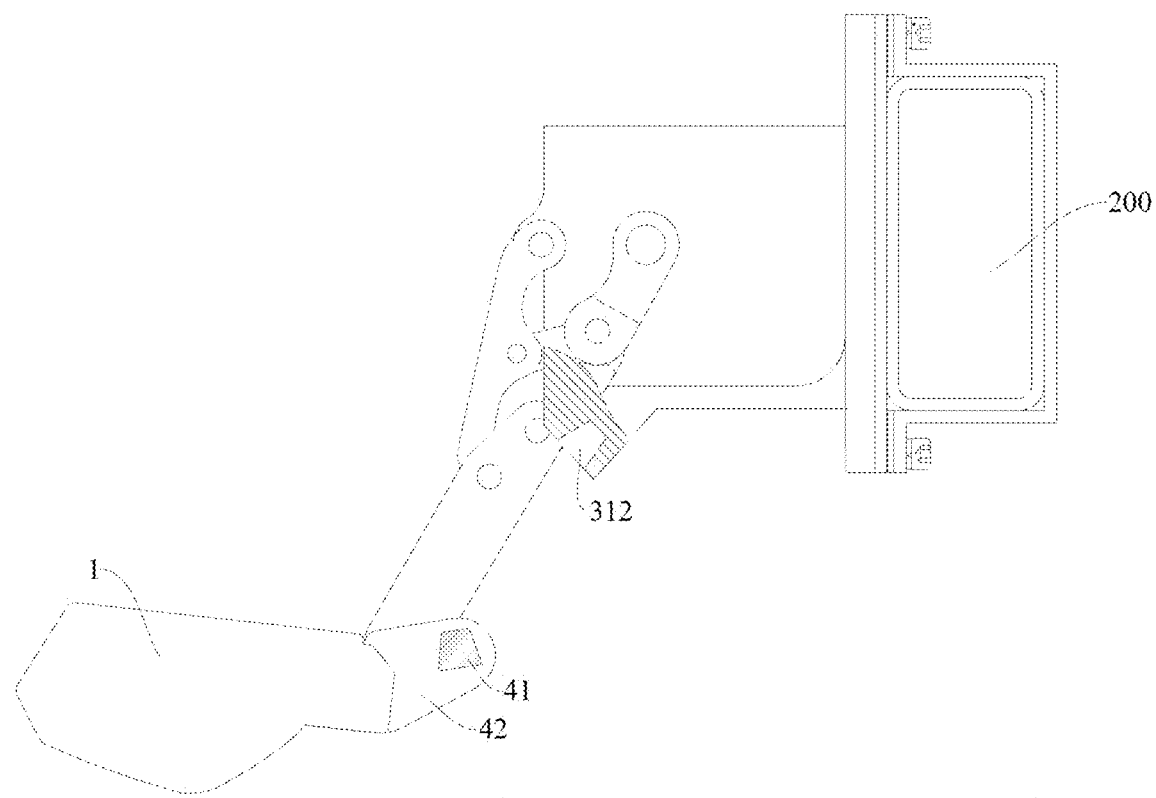
FIG. 7 is a side view of a vehicle step apparatus according to another embodiment of the present disclosure, in which a step is in an extended position.
Figure 8:
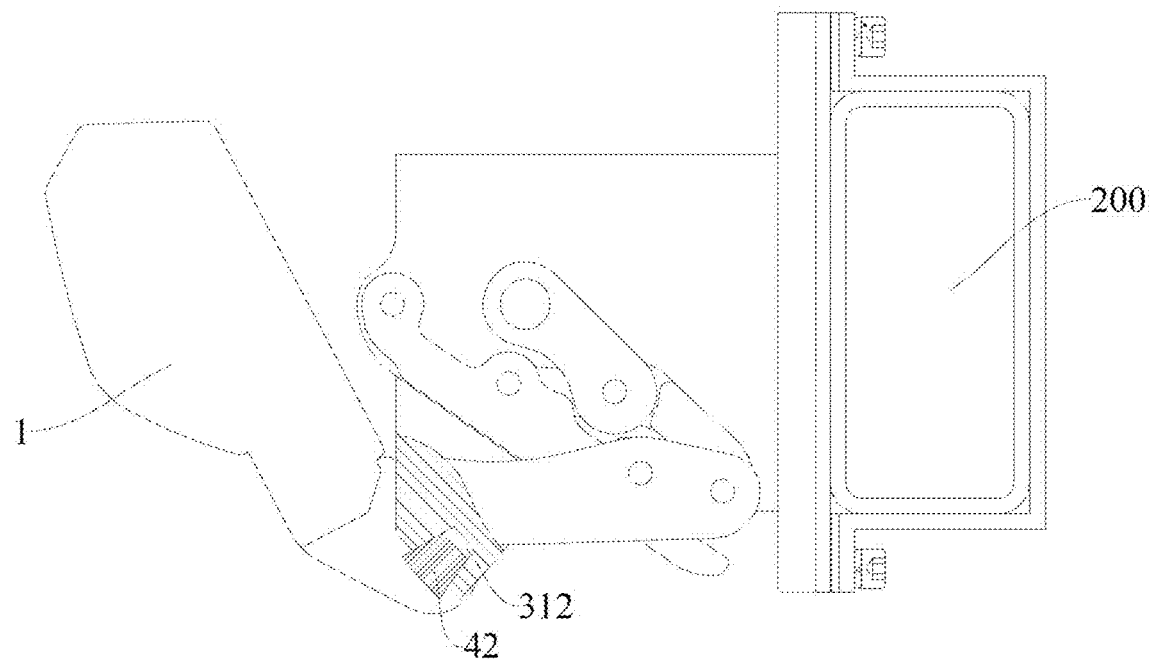
FIG. 8 is a side view of the vehicle step apparatus shown in FIG. 7, in which the step is in a retracted position.

In other words, when the step 1 moves to the retracted position, as shown in FIGS. 6 and 8, the engagement shaft 41 of the engagement member 4 engages in the locking groove 312 of the locking seat 31, and the step 1 is locked in the retracted position through the clamping force exerted on the engagement shaft 41 by the locking groove 312. When the step 1 needs to move from the retracted position towards the extended position, the engagement shaft 41 separates from the locking groove 312 against the locking force of the locking groove 312 to allow the step 1 to move from the retracted position to the extended position, thereby facilitating the movement of the step 1 to the extended position, as shown in FIGS. 5 and 7. It can be understood that during the movement of the step 1 towards the retracted position, when the step 1 reaches a predetermined position, the engagement shaft 41 starts to enter the locking groove 312; as the step 1 further moves towards the retracted position, the engagement shaft 41 gradually enters the locking groove 312; when the step 1 reaches the retracted position, the engagement shaft 41 completely enters the locking groove 312; that is, the engagement shaft 41 fully engages in the locking groove 312, so as to achieve the locking of the step 1. In turn, when the step 1 gradually moves from the retracted position towards the extended position, the engagement shaft 41 gradually comes out of the locking groove 312, and when the step 1 reaches the predetermined position from the retracted position, the engagement shaft 41 completely leaves the locking groove 312, so as to release the step 1.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

It should be understood herein that terms such as "first" and "second" are used for purposes of description and are not intended to indicate or imply relative importance or significance or the number of indicated technical features. Thus, the feature defined with "first" and "second" may comprise one or more of this feature explicitly or implicitly.

Specifically, a first end of the first support lug 42 and a first end of the second support lug 43 are disposed to the step 1 or the step bracket 22, and the first support lug 42 and the second support lugs 43 are arranged opposite to each other and spaced apart from each other. The engagement shaft 41 is connected between a second end of the first support lug 42 and a second end of the second support lug 43. A first end of the engagement shaft 41 is connected to the second end of the first support lug 42, and a second end of the engagement shaft 41 is connected to the second end of the second support lug 42. The engagement shaft 41 can engage with or separate from the locking member 3.

In some embodiments, the locking seat 31 is mounted to a bottom of the vehicle body 200, the locking seat 31 has an extension arm portion 311 extending downwards, and the locking groove 312 is provided in an end surface of a free end 3111 of the extension arm portion 311; that is, the locking groove 312 is provided in a free end surface of the extension arm portion 311. As shown in FIG. 4, since the extension arm portion 311 extends downwards from a bottom of the locking seat 31, the free end surface of the extension arm portion 311 is a lower end surface of the extension arm portion 311; that is, the locking groove 312 is provided in the lower end surface of the extension arm portion 311.

In some preferred embodiments, an outer peripheral contour of a cross section of the engagement shaft 41 is matched with an inner peripheral contour of the locking groove 312 so as to enable the engagement shaft 41 to be engaged in the locking groove 312 better. Specifically, the cross section of the engagement shaft 41 is non-circular, and the inner peripheral contour of the locking groove 312 is also non-circular, such as a quadrangle, a hexagon or other polygons. FIGS. 4-6 show that the outer peripheral contour of the engagement shaft 41 and the inner peripheral contour of the locking groove 312 are regularly hexagonal. FIGS. 7-8 show that the outer peripheral contour of the engagement shaft 41 and the inner peripheral contour of the locking groove 312 are trapezoid. It is to be understood that the cross section of the engagement shaft 41 is not limited thereto.

In some embodiments, the locking seat 31 is connected to the mounting bracket 21. In other words, the locking seat 31 can be regarded as a different component from the mounting bracket 21. In other embodiments, the locking seat 31 is integrally formed with the mounting bracket 21. In other words, the locking seat 31 and the mounting bracket 21 can be considered as an integral component.

Specifically, as shown in FIGS. 4-6, the mounting bracket 21 and the locking seat 31 are sequentially connected in a left-right direction, and are disposed to the bottom surface 201 of the vehicle body 200. A lower end of the mounting bracket 21 is pivotally connected to an upper end of the arm assembly 23, a lower end of the arm assembly 23 is pivotally connected to an upper end of the step bracket 22, and the step 1 is arranged to a lower end of the step bracket 22. The locking seat 31 has the extension arm portion 311 extending downwards, the end surface of the free end 3111 of the extension arm portion 311 is provided with the locking groove 312, and the inner peripheral contour of the locking groove 312 is a regular hexagon.

The engagement member 4 includes the engagement shaft 41, the first support lug 42, and the second support lug 43. The first support lug 42 and the second support lug 43 are spaced apart from each other and disposed to a side of the step 1 adjacent to the locking seat 3. The first end of the engagement shaft 41 is connected to the first support lug 42, and the second end of the engagement shaft 41 is connected to the second support lug 43. The outer peripheral contour of the engagement shaft 41 is a regular hexagon. As shown in FIG. 6, the engagement shaft 41 engages in the locking groove 312 to lock the step 1 in the retracted position through the clamping force exerted on the engagement shaft 41 by the locking groove 312. When the step 1 moves from the retracted position to the extended position, the engagement shaft 41 separates from the locking groove 312 against the clamping force of the locking groove 312, to allow the step 1 to move to the extended position, as shown in FIG. 5.

Optionally, as shown in FIGS. 7-8, the outer peripheral contour of the engagement shaft 41 and the inner peripheral contour of the locking groove 312 are both trapezoidal. As shown in FIG. 8, the engagement shaft 41 engages in the locking groove 312 to make the step 1 locked in the retracted position through the clamping force exerted on the engagement shaft 41 by the locking groove 312. When the step 1 moves from the retracted position to the extended position, the engagement shaft 41 separates from the locking groove 312 against the clamping force of the locking groove 312, so as to allow the step 1 to move to the extended position, as shown in FIG. 7.

Figure 9:
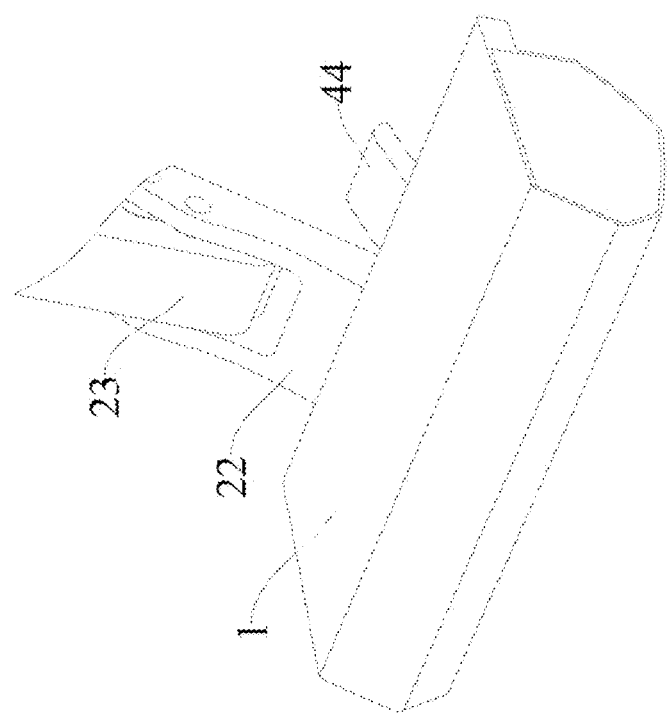
FIG. 9 is a partially perspective view of a vehicle step apparatus according to still another embodiment of the present disclosure.

It can be understood that the engagement member 4 is not limited to the form of the engagement shaft. In some other optional embodiments, as shown in FIG. 9, the engagement member 4 may be configured as an engagement projection 401 that can engage in the locking groove 312 and can separate from the locking groove 312. Specifically, in some embodiments, the engagement projection 401 is coupled to the step 1 or the step bracket 22; yet, the manner in which the engagement projection 401 is connected to the step 1 or the step bracket 22 is not limited. For example, the engagement projection 401 is detachably mounted to the step 1 or the step bracket 22, or the engagement projection 401 is integrally formed with the step 1 or the step bracket 22.

The engagement projection 401 has an outer peripheral contour matched with the inner peripheral contour of the locking groove 312, such that when the step 1 moves to the retracted position, the engagement projection 401 can engage in the locking groove 312 to lock the step 1 in the retracted position. The engagement projection 401 can separate from the locking groove 312 to allow the step 1 to move from the retracted position towards the extended position.

In some embodiments, a plurality of retractable devices 2, a plurality of locking members 3, and a plurality of engagement members 4 are provided. The plurality of retractable devices 2, the plurality of locking members 3, and the plurality of engagement members 4 are in one-to-one correspondence, so as to further improve the stability of the step 1 when it is moving and/or stationary. In some embodiments, by providing the plurality of retractable devices 2, the plurality of locking members 3, and the plurality of engagement members 4, the stability of the step 1 in the retracted position and the smoothness thereof during the movement are further enhanced. It should be understood herein that the term "a plurality of" means at least two, such as two or three, unless specified otherwise.

In some embodiments, as shown in FIG. 3, each locking member 3 is located at an outer side of the corresponding retractable device 2 along a length direction of the step 1 (i.e., a left-right direction shown in FIG. 3). Optionally, the locking member 3 may also be provided at an inner side of the corresponding retractable device 2.

Specifically, as shown in FIGS. 1-3, the vehicle step apparatus 100 for the vehicle 1000 includes two retractable devices 2, two locking members 3, and two engagement members 4. The engagement members 4 are coupled to the step 1, the locking members 3 are coupled to the bottom of the vehicle body 200, and the retractable devices 2 connect the bottom of the vehicle body 200 with the step 1. One of the engagement members 4, one of the retractable devices 2, the other one of the retractable devices 2, and the other one of the engagement members 4 are sequentially arranged and spaced apart from one another along the length direction of the step 1 (the left-right direction shown in FIG. 3). The one engagement member 4 is adjacent to the one retractable device 2, and the other engagement member 4 is adjacent to the other retractable device 2.

One of the locking members 3 and the other one of the locking members 3 are coupled to the bottom surface 201 of the vehicle body 200 and spaced apart along the length direction of the step 1. The one of the locking members 3 and the one of the engagement members 4 are both located on a left side of the one of the retractable devices 2, and the one of the locking members 3 and the one of the engagement members 4 are arranged opposite each other. The other one of the locking members 3 and the other one of the engagement members 4 are both located on a right side of the other one of the retractable devices 2, and the other one of the locking members 3 and the other one of the engagement members 4 are arranged opposite each other. In the retracted position, the two engagement members 4 are configured to engage with the two locking members 3 and separate from the two locking members 3 correspondingly.

A vehicle step apparatus according to another embodiment of the present disclosure will be described below.

As shown in FIGS. 1-9, a vehicle step apparatus 100 according to the embodiment of the present disclosure includes a step 1, a retractable device 2, and a locking member 3, in which the step 1 is movable between an extended position and a retracted position. The retractable device 2 is connected to the step 1 to drive the step 1 to move between the extended position and the retracted position.

The locking member 3 is used to lock the step 1 in the retracted position and allows the step 1 to move away from the retracted position towards the extended position. In other words, when the step 1 is in the retracted position, the locking member 3 can lock the step 1 in the retracted position to improve the stability of the step 1. Moreover, in the retracted position, the step 1 is locked by the locking member 3, and the locking member 3 also functions to support the step 1, such that the retractable device 2 will not be damaged even if the step 1 is subjected to an external force, thereby prolonging the service life of the retractable device 2. When the step 1 moves from the retracted position towards the extended position, the locking member 3 allows the retractable device 2 to drive the step 1 to move towards the extended position.

A vehicle step apparatus according to still another embodiment of the present disclosure will be described below.

As shown in FIGS. 1-9, a vehicle step apparatus 100 according to the embodiment of the present disclosure includes a step 1, a retractable device 2, and a locking member 3, in which the step 1 is movable between an extended position and a retracted position. The retractable device 2 is connected to the step 1 to drive the step 1 to move between the extended position and the retracted position.

The locking member 3 is configured to engage with the step 1 to lock the step 1 in the retracted position, and also to disengage (e.g., detach or separate) from the step 1 to allow the step 1 to move from the retracted position towards the extended position. In other words, when the step 1 is in the retracted position, the locking member 3 can engage with the step 1 to lock the step 1 in the retracted position, thereby enhancing the stability of the step 1. Moreover, in the retracted position, the step 1 is locked by the locking member 3, and the locking member 3 also functions to support the step 1, such that the retractable device 2 will not be damaged even if the step 1 is subjected to an external force, thereby prolonging the service life of the retractable device 2. When the step 1 moves from the retracted position towards the extended position, the locking member 3 can separate from the step 1 to allow the retractable device 2 to drive the step 1 to move towards the extended position.

Herein, it should be understood that the locking member 3 can separate from the step 1 before the step 1 leaves the retracted position, or can separate from the step 1 when the step 1 leaves the retracted position; that is, a process of separating the step 1 from the locking member 3 can be performed simultaneously with a process of the step 1 leaving the retracted position.

In some embodiments, when the step 1 moves from the retracted position towards the extended position, the step 1 separates from the locking member 3 against the locking force of the locking member 3.

A vehicle step apparatus according to some other embodiments of the present disclosure will be described below.

As shown in FIGS. 4-8, a vehicle step apparatus 100 according to the embodiments of the present disclosure includes a mounting bracket 21, a step bracket 22, a step 1, an arm assembly 23, an engagement shaft 41, and a locking seat 31. The step 1 is mounted to the step bracket 22. The arm assembly 23 is pivotally connected to the mounting bracket 21 and the step bracket 22, respectively, to drive the step 1 to move between an extended position and a retracted position. In other words, the arm assembly 23 has a first end pivotally connected to the mounting bracket 21 and a second end pivotally connected to the step bracket 22, and the arm assembly 23 is driven by a driving device (such as a motor) to move the step 1 between the extended position and the retracted position. Specifically, the mounting bracket 21 can be mounted to the bottom surface 201 of the vehicle body 200.

The engagement shaft 41 is mounted to the step 1 or the step bracket 22, the locking seat 31 has a locking groove 312, and the engagement shaft 41 is configured to engage in or separate from the locking groove 312. In the retracted position, the engagement shaft 41 engages in the locking groove 312 to lock the step 1 in the retracted position. The engagement shaft 41 separates from the locking groove 312 when the step 1 moves from the retracted position towards the extended position.

As shown in FIG. 1, when the vehicle door 300 is opened, the engagement shaft 41 separates from the locking groove 312, and the arm assembly 23 drives the step 1 to move to the extended position, such that people can get on the vehicle by means of the step 1. As shown in FIG. 2, when the vehicle door 300 is closed, the arm assembly 23 drives the step 1 to move to the retracted position, and when the step 1 reaches the retracted position, the engagement shaft 41 engages with the locking groove 312 to lock the step 1. It can be appreciated that, in some embodiments, after the step 1 moves to the retracted position, the engagement shaft 41 engages with the locking groove 312 to lock the step 1, and in other embodiments, during the movement of the step 1 towards the retracted position, the engagement shaft 41 gradually enters a position where it is locked by the locking groove 312, and when the step 1 reaches the retracted position, the locking groove 312 and the engagement shaft 41 complete the locking of the step 1.

Specifically, the step 1 is locked in the retracted position through a clamping force exerted on the engagement shaft 41 by the locking groove 312. When the step 1 moves from the retracted position towards the extended position, the engagement shaft 41 separates from the locking groove 312 against the clamping force of the locking groove 312.

In other words, when the step 1 moves to the retracted position, as shown in FIGS. 6 and 8, the engagement shaft 41 of the engagement member 4 engages in the locking groove 312 of the locking seat 31, and the step 1 is locked in the retracted position through the clamping force exerted on the engagement shaft 41 by the locking groove 312. When the step 1 needs to move from the retracted position towards the extended position, the engagement shaft 41 separates from the locking groove 312 against the locking force of the locking groove 312 to allow the step 1 to move from the retracted position to the extended position, thereby facilitating the movement of the step 1 to the extended position, as shown in FIGS. 5 and 7. It can be understood that during the movement of the step 1 towards the retracted position, when the step 1 reaches a predetermined position, the engagement shaft 41 starts to enter the locking groove 312; as the step 1 further moves towards the retracted position, the engagement shaft 41 gradually enters the locking groove 312; when the step 1 reaches the retracted position, the engagement shaft 41 completely enters the locking groove 312; that is, the engagement shaft 41 fully engages in the locking groove 312, so as to achieve the locking of the step 1. In turn, when the step 1 gradually moves from the retracted position towards the extended position, the engagement shaft 41 gradually comes out of the locking groove 312, and when the step 1 reaches the predetermined position from the retracted position, the engagement shaft 41 completely leaves the locking groove 312, so as to release the step 1.

In the vehicle step apparatus according to the embodiments of the present disclosure, the step 1 in the retracted position is locked in the retracted position by the engagement shaft 41 and the locking groove 312, thereby enhancing the stability of the step 1 in the retracted position, and the step 1 is locked and supported by the engagement shaft 41 and the locking groove 312, thereby avoiding damage to the retractable device when the step 1 is impacted by the external force. Moreover, the step 1 in the retracted position can be used as a bumper to provide protection for the vehicle.

In some embodiments, in the retracted position, the step 1 abuts against a lower edge of a lateral surface of the vehicle body 200. For example, the step 1 is oriented in the vertical direction and abuts against the lower edge of the lateral surface of the vehicle body 200, whereby the step 1 covers the lower edge of the vehicle body 200.

In other embodiments, in the retracted position, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role, so as to protect the vehicle body and prevent the vehicle 1000 from being hit or scratched.

In some embodiments, the engagement shaft 41 has a non-circular cross section, and a contour of the cross section of the engagement shaft 41 is matched with that of the locking groove 312 so as to allow the engagement shaft 41 to engage in the locking groove 312 better. Specifically, an outer peripheral contour of the cross section of the engagement shaft 41 is non-circular, and an inner peripheral contour of the locking groove 312 is also non-circular, such as a quadrangle, a hexagon or other polygons. FIGS. 4-6 show that the outer peripheral contour of the engagement shaft 41 and the inner peripheral contour of the locking groove 312 are regularly hexagonal. FIGS. 7-8 show that the outer peripheral contour of the engagement shaft 41 and the inner peripheral contour of the locking groove 312 are trapezoid. It is to be understood that the cross section of the engagement shaft 41 is not limited thereto.

In some embodiments, the locking seat 31 has an extension arm portion 311 extending downwards, and the locking groove 312 is provided in an end surface of a free end 3111 of the extension arm portion 311; that is, the locking groove 312 is provided in a free end surface of the extension arm portion 311. As shown in FIG. 4, since the extension arm portion 311 extends downwards from a bottom of the locking seat 31, the free end surface of the extension arm portion 311 is a lower end surface of the extension arm portion 311; that is, the locking groove 312 is provided in the lower end surface of the extension arm portion 311.

In some optional embodiments, the step is provided with a first support lug 42 and a second support lug 43, and the first support lug 42 and the second support lug 43 are spaced apart from each other. The engagement shaft 41 has a first end connected with the first support lug 42 and a second end connected with the second support lug 43.

Specifically, as shown in FIG. 4, the first support lug 42 and the second support lug 43 are coupled to a side of the step 1 adjacent to the locking seat 31 and are spaced apart from each other along a length direction of the step 1. The engagement shaft 41 is located between the first support lug 42 and the second support lug 43. An axial direction of the engagement shaft 41 is substantially coincident with the length direction of the step 1 and is spaced apart therefrom. The first end of the engagement shaft 41 is connected to a side of the first support lug 42 adjacent to the second support lug 43, and the second end of the engagement shaft 41 is connected to a side of the second support lug 43 adjacent to the first support lug 42.

It can be understood that the engagement shaft 41 is not limited to being supported in the form of the support lugs. For example, in other optional embodiments, the engagement shaft 41 is threadedly arranged to the step bracket 21 so as to facilitate the mounting and dismounting of the engagement shaft 41.

In some embodiments, the locking seat 31 is connected to the mounting bracket 21. In other words, the locking seat 31 can be regarded as a different component from the mounting bracket 21. In other embodiments, the locking seat 31 is integrally formed with the mounting bracket 21. In other words, the locking seat 31 and the mounting bracket 21 can be considered as an integral component.

Figure 10:
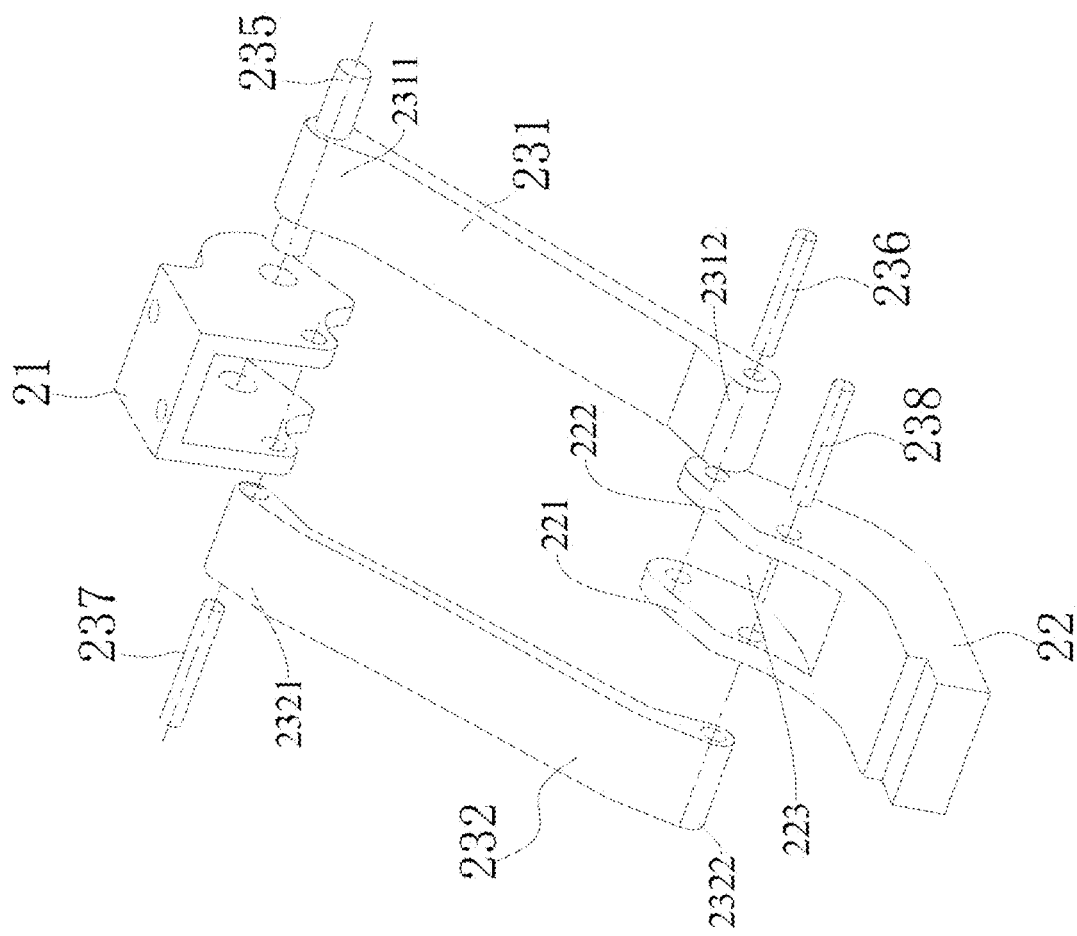
FIG. 10 is a perspective view of a retractable device according to an embodiment of the present disclosure.

In some optional embodiments, as shown in FIG. 10, the arm assembly 23 has a first arm 231 and a second arm 232. The first arm 231 has a first end 2311 pivotally connected to the mounting bracket 21 and a second end 2312 pivotally connected to the step bracket 22. The second arm 232 has a first end 2321 pivotally connected to the mounting bracket 21 and a second end 2322 pivotally connected to the step bracket 22.

Specifically, as shown in FIG. 10, the arm assembly 23 further includes a first pin 235, a second pin 236, a third pin 237, and a fourth pin 238. The first arm 231 has an upper end and a lower end, the upper end of the first arm 231 is pivotally connected to the mounting bracket 21 via the first pin 235, and the lower end of the first arm 231 is pivotally connected to the step bracket 22 via the second pin 236. An upper end of the second arm 232 is pivotally connected to the mounting bracket 21 via the third pin 237, and a lower end of the second arm 232 is pivotally connected to the step bracket 22 via the fourth pin 238.

Figure 11:
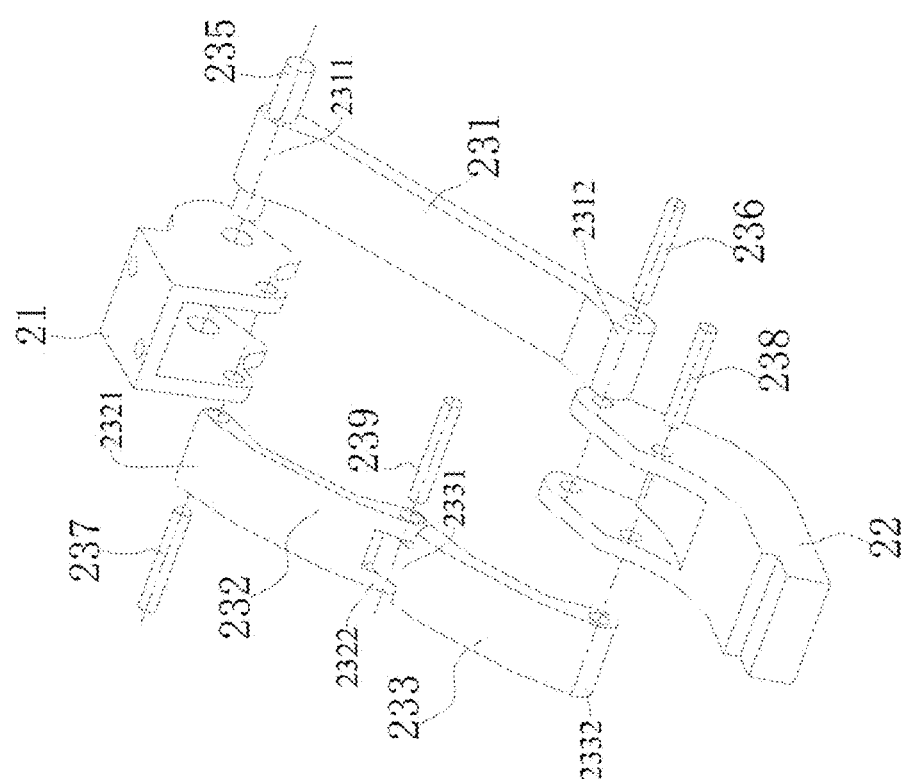
FIG. 11 is a perspective view of a retractable device according to another embodiment of the present disclosure.

In other embodiments, as shown in FIG. 11, the arm assembly 23 includes a first arm 231, a second arm 232, and a third arm 233. The first arm 231 has a first end 2311 pivotally connected to the mounting bracket 21 and a second end 2312 pivotally connected to the step bracket 22. The second arm 232 has a first end 2321 pivotally connected to the mounting bracket 21. The third arm 233 has a first end 2331 pivotally connected to a second end 2322 of the second arm 232, and a second end 2332 pivotally connected to the step bracket 22.

Specifically, as shown in FIG. 11, the arm assembly 23 further includes a first pin 235, a second pin 236, a third pin 237, a fourth pin 238, and a fifth pin 239. The first arm 231 has an upper end and a lower end, the upper end of the first arm 231 is pivotally connected to the mounting bracket 21 via the first pin 235, and the lower end of the first arm 231 is pivotally connected to the step bracket 22 via the second pin 236. The second arm 232 has an upper end and a lower end, and the upper end of the second arm 232 is pivotally connected to the mounting bracket 21 via the third pin 237. The third arm 233 has an upper end and a lower end. The lower end of the second arm 232 is pivotally connected to the upper end of the third arm 233 via the fifth pin 239, and the lower end of the third arm 233 is pivotally connected to the step bracket 22 via the fourth pin 238.

Figure 12:
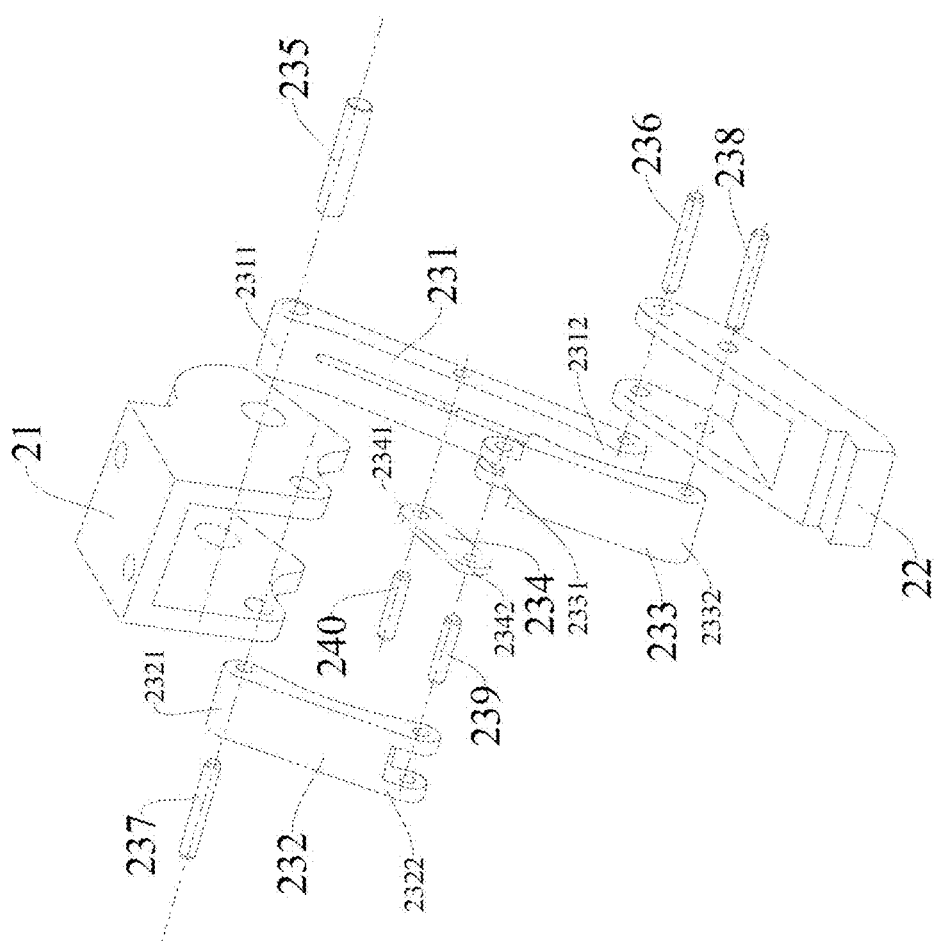
FIG. 12 is a perspective view of a retractable device according to still another embodiment of the present disclosure.

In still other specific embodiments, as shown in FIG. 12, the arm assembly 23 includes a first arm 231, a second arm 232, a third arm 233, and a fourth arm 234. The first arm 231 has a first end 2311 pivotally connected to the mounting bracket 21 and a second end 2312 pivotally connected to the step bracket 22. The second arm 232 has a first end 2321 pivotally connected to the mounting bracket 21. The third arm 233 has a first end 2331 pivotally connected to a second end 2322 of the second arm 232, and a second end 2332 pivotally connected to the step bracket 22. The fourth arm 234 has a first end 2341 pivotally connected to the first arm 231, and a second end 2342 pivotally connected to at least one of the second arm 232 and the third arm 233.

It can be understood by those skilled in the art that the second end 2342 of the fourth arm 234 can be pivotally connected to the second arm 232, or can be pivotally connected to the third arm 233, or can also be connected to both the second arm 232 and the third arm 233.

Specifically, as shown in FIG. 12, the arm assembly 23 further includes a first pin 235, a second pin 236, a third pin 237, a fourth pin 238, a fifth pin 239, and a sixth pin 240. The first arm 231 has an upper end and a lower end, the upper end of the first arm 231 is pivotally connected to the mounting bracket 21 via the first pin 235, and the lower end of the first arm 231 is pivotally connected to the step bracket 22 via the second pin 236. The second arm 232 has an upper end and a lower end, and the upper end of the second arm 232 is pivotally connected to the mounting bracket 21 via the third pin 237.

The third arm 233 has an upper end and a lower end, and the lower end of the third arm 233 is pivotally connected to the step bracket 22 via the fourth pin 238. The fourth arm 234 has a first end and a second end. The first end of the fourth arm 234 is pivotally connected to the lower end of the second arm 232 and the upper end of the third arm 233 via the fifth pin 239. The second end of the fourth arm 234 is pivotally connected to a middle portion of the first arm 231 via the sixth pin 240.

In some embodiments, as shown in FIGS. 10-12, the step bracket 22 has a first side wall 221 and a second side wall 222. The step bracket 22 has a U-shaped groove 223. The first side wall 221 and the second side wall 222 each extend outwards from a side of a body of the step bracket 22, and the first side wall 221 and the second side wall 222 are disposed opposite to and spaced apart from each other to define the U-shaped groove 213 therebetween.

In the arm assembly 23 shown in FIG. 10, the second end 2312 of the first arm 231 extends into the U-shaped groove 213; that is, the second end 2312 of the first arm 231 is clamped between the first side wall 221 and the second side wall 222, and the second pin 236 passes through one of the first side wall 221 and the second side wall 222, the second end 2312 of the first arm 231, and the other one of the first side wall 221 and the second side wall 222 sequentially, so as to pivotally connect the second end 2312 of the first arm 231 to the step bracket 22. The second end 2322 of the second arm 232 extends into the U-shaped groove 213; that is, the second end 2322 of the second arm 232 is clamped between the first side wall 221 and the second side wall 222, and the fourth pin 238 passes through one of the first side wall 221 and the second side wall 222, the second end 2322 of the second arm 232, and the other one of the first side wall 221 and the second side wall 222 sequentially, so as to pivotally connect the second end 2322 of the second arm 232 to the step bracket 22.

In the arm assembly 23 shown in FIG. 11 and FIG. 12, the second end 2312 of the first arm 231 extends into the U-shaped groove 213; that is, the second end 2312 of the first arm 231 is clamped between the first side wall 221 and the second side wall 222, and the second pin 236 passes through one of the first side wall 221 and the second side wall 222, the second end 2312 of the first arm 231, and the other one of the first side wall 221 and the second side wall 222 sequentially, so as to pivotally connect the second end 2312 of the first arm 231 to the step bracket 22. The second end 2332 of the third arm 233 extends into the U-shaped groove 213; that is, the second end 2332 of the third arm 233 is clamped between the first side wall 221 and the second side wall 222, and the fourth pin 238 passes through one of the first side wall 221 and the second side wall 222, the second end 2332 of the third arm 233, and the other one of the first side wall 221 and the second side wall 222 sequentially, so as to pivotally connect the second end 2332 of the third arm 233 to the step bracket 22.

A vehicle step apparatus and a vehicle according to some embodiments of the present disclosure will be described below with reference to the drawings.

As shown in FIGS. 1-4, a vehicle 1000 according to embodiments of the present disclosure includes a vehicle body 200, a step 1, a retractable device 2, and a locking member 3. The retractable device 2 includes a step bracket 22 and an arm assembly 23, and the step 1 is mounted on the step bracket 22.

The arm assembly 23 is pivotally connected to the vehicle body 200 and the step bracket 22 to drive the step 1 to move between an extended position and a retracted position. In other words, the arm assembly 23 has a first end pivotally connected to a bottom surface 201 of the vehicle body 200, and a second end pivotally connected to the step bracket 22, and the arm assembly 23 is driven by a driving device (such as a motor) to move the step 1 between the extended position and the retracted position. It can be understood that in the embodiment, the vehicle step apparatus 100 does not include a mounting bracket 21, and the first end of the arm assembly 23 is directly pivotally connected to the bottom surface 201 of the vehicle body 200.

The locking member 3 is mounted to the vehicle body 200, and the locking member 3 is configured to engage with or disengage (e.g., detach or separate) from one of the step 1 and the step bracket 22. In the retracted position, the locking member 3 engages with the one of the step 1 and the step bracket 22 to lock the step 1 in the retracted position. When the step 1 moves from the retracted position towards the extended position, the locking member 3 separates from the one of the step 1 and the step bracket 22 to allow the step 1 to move from the retracted position towards the extended position.

In other words, in an optional embodiment, the locking member 3 is configured to engage with or separate from the step 1 directly. Specifically, when the step 1 is in the retracted position, the locking member 3 can engage with the step 1 to lock the step 1 in the retracted position; when the step 1 moves from the retracted position towards the extended position, the locking member 3 separates from the step 1. In another optional embodiment, the locking member 3 is configured to engage with or separate from the step bracket 22 to realize the locking or the release of the step 1 by means of the locking member 3. Specifically, when the step 1 is in the retracted position, the locking member 3 can engage with the step bracket 22 to lock the step 1 in the retracted position; and when the step 1 moves from the retracted position towards the extended position, the locking member 3 separates from the step bracket 22.

In some embodiments, in the retracted position, the step 1 abuts against a lower edge of a lateral surface of the vehicle body 200. For example, the step 1 is oriented in the vertical direction and abuts against the lower edge of the lateral surface of the vehicle body 200, whereby the step 1 covers the lower edge of the vehicle body 200.

In other embodiments, in the retracted position, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role, so as to protect the vehicle body and prevent the vehicle 1000 from being hit or scratched.

In some embodiments, when the step 1 moves from the retracted position towards the extended position, one of the step 1 and the step bracket separates from the locking member 3 against a locking force of the locking member 3. Specifically, in a case where the step 1 is configured to engage with or separate from the locking member 3 directly, the step 1 separates from the locking member 3 against the locking force of the locking member 3 when moving from the retracted position towards the extended position; in a case where the step bracket 22 is configured to engage with or separate from the locking member 3 to realize the locking or the release of the step 1, the step bracket 22 separates from the locking member 3 against the locking force of the locking member 3 when the step 1 moves from the retracted position towards the extended position.

In some embodiments, one of the step 1 and the step bracket 22 has an engagement member 4, and the locking member 3 is configured to engage with or separate from the engagement member 4. In other words, the step 1 has the engagement member 4, or the step bracket 22 has the engagement member 4. When the step 1 moves to the retracted position, the locking member 3 can engage with the engagement member 4 to lock the step 1 in the retracted position. When the step 1 moves away from the retracted position towards the extended position, the locking member 3 separates from the engagement member 4; that is, the locking member 3 releases the step 1 to allow the step 1 to move from the retracted position to the extended position.

As shown in FIG. 1, when the vehicle door 300 is opened, the locking member 3 separates from the engagement member 4, and the retractable device 2 drives the step 1 to move to the extended position, such that people can get on the vehicle by the step 1. As shown in FIG. 2, when the vehicle door 300 is closed, the retractable device 2 drives the step 1 to move to the retracted position, and when the step 1 moves to the retracted position, the locking member 3 engages with the engagement member 4 to lock the step 1. It can be appreciated that, in some embodiments, after the step 1 moves to the retracted position, the locking member 3 engages with the engagement member 4 to lock the step 1; in some other embodiments, during the movement of the step 1 towards the retracted position, the step 1 gradually enters a position where it is locked by the locking member 3, and when the step 1 reaches the retracted position, the locking member 3 completes the locking of the step 1.

The manner in which the engagement member 4 is connected with the step 1 or the step bracket 22 is not limited to the described embodiments. For example, the engagement member 4 is detachably connected to the step 1 or the step bracket 22, or the engagement member 4 is integrally formed with the step 1 or the step bracket 22. For example, as shown in FIG. 4, the engagement member 4 is coupled to the step 1, and the engagement member 4 is integrally formed with the step 1. When the engagement member 4 is detachably connected to the step 1, the engagement member 4 and the step 1 can be regarded as separate members that are different from each other. When the engagement member 4 is integrally formed with the step 1, the engagement member 4 and the step 1 can be regarded as a whole.

In some specific examples, as shown in FIGS. 4-8, the engagement member 4 includes an engagement shaft 41, and the locking member 3 includes a locking seat 31. The locking seat 31 has a locking groove 312, and the engagement shaft 41 is configured engage in the locking groove 312 and separate from the locking groove 312.

Specifically, the step 1 is locked in the retracted position by a clamping force exerted on the engagement shaft 41 by the locking groove 312, and when the step 1 moves from the retracted position towards the extended position, the engagement shaft 41 separates from the locking groove 312 against the clamping force of the locking groove 312.

In other words, when the step 1 moves to the retracted position, as shown in FIGS. 6 and 8, the engagement shaft 41 of the engagement member 4 engages in the locking groove 312 of the locking seat 31, and the step 1 is locked in the retracted position by the clamping force exerted on the engagement shaft 41 by the locking groove 312. When the step 1 needs to move from the retracted position towards the extended position, the engagement shaft 41 separates from the locking groove 312 against the locking force of the locking groove 312 to allow the step 1 to move from the retracted position to the extended position, thereby facilitating the movement of the step 1 to the extended position, as shown in FIGS. 5 and 7. It can be understood that during the movement of the step 1 towards the retracted position, when the step 1 reaches a predetermined position, the engagement shaft 41 starts to enter the locking groove 312; as the step 1 further moves towards the retracted position, the engagement shaft 41 gradually enters the locking groove 312; when the step 1 reaches the retracted position, the engagement shaft 41 completely enters the locking groove 312; that is, the engagement shaft 41 fully engages in the locking groove 312, so as to achieve the locking of the step 1. In turn, when the step 1 gradually moves from the retracted position towards the extended position, the engagement shaft 41 gradually comes out of the locking groove 312, and when the step 1 reaches the predetermined position from the retracted position, the engagement shaft 41 completely leaves the locking groove 312, so as to release the step 1.

In some specific embodiments, an outer peripheral contour of a cross section of the engagement shaft 41 is matched with an inner peripheral contour of the locking groove 312, such that the engagement shaft 41 can better engage in the locking groove 312. Specifically, the cross section of the engagement shaft 41 is non-circular, and the inner peripheral contour of the locking groove 312 is also non-circular, such as a quadrangle, a hexagon or other polygons. FIGS. 4-6 show that the outer peripheral contour of the engagement shaft 41 and the inner peripheral contour of the locking groove 312 are regularly hexagonal. FIGS. 7-8 show that the outer peripheral contour of the engagement shaft 41 and the inner peripheral contour of the locking groove 312 are trapezoid. It is to be understood that the cross section of the engagement shaft 41 is not limited thereto.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

Specifically, a first end of the first support lug 42 and a first end of the second support lug 43 are disposed to the step 1 or the step bracket 22, and the first support lug 42 and the second support lugs 43 are arranged opposite to each other and spaced apart from each other. The engagement shaft 41 is connected between a second end of the first support lug 42 and a second end of the second support lug 43. The first end of the engagement shaft 41 is connected to the second end of the first support lug 42, and the second end of the engagement shaft 41 is connected to the second end of the second support lug 43. The engagement shaft 41 is configured to engage with or separate from the locking member 3.

It can be understood that the engagement member 4 is not limited to the form of the engagement shaft. In other optional embodiments, as shown in FIG. 9, the engagement member 4 may be configured as an engagement projection 401. Specifically, the engagement projection 401 is coupled to the step 1 or the step bracket 22, and the manner by which the engagement projection 401 is connected to the step 1 or the step bracket 22 is not limited. For example, the engagement projection 401 is detachably mounted to the step 1 or the step bracket 22, or the engagement projection 401 is integrally formed with the step 1 or the step bracket 22.

The locking seat 31 has the locking groove 312, and the engagement projection 401 is configured to engage in or separate from the locking groove 312. Specifically, the step 1 is locked in the retracted position through a clamping force exerted on the engagement projection 401 by the locking groove 312. When the step 1 moves from the retracted position towards the extended position, the engagement projection 401 separates from the locking groove 312 against the clamping force of the locking groove 312.

A vehicle according to some other embodiments of the present disclosure will be described below.

As illustrated in FIGS. 1-9, a vehicle 1000 according to embodiments of the present disclosure includes a vehicle body 200, a step 1, an arm assembly 23, and a locking member 3. The arm assembly 23 is pivotally connected with the vehicle body 200 and the step bracket 22, respectively, so as to drive the step 1 to move between an extended position and a retracted position. In other words, the arm assembly 23 has a first end pivotally connected to a bottom surface 201 of the vehicle body 200 and a second end pivotally connected to the step bracket 22, and the arm assembly 23 is driven by a driving device (such as a motor) to move the step 1 between the extended position and the retracted position.

The locking member 3 is mounted to the vehicle body 200, and the locking member 3 is configured to engage with the step 1 to lock the step 1 in the retracted position and to separate from the step to allow the step 1 to move from the retracted position towards the extended position.

As shown in FIGS. 1-9, a vehicle 1000 according to still another embodiment of the present disclosure includes a step 1, a retractable device 2, and a locking member 3. The step 1 is movable between an extended position and a retracted position. The retractable device 2 is used to drive the step 1 to move between the extended position and the retracted position. The locking member 3 is used to lock the step 1 in the retracted position and allow the step 1 to move away from the retracted position towards the extended position.

A vehicle step apparatus according to some specific embodiments of the present disclosure will be described below.

As shown in FIGS. 1-4, a vehicle step apparatus 100 according to embodiments of the present disclosure includes a step 1, a retractable device 2, and a locking member 3. The retractable device 2 includes a step bracket 22 and an arm assembly 23, and the step 1 is mounted on the step bracket 22. The arm assembly 23 is pivotally connected to the step bracket 22 and is adapted to be pivotally connected with a bottom surface of a vehicle body 200 of the vehicle 1000 to drive the step 1 to move between an extended position and a retracted position. In other words, the arm assembly 23 has a first end adapted to be pivotally connected with the bottom surface 201 of the vehicle body 200 of the vehicle 1000 and a second end pivotally connected with the step bracket 22.

The arm assembly 23 is driven by a driving device (such as a motor) to move the step 1 between the extended position and the retracted position.

The locking member 3 is mounted to the bottom surface 201 of the vehicle body 200, and the locking member 3 is configured to engage with or separate from one of the step 1 and the step bracket 22. In the retracted position, the locking member 3 engages with the one of the step 1 and the step bracket 22 to lock the step 1 in the retracted position. When the step 1 moves from the retracted position towards the extended position, the locking member 3 separates from the one of the step 1 and the step bracket 22.

In other words, in an optional embodiment, the locking member 3 is configured to engage with or separate from the step 1 directly. Specifically, when the step 1 is in the retracted position, the locking member 3 can engage with the step 1 to lock the step 1 in the retracted position; when the step 1 moves from the retracted position towards the extended position, the locking member 3 separates from the step 1. In another optional embodiment, the locking member 3 is configured to engage with or separate from the step bracket 22 to realize the locking or the release of the step 1 by means of the locking member 3. Specifically, when the step 1 is in the retracted position, the locking member 3 can engage with the step bracket 22 to lock the step 1 in the retracted position; and when the step 1 moves from the retracted position towards the extended position, the locking member 3 separates from the step bracket 22.

In some embodiments, in the retracted position, the step 1 abuts against a lower edge of a lateral surface of the vehicle body 200. For example, the step 1 is oriented in the vertical direction and abuts against the lower edge of the lateral surface of the vehicle body 200, whereby the step 1 covers the lower edge of the vehicle body 200.

In some other embodiments, in the retracted position, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role, so as to protect the vehicle body and prevent the vehicle 1000 from being hit or scratched.

In some embodiments, when the step 1 moves from the retracted position towards the extended position, one of the step 1 and the step bracket separates from the locking member 3 against a locking force of the locking member 3. Specifically, in a case where the step 1 is configured to engage with or separate from the locking member 3 directly, the step 1 separates from the locking member 3 against the locking force of the locking member 3 when moving from the retracted position towards the extended position; in a case where the step bracket 22 is configured to engage with or separate from the locking member 3 to realize the locking or the release of the step 1, the step bracket 22 separates from the locking member 3 against the locking force of the locking member 3 when the step 1 moves from the retracted position towards the extended position.

In some embodiments, one of the step 1 and the step bracket 22 has an engagement member 4, and the locking member 3 is configured to engage with or separate from the engagement member 4. In other words, the step 1 has the engagement member 4, or the step bracket 22 has the engagement member 4. When the step 1 moves to the retracted position, the locking member 3 can engage with the engagement member 4 to lock the step 1 in the retracted position. When the step 1 moves away from the retracted position towards the extended position, the locking member 3 separates from the engagement member 4; that is, the locking member 3 releases the step 1 to allow the step 1 to move from the retracted position to the extended position.

As shown in FIG. 1, when the vehicle door 300 is opened, the locking member 3 separates from the engagement member 4, and the retractable device 2 drives the step 1 to move to the extended position, such that people can get on the vehicle by the step 1. As shown in FIG. 2, when the vehicle door 300 is closed, the retractable device 2 drives the step 1 to move towards the retracted position, and when the step 1 moves to the retracted position, the locking member 3 engages with the engagement member 4 to lock the step 1. It can be appreciated that in some embodiments, after the step 1 moves to the retracted position, the locking member 3 engages with the engagement member 4 to lock the step 1, and in some other embodiments, during the movement of the step 1 towards the retracted position, the step 1 gradually enters a position where it is locked by the locking member 3, and when the step 1 reaches the retracted position, the locking member 3 completes the locking of the step 1.

The manner by which the engagement member 4 is connected with the step 1 or the step bracket 22 is not limited to the described embodiments. For example, the engagement member 4 is detachably connected to the step 1 or the step bracket 22, or the engagement member 4 is integrally formed with the step 1 or the step bracket 22. For example, as shown in FIG. 4, the engagement member 4 is coupled to the step 1, and the engagement member 4 is integrally formed with the step 1. When the engagement member 4 is detachably connected to the step 1, the engagement member 4 and the step 1 can be regarded as separate members that are different from each other; when the engagement member 4 is integrally formed with the step 1, the engagement member 4 and the step 1 can be regarded as a whole.

In some specific examples, as shown in FIGS. 4-8, the engagement member 4 includes an engagement shaft 41, and the locking member 3 includes a locking seat 31. The locking seat 31 has a locking groove 312, and the engagement shaft 41 is configured to engage in the locking groove 312 and separate from the locking groove 312.

Specifically, the step 1 is locked in the retracted position by a clamping force exerted on the engagement shaft 41 by the locking groove 312, and when the step 1 moves from the retracted position towards the extended position, the engagement shaft 41 separates from the locking groove 312 against the clamping force of the locking groove 312.

In other words, when the step 1 moves to the retracted position, as shown in FIGS. 6 and 8, the engagement shaft 41 of the engagement member 4 engages in the locking groove 312 of the locking seat 31, and the step 1 is locked in the retracted position by the clamping force exerted on the engagement shaft 41 by the locking groove 312. When the step 1 needs to move from the retracted position towards the extended position, the engagement shaft 41 separates from the locking groove 312 against the locking force of the locking groove 312 to allow the step 1 to move from the retracted position to the extended position, thereby facilitating the movement of the step 1 to the extended position, as shown in FIGS. 5 and 7. It can be understood that during the movement of the step 1 towards the retracted position, when the step 1 reaches a predetermined position, the engagement shaft 41 starts to enter the locking groove 312; as the step 1 further moves towards the retracted position, the engagement shaft 41 gradually enters the locking groove 312; when the step 1 reaches the retracted position, the engagement shaft 41 completely enters the locking groove 312; that is, the engagement shaft 41 fully engages in the locking groove 312, so as to achieve the locking of the step 1. In turn, when the step 1 gradually moves from the retracted position towards the extended position, the engagement shaft 41 gradually comes out of the locking groove 312, and when the step 1 reaches the predetermined position from the retracted position, the engagement shaft 41 completely leaves the locking groove 312, so as to release the step 1.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

Specifically, a first end of the first support lug 42 and a first end of the second support lug 43 are disposed to the step 1 or the step bracket 22, and the first support lug 42 and the second support lugs 43 are arranged opposite to each other and spaced apart from each other. The engagement shaft 41 is connected between a second end of the first support lug 42 and a second end of the second support lug 43. The first end of the engagement shaft 41 is connected to the second end of the first support lug 42, and the second end of the engagement shaft 41 is connected to the second end of the second support lug 42. The engagement shaft 41 is configured to engage with or separate from the locking member 3.

It can be understood that the engagement member 4 is not limited to the form of the engagement shaft. In other optional embodiments, as shown in FIG. 9, the engagement member 4 may be configured as an engagement projection 401. Specifically, the engagement projection 401 is coupled to the step 1 or the step bracket 22, and the manner by which the engagement projection 401 is connected to the step 1 or the step bracket 22 is not limited. For example, the engagement projection 401 is detachably mounted to the step 1 or the step bracket 22, or the engagement projection 401 is integrally formed with the step 1 or the step bracket 22.

The locking seat 31 has the locking groove 312, and the engagement projection 401 is configured to engage in or separate from the locking groove 312. Specifically, the step 1 is locked in the retracted position through a clamping force exerted on the engagement projection 401 by the locking groove 312. When the step 1 moves from the retracted position towards the extended position, the engagement projection 401 separates from the locking groove 312 against the clamping force of the locking groove 312.

A vehicle step apparatus and a vehicle according to some specific embodiments of the present disclosure will be described below with reference to FIGS. 1-3 and 13-20.

As shown in FIGS. 1-3, a vehicle 1000 according to embodiments of the present disclosure includes a vehicle body 200 and a vehicle step apparatus 100, and the vehicle step apparatus 100 is mounted to a bottom surface 201 of the vehicle body 200. In other words, the vehicle step apparatus 100 is mounted to a chassis of the vehicle body 200.

Figure 13:
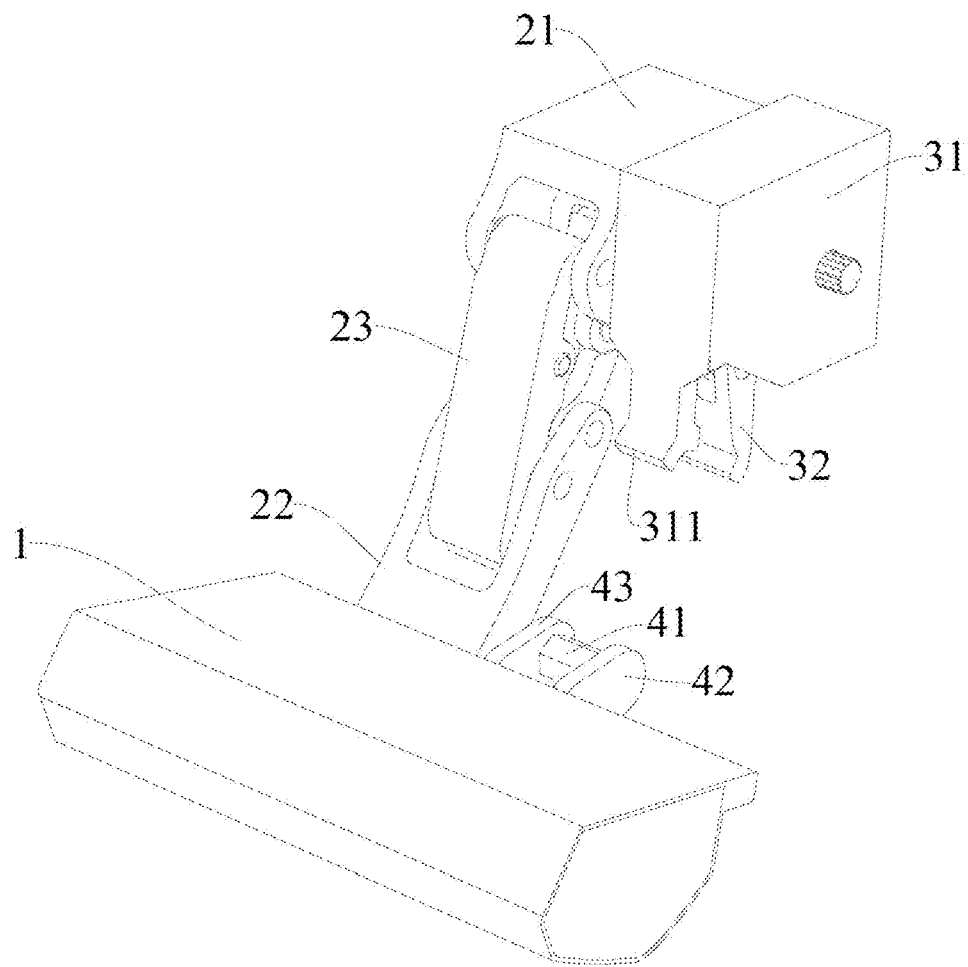
FIG. 13 is a perspective view of a vehicle step apparatus according to yet another embodiment of the present disclosure.
Figure 14:
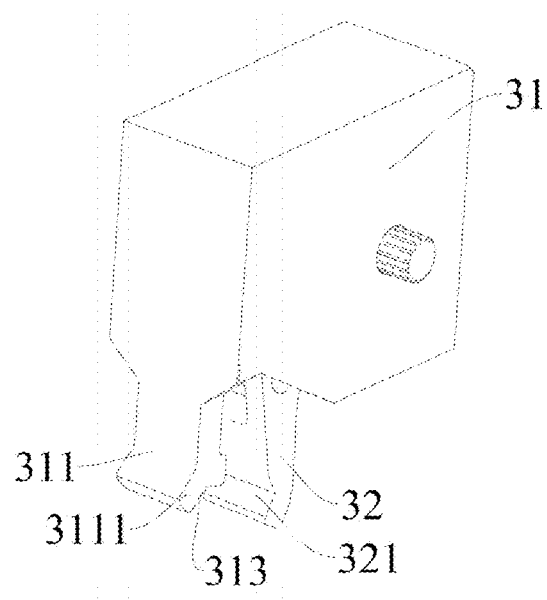
FIG. 14 is a perspective view of a locking member of the vehicle step apparatus shown in FIG. 13.
Figure 15:
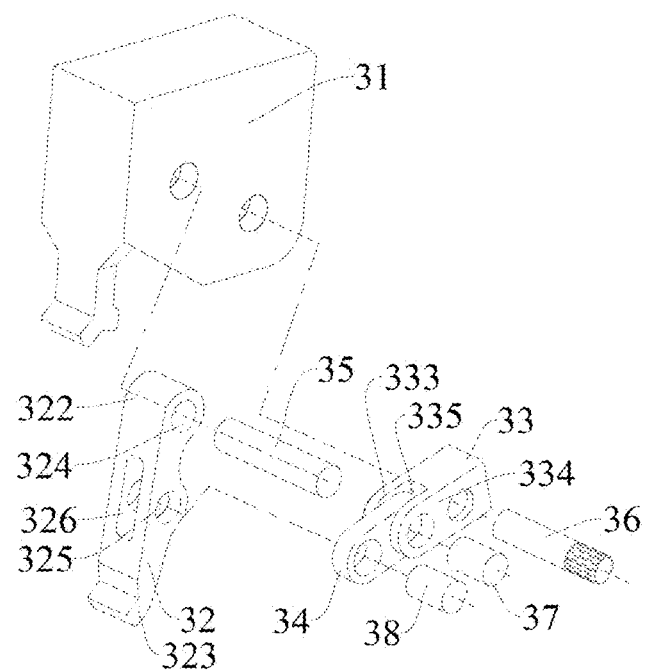
FIG. 15 is an exploded view of the locking member of the vehicle step apparatus shown in FIG. 13.

As shown in FIGS. 13-15, the vehicle step apparatus 100 according to embodiments of the present disclosure includes a step 1, a retractable device 2, a locking seat 31, and a locking swing arm 32, in which the step 1 is movable between an extended position and a retracted position.

The retractable device 2 includes a mounting bracket 21, a step bracket 22, and an arm assembly 23. The step 1 is mounted on the step bracket 22, and the arm assembly 23 is pivotally connected to the mounting bracket 21 and the step bracket 22 to drive the step 1 to move between the extended position and the retracted position. In other words, the arm assembly 23 has a first end pivotally connected to the mounting bracket 21 and a second end pivotally connected to the step bracket 22, and the arm assembly 23 is driven by a driving device (such as a motor) to move the step 1 between the extended position and the retracted position. Specifically, the mounting bracket 21 can be mounted to the bottom surface 201 of the vehicle body 200.

The locking swing arm 32 is swingable between a locking position where the locking swing arm 32 and the locking seat 31 lock the step 1 in the retracted position and a release position where the locking swing arm 32 and the locking seat 31 release the step 1 to enable the step 1 to move from the retracted position towards the extended position.

In some embodiments, the locking swing arm 32 rotates from the locking position to the release position before the step 1 moves away from the retracted position towards the extended position. In other words, before the step 1 needs to move from the retracted position towards the extended position, the locking swing arm 32 first rotates from the locking position to the release position to release the engagement member 4, so that the arm assembly 23 drives the step 1 to move from the retracted position shown in FIG. 18 to the extended position shown in FIG. 16.

Figure 16:
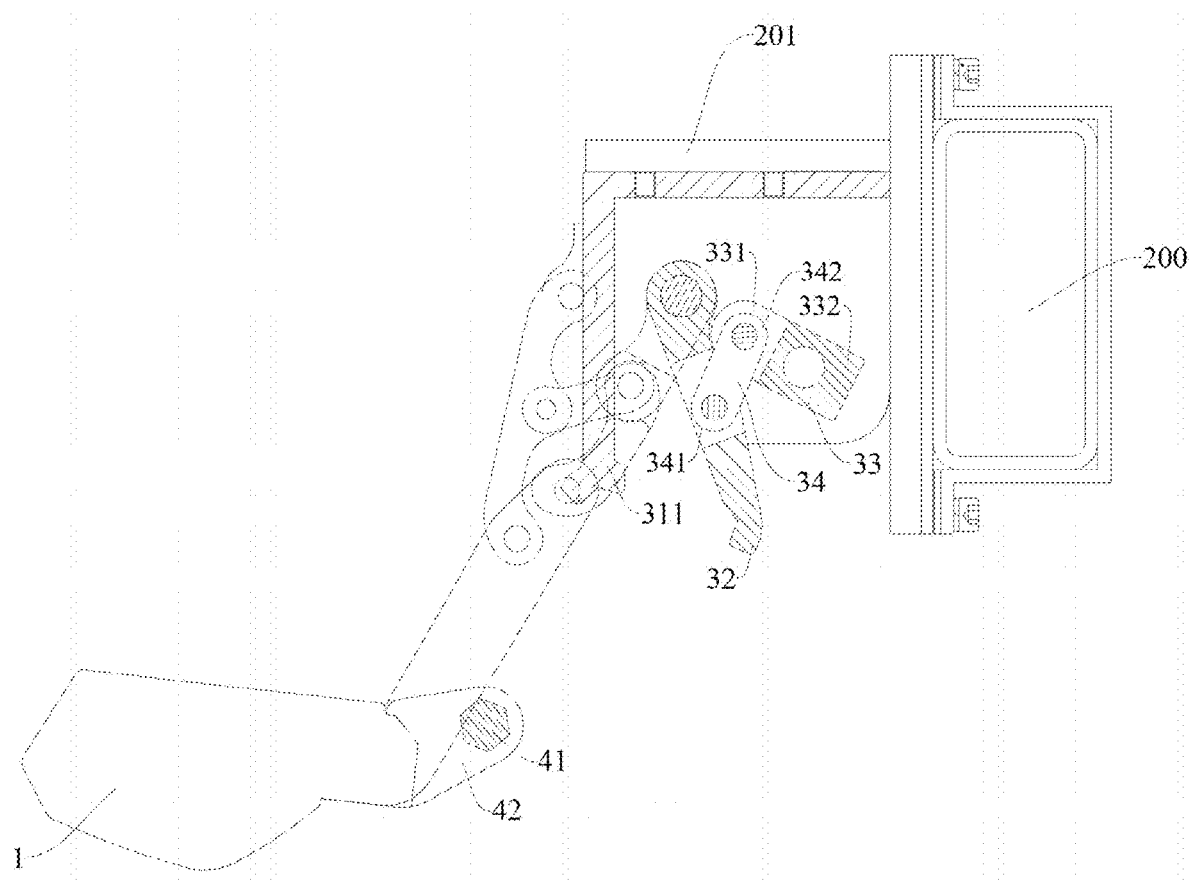
FIG. 16 is a side view of the vehicle step apparatus shown in FIG. 13, in which a step is in an extended position and a locking swing arm is in a maximum release position.
Figure 17:
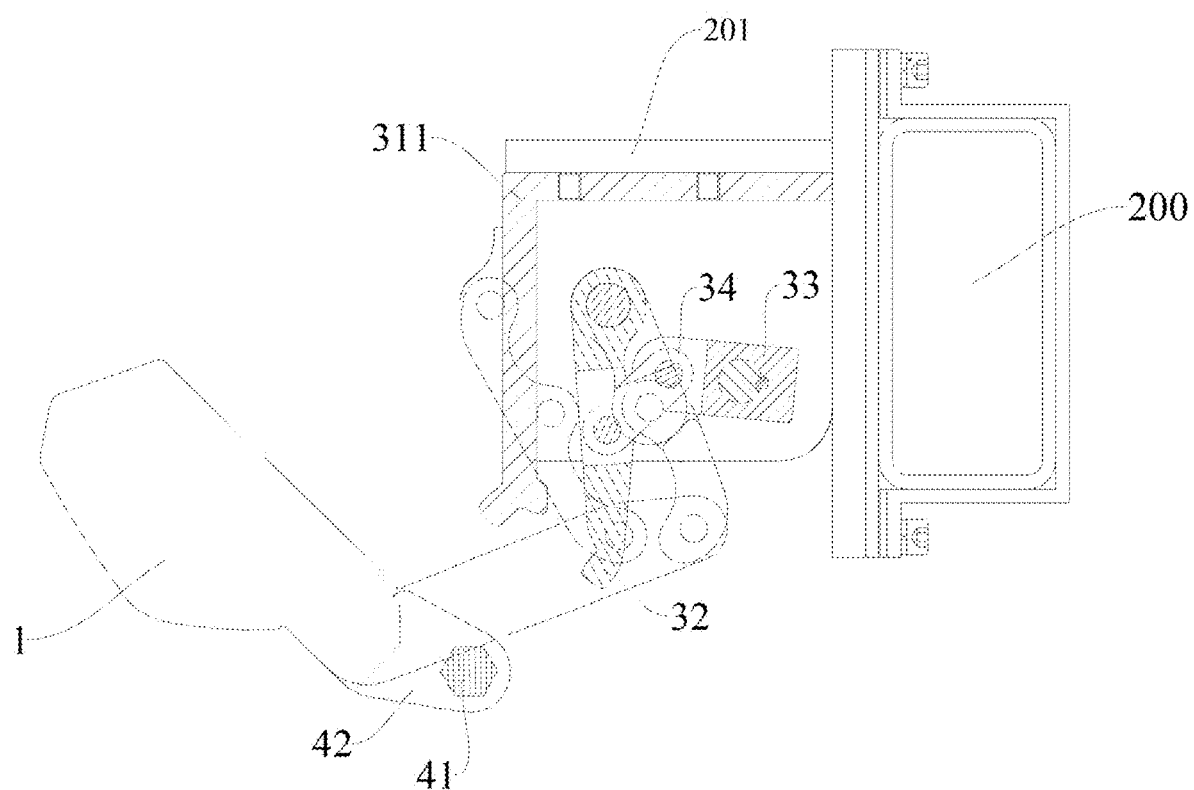
FIG. 17 is a side view of the vehicle step apparatus shown in FIG. 13, in which the step is in an intermediate position between the extended position and a retracted position, and the locking swing arm is in a minimum release position between the maximum release position and a locking position.
Figure 18:
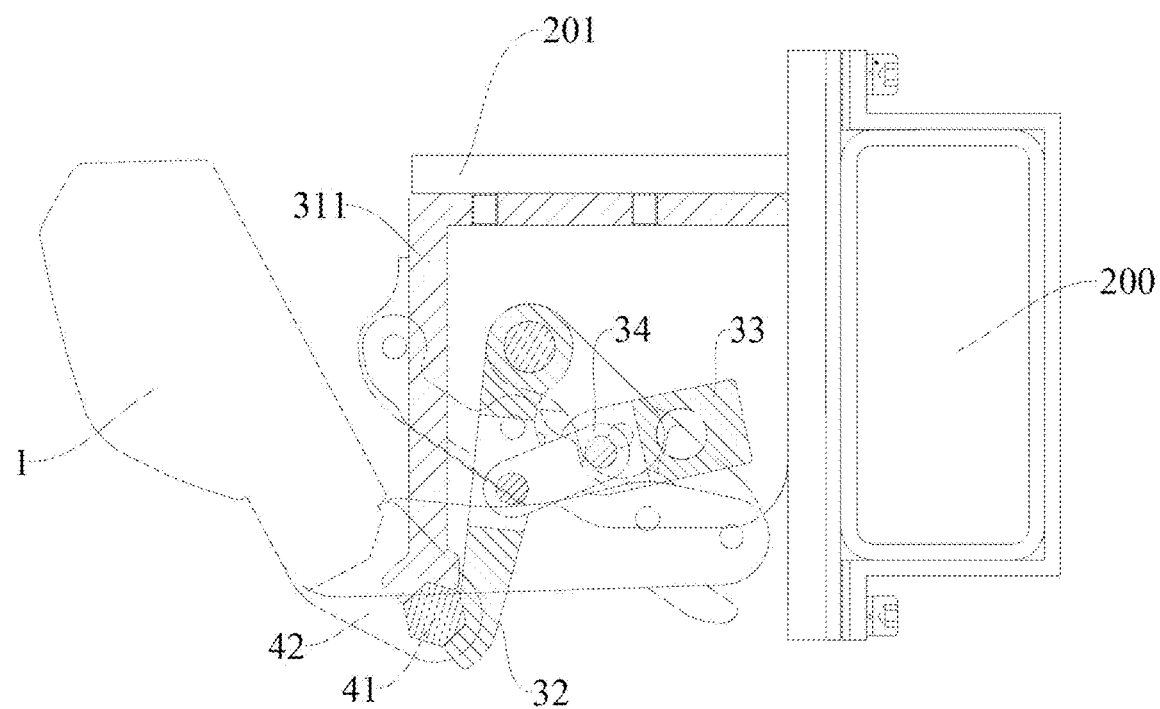
FIG. 18 is a side view of the vehicle step apparatus shown in FIG. 13, in which the step is in the retracted position, and the locking swing arm is in the locking position.

In some embodiments, the release position includes a maximum release position and a minimum release position, and the minimum release position is between the locking position and the maximum release position. Specifically, as shown in FIG. 18, the step 1 is in the retracted position, the locking swing arm 32 is in the locking position, and the locking swing arm 32 and the locking seat 31 clamp the engagement member 4 between the locking swing arm 32 and the locking seat 31 to lock the step 1. As shown in FIG. 17, the locking swing arm 32 rotates rightwards from the locking position to the minimum release position, and the engagement member 4 separates from the clamping of the locking swing arm 32 and the locking seat 31; that is, the engagement member 4 is released, and the step 1 moves to an intermediate position between the extended position and the retracted position. Subsequently, as shown in FIG. 16, the locking swing arm 32 continues rotating rightwards from the minimum release position to the maximum release position, and the step 1 moves from the intermediate position to the extended position.

The rotation of the locking swing arm 32 and the extension-and-retraction movement of the arm assembly 23 have a following relationship therebetween.

In some embodiments, the locking swing arm 32 rotates from the locking position to the minimum release position before the step 1 moves away from the retracted position towards the extended position, and the step 1 is moving from the retracted position to the extended position while the locking swing arm is rotating from the minimum release position to the maximum release position.

In some embodiments, the step 1 further has the intermediate position between the retracted position and the extended position. The locking swing arm 32 rotates from the locking position to the minimum release position before the step 1 moves away from the retracted position towards the extended position. While the locking swing arm 32 rotates from the minimum release position to the maximum release position, the step 1 moves from the retracted position to the intermediate position. During the movement of the step 1 from the intermediate position to the extended position, the locking swing arm 32 keeps stationary in the maximum release position.

It can be understood that besides the movements of the locking swing arm 32 and the step 1, the locking swing arm 32 may also first rotate from the locking position to the minimum release position.

Then, the step 1 moves from the retracted position to the intermediate position; that is, the locking swing arm 32 stays for a period of time after rotating to the minimum release position, and during this period of time, the step 1 moves from the retracted position to the intermediate position. At the end of this period of time, the step 1 is in the intermediate position between the extended position and the retracted position, and the locking swing arm 32 is in the minimum release position between the maximum release position and the locking position, for example, as shown in FIG. 17.

Further, the step 1 moves from the intermediate position to the extended position, and the locking swing arm 32 rotates from the minimum release position to the maximum release position. During this process, the movement of the step 1 and the rotation of the locking swing arm 32 can occur simultaneously, or the step 1 moves first and then the locking swing arm 32 rotates, or the locking swing arm 32 rotates first and then the step 1 moves.

In some embodiments, the step 1 in the retracted position abuts against a lower edge of a lateral surface of the vehicle body 200. For example, the step 1 is oriented in the vertical direction and abuts against the lower edge of the lateral surface of the vehicle body 200, such that the step 1 covers the lower edge of the vehicle body 200. In other embodiments, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role, so as to protect the vehicle body and prevent the vehicle 1000 from being hit or scratched.

In some embodiments, one of the step 1 and the step bracket 22 has an engagement member 4, and in the retracted position, the locking swing arm 32 and the locking seat 31 clamp the engagement member 4 therebetween to lock the step 1. In other words, the step 1 has the engagement member 4 or the step bracket 22 has the engagement member 4, and when the step 1 moves to the retracted position, the engagement member 4 can be clamped by the locking swing arm 32 and the locking seat 31, thereby realizing the locking of the step 1.

The manner by which the engagement member 4 is connected with the step 1 or the step bracket 22 is not limited in the described embodiments. For example, the engage member 4 is detachably connected to the step 1 or the step bracket 22, or the engagement member 4 is integrally formed with the step 1 or the step bracket 22. For example, as shown in FIG. 13, the engagement member 4 is coupled to the step 1, and the engagement member 4 is integrally formed with the step 1. When the engagement member 4 is detachably connected to the step 1, the engagement member 4 and the step 1 can be regarded as separate members that are different from each other; when the engagement member 4 is integrally formed with the step 1, the engagement member 4 and the step 1 can be regarded as a whole.

In some specific embodiments, as shown in FIGS. 13-16, the engagement member 4 includes an engagement shaft 41, and in the retracted position, the locking swing arm 32 and the locking seat 31 clamp the engagement shaft 41 therebetween to lock the step 1.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

In some specific embodiments, as shown in FIGS. 13 and 14, the locking seat 31 has a first snap groove 313, and in the retracted position, the engagement member 4 is locked between the locking swing arm 32 and the first snap groove 313.

In some specific embodiments, the locking swing arm 32 has a second snap groove 321, and in the retracted position, the engagement member 4 is locked between the first snap groove 313 and the second snap groove 321 to lock the step 1 in the retracted position. In other words, the first snap groove 313 and the second snap groove 321 form a locking groove, and the engagement member 4 is configured to engage in or separate from the locking groove.

As shown in FIG. 18, when the locking swing arm 32 rotates to the locking position, the engagement member 4 is clamped between the second snap groove 321 of the locking swing arm 32 and the first snap groove 313 of the locking seat 31, and since the engagement member 4 is locked between the first snap groove 313 and the second snap groove 321, the step 1 is locked in the retracted position. In a specific example, the engagement member 4 includes an engagement shaft 41, and when the locking swing arm 32 rotates to the locking position, the engagement shaft 41 is clamped between the second snap groove 321 and the first snap groove 313, whereby the step 1 is locked in the retracted position.

In some specific embodiments, the locking seat 31 has an extension arm portion 311, and the first snap groove 313 is provided in a free end 3111 of the extension arm portion 311 (a lower end of the extension arm portion 311 as shown in FIG. 14). The locking swing arm 32 has a pivot end 322 (an upper end of the locking swing arm 32 as shown in FIG. 15) and a free end 323 (a lower end of the locking swing arm 32 as shown in FIG. 15). The pivot end of the locking swing arm 32 is pivotally connected with the locking seat 31, and the second snap groove 321 is provided in the free end 323 of the locking swing arm 32.

In some embodiments, as shown in FIGS. 13-14, the first snap groove 313 and the second snap groove 321 are both generally V-shaped, but the shapes of the first snap groove 313 and the second snap groove 321 are not limited thereto as long as the engagement member 4 can be reliably clamped between the first snap groove 313 and the second snap groove 321. In a specific example, the engagement member 4 includes an engagement shaft 41, a portion of an outer peripheral contour of the engagement shaft 41 is matched with an inner peripheral contour of the second snap groove 321, and another portion of the outer peripheral contour of the engagement shaft 41 is matched with an inner peripheral contour of the first snap groove 313, such that the engagement shaft 41 can be better clamped between the first snap groove 313 and the second snap groove 321.

In some embodiments, the engagement shaft 41 has a non-circular cross section, such as a quadrangle, a hexagon or other polygons. FIGS. 13 and 16-18 illustrate that the cross section of the engagement shaft 41 is a regular hexagon. It is to be understood that the cross section of the engagement shaft 41 is not limited thereto.

In some embodiments, as shown in FIGS. 15-18, the locking member 3 further includes a drive rod 33 and a connecting rod 34. The connecting rod 34 has a first end 341 pivotally connected to the locking swing arm 32, and a second end 342 pivotally connected to a first end 331 of the drive rod 33. The drive rod 33 has a second end 332 pivotally connected to the locking seat 31. In this embodiment, the drive rod 33 drives the connecting rod 34 to rotate, such that the connecting rod 34 drives the locking swing arm 32 to swing between the locking position and the minimum release position, and/or swing between the minimum release position and the maximum release position.

In some specific embodiments, the first end 331 of the drive rod 33 is provided with a U-shaped recess 335, and the second end 342 of the connecting rod 34 is fitted in the U-shaped recess 335. Specifically, the drive rod 33 includes a first lug 333 and a second lug 334, each of which extends outwards from a body of the drive rod 33. The first lug 333 and the second lug 334 are arranged opposite to and spaced apart from each other to define the U-shaped recess 335 therebetween, and the second end 342 of the connecting rod 34 extends into the U-shaped recess 335; that is, the second end 342 of the connecting rod 34 is clamped between the first lug 333 and the second lug 334.

In some specific embodiments, a middle portion of the locking swing arm 32 is further provided with a through slot 326, and the first end 341 of the connecting rod 34 is fitted in the through slot 326.

In some specific embodiments, the locking member 3 further includes a first pivot shaft 35, a second pivot shaft 36, a third pivot shaft 37, and a fourth pivot shaft 38. The locking swing arm 32 is pivotally connected with the locking seat 31 through the first pivot shaft 35. The drive rod 33 is pivotally connected with the locking seat 31 through the second pivot shaft 36. The connecting rod 34 is pivotally connected with the drive rod 33 through the third pivot shaft 37 and is pivotally connected with the locking swing arm 32 through the fourth pivot shaft 38.

Further, the locking swing arm 32 has a first swing arm hole 324, and a second swing arm hole 325 in communication with the through slot 326. The first pivot shaft 35 can pass through the first swing arm hole 324 and a hole in the locking seat 31 to pivotally connect the locking swing arm 32 with the locking seat 31. The first end 341 of the connecting rod 34 extends into the through slot 326, and the fourth pivot shaft 38 can pass through the second swing arm hole 325 and a hole in the connecting rod 34 to pivotally connect the locking swing arm 32 with the connecting rod 34.

It can be understood that the engagement member 4 is not limited to the form of the engagement shaft 41. For example, as shown in FIG. 9, the engagement member 4 is configured as an engagement projection 401 that can be clamped between the first snap groove 313 and the second snap groove 321 or can be released from the first snap groove 313 and the second snap groove 321. In some embodiments, the engagement projection 401 can be coupled to the step 1 or can be coupled to the step bracket 22. When the engagement projection 401 is coupled to the step 1, the engagement projection 401 may be detachably connected to the step 1 or may be integrally formed with the step 1. When the engagement projection 401 is coupled to the step bracket 22, the engagement projection 401 may be detachably connected to the step bracket 22 or may be integrally formed with the step bracket 22.

By the swinging of the locking swing arm 32, the engagement projection 401 can be clamped between the first snap groove 313 and the second snap groove 321 and can also separate from the first snap groove 313 and the second snap groove 321. Preferably, a portion of an outer peripheral contour of the engagement projection 401 is matched with the inner peripheral contour of the first snap groove 313, and another portion of the outer peripheral contour of the engagement projection 401 is matched with the inner peripheral contour of the second snap groove 321. When the step 1 moves to the retracted position, the locking swing arm 32 swings to the locking position to clamp the engagement projection 401 between the first snap groove 313 and the second snap groove 321, so as to lock the step 1 in the retracted position. When the step 1 needs to move from the retracted position towards the extended position, the locking swing arm 32 swings to the release position, so as to release the engagement projection 401 from the first snap groove 313 and the second snap groove 321, thereby allowing the step 1 to move away from the retracted position towards the extended position.

In some embodiments, the locking seat 31 is mounted to the mounting bracket 21. In other words, the locking seat 31 can be mounted to the mounting bracket 21, and the locking seat 31 can be regarded as a different component from the mounting bracket 21. In other embodiments, the locking seat 31 is integrally formed with the mounting bracket 21. In other words, the locking seat 31 and the mounting bracket 21 can be considered as an integral component.

As shown in FIGS. 13-20, a vehicle step apparatus 100 according to some other embodiments of the present disclosure includes a step 1, an arm assembly 23, a locking seat 31, and a locking swing arm 32. The arm assembly 23 is used to drive the step 1 to move between an extended position and a retracted position.

The locking swing arm 32 is swingable between a locking position where the locking swing arm 32 and the locking seat 31 lock the step 1 in the retracted position and a release position where the locking swing arm 32 and the locking seat 31 release the step 1 to enable the step 1 to move from the retracted position towards the extended position.

Figure 19:
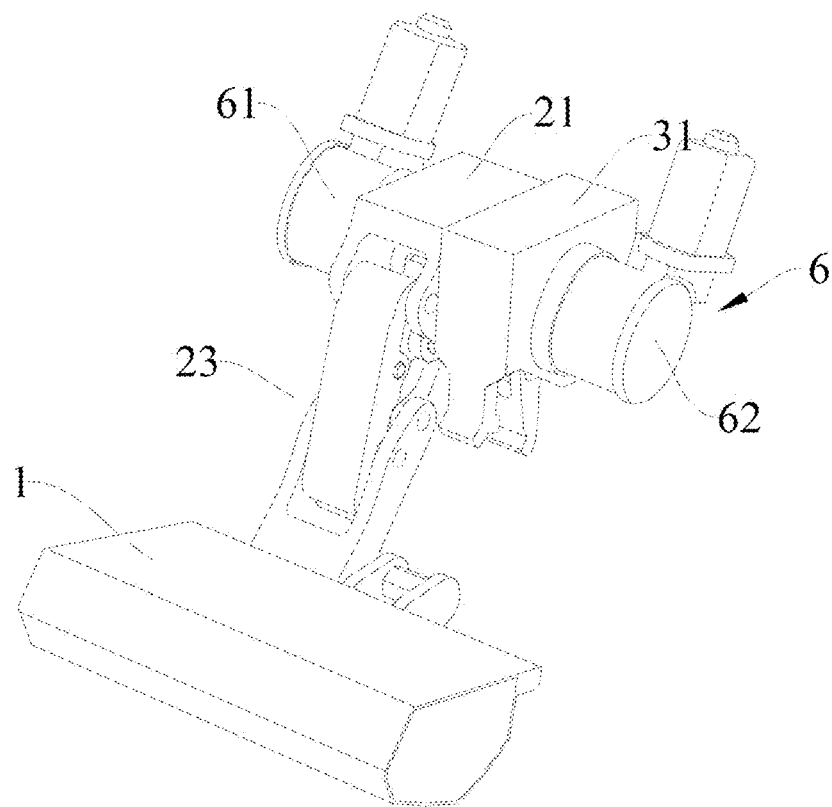
FIG. 19 is a perspective view of the vehicle step apparatus shown in FIG. 13, in which an arm assembly is driven by an extension-and-retraction drive motor, and the locking swing arm is driven by a swing drive motor.
Figure 20:
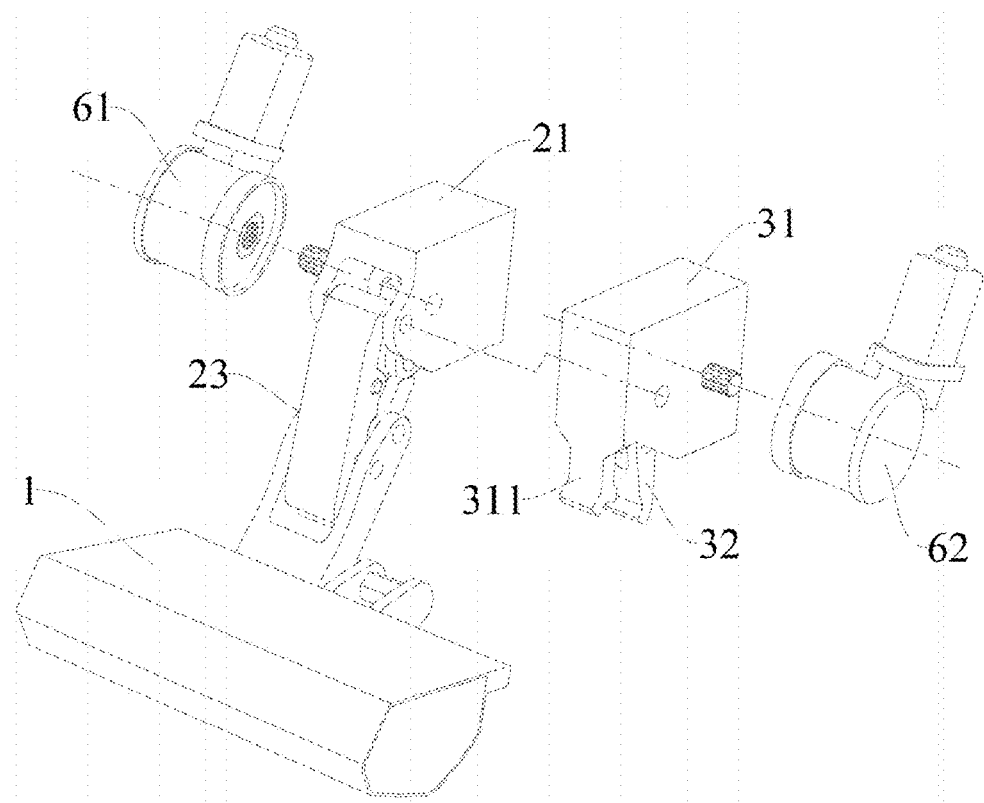
FIG. 20 is an exploded view of the vehicle step apparatus shown in FIG. 19.

In some optional embodiments, as shown in FIGS. 19-20, the arm assembly 23 is driven by an extension-and-retraction drive motor 61 to move the step 1 between the retracted position and the extended position; the locking swing arm 32 is driven by a swing drive motor 62 to swing between the locking position and the release position. In other words, in the vehicle step apparatus 100, the extension-and-retraction movement of the arm assembly 23 and the swinging of the locking swing arm 32 are controlled by different motors. The extension-and-retraction movement of the arm assembly 23 is driven by a motor such as the extension-and-retraction drive motor 61, and the swinging of the locking swing arm 32 is driven by another motor such as the swing drive motor 62.

In some specific embodiments, the extension-and-retraction drive motor 61 and the arm assembly 23 are connected, such that the arm assembly 23 drives the step 1 to move between the retracted position and the extended position under the drive of the extension-and-retraction drive motor 61. It can be understood by those skilled in the art that the extension-and-retraction drive motor 61 is connected to at least one of the first arm 231 and the second arm 232 of the arm assembly 23. In other words, the extension-and-retraction drive motor 61 can be connected to the first arm 231 alone, and the extension-and-retraction drive motor 61 drives the first arm 231 to pivot relative to the mounting bracket 21, thereby driving the step bracket 22 to bring the step 1 to move between the extended position and the retracted position. The extension-and-retraction drive motor 61 can also be connected to the second arm 232 alone, and the extension-and-retraction drive motor 61 drives the second arm 232 to pivot relative to the mounting bracket 21, thereby driving the step bracket 22 to bring the step 1 to move between the extended position and the retracted position. The extension-and-retraction drive motor 61 can also be connected to the first arm 231 and the second arm 232 at the same time, and the extension-and-retraction drive motor 61 drives the first arm 231 and the second arm 232 to pivot, thereby driving the step bracket 22 to bring the step 1 to move between the extended position and the retracted position.

In some specific embodiments, the swing drive motor 62 is connected to the drive rod 33 via the second pivot shaft 36, and the swing drive motor 62 drives the drive rod 33 to pivot relative to the locking seat 31, such that the locking swing arm 32 pivots relative to the locking seat 31 under the drive of the connecting rod 34, so as to swing between the locking position and the release position.

Figure 21:
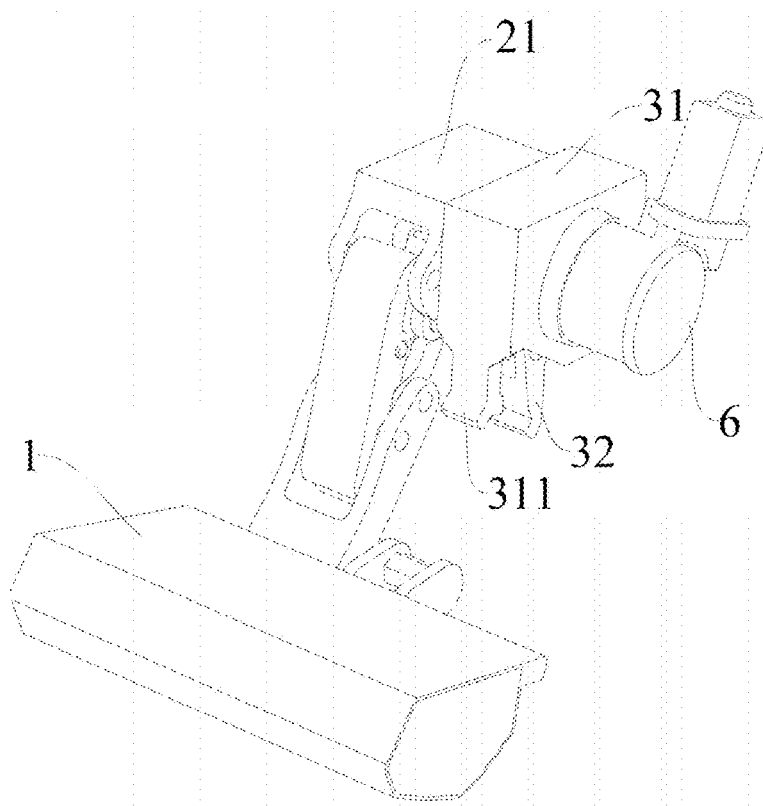
FIG. 21 is a perspective view of the vehicle step apparatus shown in FIG. 13, in which the arm assembly and the locking swing arm are driven by a common drive motor.
Figure 22:
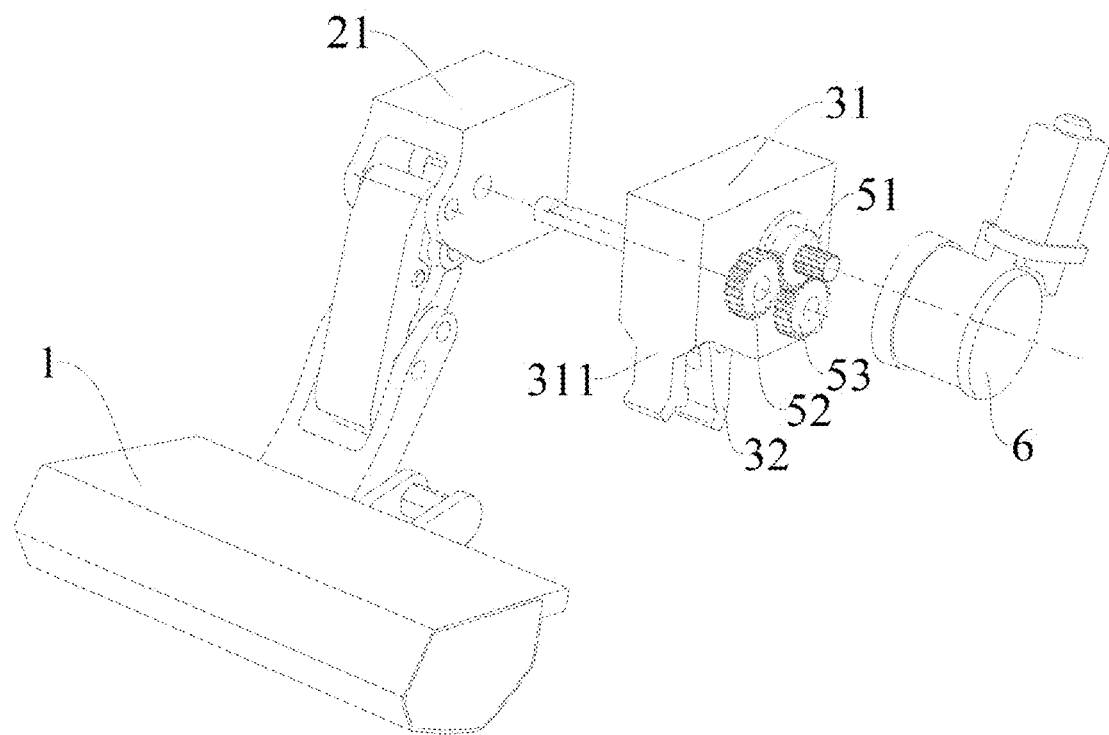
FIG. 22 is an exploded view of the vehicle step apparatus shown in FIG. 21.
Figure 23:
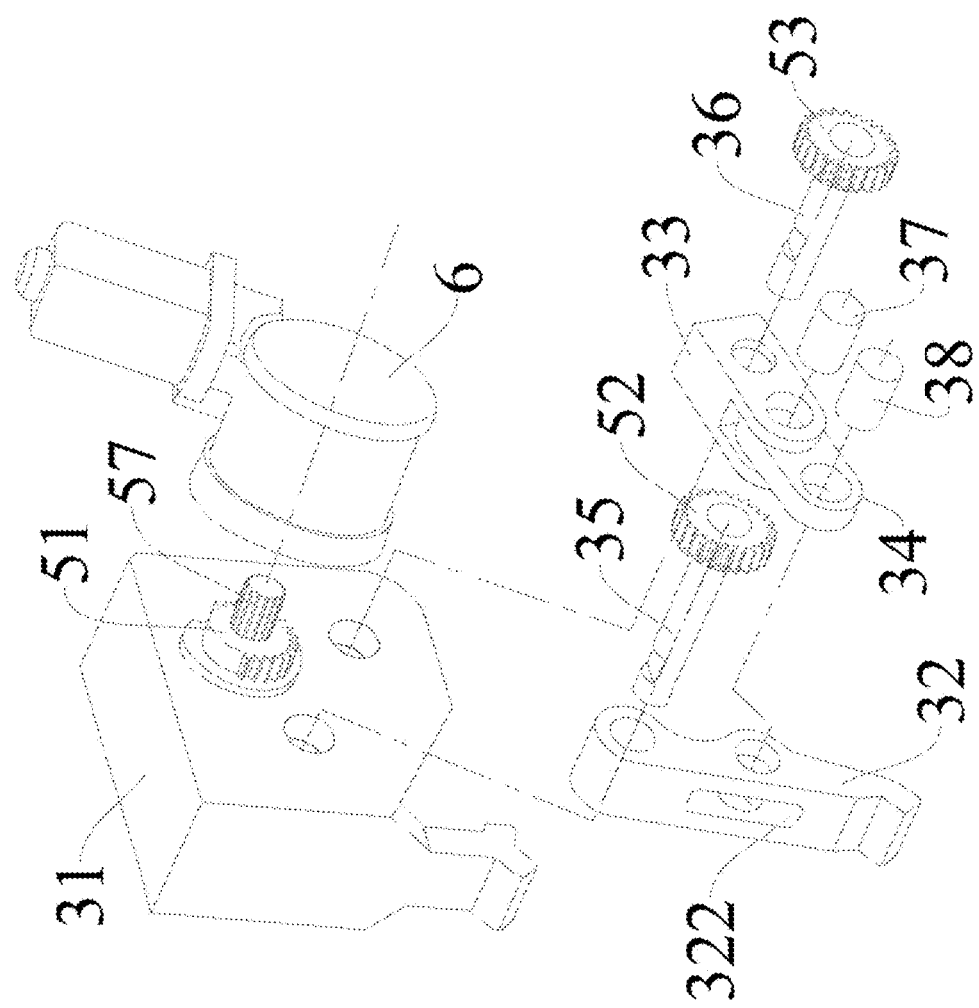
FIG. 23 is an exploded view of a locking member and a transmission device of the vehicle step apparatus shown in FIG. 22.

It can be understood that the manner by which the extension-and-retraction movement of the arm assembly 23 and the swinging of the locking swing arm 32 are driven is not limited to the form of respective control by two motors. For example, in other optional embodiments, as shown in FIGS. 21-23, the arm assembly 23 and the locking swing arm 32 are driven by a single drive motor 6, the single drive motor 6 is connected to the arm assembly 23 to drive the arm assembly 23 to move the step 1 between the extended position and the retracted position, and the single drive motor 6 is connected to the locking swing arm 32 to drive the locking swing arm 32 to swing between the locking position and the release position.

Specifically, the drive motor 6 is connected to both the locking swing arm 32 and the arm assembly 23; that is, the arm assembly 23 and the locking swing arm 32 are driven by the single drive motor 6. The single drive motor 6 drives the step 1 to move between the extended position and the retracted position through the arm assembly 23, and the single drive motor 6 drives the locking swing arm 32 to swing between the locking position and the release position through the drive rod 33 and the connecting rod 34. In some embodiments, the vehicle step apparatus 100 drives the extension-and-retraction movement of the retractable device 2 and the swinging of the locking swing arm 32 by a common motor, thereby improving transmission efficiency.

As shown in FIGS. 13-18, a vehicle 1000 according to some other embodiments of the present disclosure includes a vehicle body 200, a step bracket 22, a step 1, an arm assembly 23, an engagement shaft 41, a locking seat 31, and a locking swing arm 32. The step 1 is mounted on the step bracket 22, and the arm assembly 23 is connected to a bottom surface 201 of the vehicle body 200 and the step bracket 22 to drive the step 1 to move between an extended position and a retracted position. In other words, the arm assembly 23 has a first end connected to the bottom surface 201 of the vehicle body 200, and a second end connected to the step bracket 22, so as to drive the step 1 to move between the extended position and the retracted position.

The engagement shaft 41 is coupled to the step 1 or the step bracket 22. The locking seat 31 has a first snap groove 313, and the locking seat 31 is mounted to the bottom surface 201 of the vehicle body 200. The locking swing arm 32 is swingable between a locking position and a release position. The locking swing arm 32 has a pivot end 322 and a free end 323. The pivot end 322 of the locking swing arm 32 is pivotally connected with the locking seat 31, and the free end 323 of the locking swing arm 32 has a second snap groove 321. In the locking position, the engagement shaft 41 is clamped between the first snap groove 313 and the second snap groove 321 to lock the step 1 in the retracted position. In the release position, the engagement shaft 41 separates from the first snap groove 313 and the second snap groove 321 to allow the step 1 to move from the retracted position towards the extended position.

A vehicle step apparatus according to some specific embodiments of the present disclosure will be described below with reference to FIGS. 13-18 and 21-36.

As shown in FIG. 13, the vehicle step apparatus 100 according to the embodiments of the present disclosure includes a mounting bracket 21, a step bracket 22, a step 1, an arm assembly 23, an engagement shaft 41, a locking seat 31, and a locking swing arm 32. The step 1 is mounted on the step bracket 22 and is movable between an extended position and a retracted position.

The arm assembly 23 is pivotally connected to the mounting bracket 21 and the step bracket 22 to drive the step 1 to move between the extended position and the retracted position. In other words, the arm assembly 23 has a first end pivotally connected to the mounting bracket 21, and a second end pivotally connected to the step bracket 22, and the arm assembly 23 is driven by a driving device (such as a motor) to move the step 1 between the extended position and the retracted position. Specifically, the mounting bracket 21 may be mounted to a bottom surface 201 of the vehicle body 200.

The engagement shaft 41 is coupled to one of the step 1 and the step bracket 22. The locking seat 31 has a first snap groove 313, and the locking seat 31 is connected to the mounting bracket 21, or the locking seat 31 is integrally formed with the mounting bracket 21.

The locking swing arm 32 is swingable between a locking position and a release position, and has a pivot end 322 (an upper end of the locking swing arm 32 as shown in FIG. 15) and a free end 323 (a lower end of the locking swing arm 32 as shown in FIG. 15). The pivot end 322 of the locking swing arm 32 is pivotally connected to the locking seat 31, and the free end 323 of the locking swing arm 32 has a second snap groove 321. In the locking position, the engagement shaft 41 is clamped between the first snap groove 313 and the second snap groove 321 to lock the step 1 in the retracted position. In the release position, the engagement shaft 41 separates from the first snap groove 313 and the second snap groove 321 to allow the step 1 to move from the retracted position towards the extended position.

In some embodiments, the engagement shaft 41 has a non-circular cross section, and a contour of the cross section of the engagement shaft 41 is matched with the first snap groove 313 and the second snap groove 321. For example, the cross section of the engagement shaft 41 is in a shape of a quadrangle, a hexagon, or other polygons. FIGS. 13 and 16-18 illustrate the cross section of the engagement shaft 41 is a regular hexagon. It can be understood that the cross section of the engagement shaft 41 is not limited thereto. A portion of an outer peripheral contour of the engagement shaft 41 is matched with an inner peripheral contour of the second snap groove 321, and another portion of the outer peripheral contour of the engagement shaft 41 is matched with an inner peripheral contour of the first snap groove 313, so that the engagement shaft 41 can be better clamped between the first snap groove 313 and the second snap groove 321.

In some embodiments, the step 1 is provided with a first support lug 42 and a second support lug 43 that are spaced apart from each other. The engagement shaft 41 has a first end connected with the first support lug 42 and a second end connected with the second support lug 43. Specifically, as illustrated in FIG. 13, the first support lug 42 and the second support lug 43 are coupled to a side of the step 1 adjacent to the locking seat 31 and are spaced apart from each other along a length direction of the step 1. The engagement shaft 41 is located between the first support lug 42 and the second support lug 43, the first end of the engagement shaft 41 is connected to a side of the first support lug 42 adjacent to the second support lug 43, and the second end of the engagement shaft 41 is connected to a side of the second support lug 43 adjacent to the first support lug 42.

In some embodiments, the first support lug 42 and the second support lug 43 are detachably connected with or integrally formed with the step 1. In other words, the first support lug 42 is connected to the step 1 and the first support lug 42 is detachable, and the second support lug 43 is connected to the step 1 and is detachable; or, the first support lug 42 and the second support lug 43 are integrally formed with the step 1.

In some embodiments, the vehicle step apparatus 100 further includes a drive rod 33 and a connecting rod 34. The connecting rod 34 has a first end 341 pivotally connected to the locking swing arm 32, and a second end 342 pivotally connected to a first end 331 of the drive rod 33. The drive rod 33 has a second end 332 pivotally connected to the locking seat 31. In this embodiment, the drive rod 33 drives the connecting rod 34 to rotate, such that the connecting rod 34 drives the locking swing arm 32 to swing between the locking position and the minimum release position, and/or swing between the minimum release position and the maximum release position.

In some specific embodiments, the first end 331 of the drive rod 33 is provided with a U-shaped recess 335, and the second end 342 of the connecting rod 34 is fitted in the U-shaped recess 335. Specifically, the drive rod 33 includes a first lug 333 and a second lug 334, each of which extends outwards from a body of the drive rod 33. The first lug 333 and the second lug 334 are arranged opposite to and spaced apart from each other to define the U-shaped recess 335 therebetween, and the second end 342 of the connecting rod 34 extends into the U-shaped recess 335; that is, the second end 342 of the connecting rod 34 is clamped between the first lug 333 and the second lug 334.

In some specific embodiments, a middle portion of the locking swing arm 32 is further provided with a through slot 326, and the first end 341 of the connecting rod 34 is fitted in the through slot 326.

In some specific embodiments, the locking member 3 further includes a first pivot shaft 35, a second pivot shaft 36, a third pivot shaft 37, and a fourth pivot shaft 38. The locking swing arm 32 is pivotally connected with the locking seat 31 through the first pivot shaft 35. The drive rod 33 is pivotally connected with the locking seat 31 through the second pivot shaft 36. The connecting rod 34 is pivotally connected with the drive rod 33 through the third pivot shaft 37 and is pivotally connected with the locking swing arm 32 through the fourth pivot shaft 38.

Further, the locking swing arm 32 has a first swing arm hole 324, and a second swing arm hole 325 in communication with the through slot 326. The first pivot shaft 35 can pass through the first swing arm hole 324 and a hole in the locking seat 31 to pivotally connect the locking swing arm 32 with the locking seat 31. The first end 341 of the connecting rod 34 extends into the through slot 326, and the fourth pivot shaft 38 can pass through the second swing arm hole 325 and a hole in the connecting rod 34 to pivotally connect the locking swing arm 32 with the connecting rod 34.

In some embodiments, as shown in FIGS. 21-23, the arm assembly 23 and the locking swing arm 32 are driven by a single drive motor 6. The single drive motor 6 is connected to the arm assembly 23 to drive the arm assembly 23 to move the step 1 between the extended position and the retracted position, and the single drive motor 6 is connected to the locking swing arm 32 to drive the locking swing arm 32 to swing between the locking position and the release position. Specifically, the drive motor 6 is connected to both of the locking swing arm 32 and the arm assembly 23; that is, the arm assembly 23 and the locking swing arm 32 are driven by the single drive motor 6.

The single drive motor 6 drives the step 1 to move between the extended position and the retracted position through the arm assembly 23. It can be understood by those skilled in the art that the drive motor 6 is connected with at least one of the first arm 231 and the second arm 232 of the arm assembly 23. In other words, the drive motor 6 can be connected to the first arm 231 alone, and the drive motor 6 drives the first arm 231 to pivot relative to the mounting bracket 21, thereby driving the step bracket 22 to bring the step 1 to move between the extended position and the retracted position. The drive motor 6 can also be connected to the second arm 232 alone, and the drive motor 6 drives the second arm 232 to pivot relative to the mounting bracket 21, thereby driving the step bracket 22 to bring the step 1 to move between the extended position and the retracted position. The drive motor 6 can also be connected to both the first arm 231 and the second arm 232 at the same time, and the drive motor 6 drives the first arm 231 and the second arm 232 to pivot, thereby driving the step bracket 22 to bring the step 1 to move between the extended position and the retracted position.

Moreover, the single drive motor 6 drives the locking swing arm 32 to swing between the locking position and the release position by the drive rod 33 and the connecting rod 34. In some embodiments, the vehicle step apparatus 100 drives the extension-and-retraction movement of the retractable device 2 and the swinging of the locking swing arm 32 by a common motor, thereby improving the transmission efficiency.

In some embodiments, as illustrated in FIGS. 24-36, the vehicle step apparatus 100 further includes a transmission device 5 through which the single drive motor 6 can drive the drive rod 33 and the locking swing arm 32 separately. The transmission device 5 includes a driving gear 51, a first driven gear 52, and a second driven gear 53, and the driving gear 51 has a toothed section 511 and a toothless section 512.

The first driven gear 52 can be driven by the driving gear 51 and connected to the arm assembly 23, and the second driven gear 53 can be driven by the driving gear 51 and connected to the locking swing arm 32. The drive motor 6 drives the arm assembly 23 through the driving gear 51 and the first driven gear 52, to enable the step 1 to move between the extended position and the retracted position. The drive motor 6 drives the locking swing arm 32 to swing between the locking position and the release position through the driving gear 51 and the second driven gear 53. It can be understood that the second driven gear 53 drives the drive rod 33 to rotate to bring the locking swing arm 32 to swing between the locking position and the release position.

In some optional embodiments, as shown in FIGS. 24-31, the toothed section 511 of the driving gear 51 alternately meshes with the first driven gear 52 and the second driven gear 53 to alternately drive the first driven gear 52 and the second driven gear 53 to rotate. In other words, the toothed section 511 of the driving gear 51 does not mesh with the first driven gear 52 and the second driven gear 53 at the same time, and instead, meshes with one driven gear only after disengaging from the other driven gear.

Figure 24:
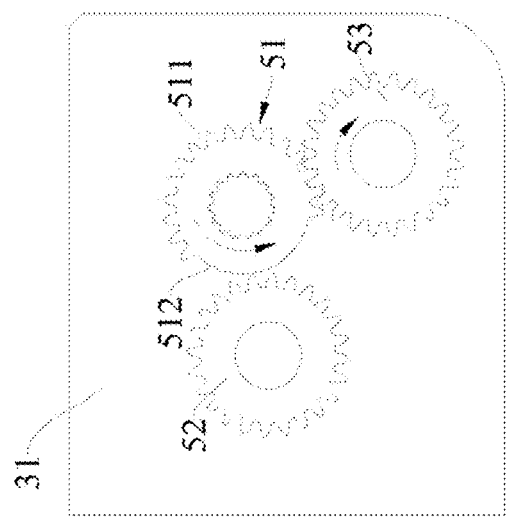
FIG. 24 is a schematic view of a transmission device according to an embodiment of the present disclosure, in which a driving gear is in a first rotation position and rotates towards a second rotation position in a counterclockwise direction.
Figure 25:
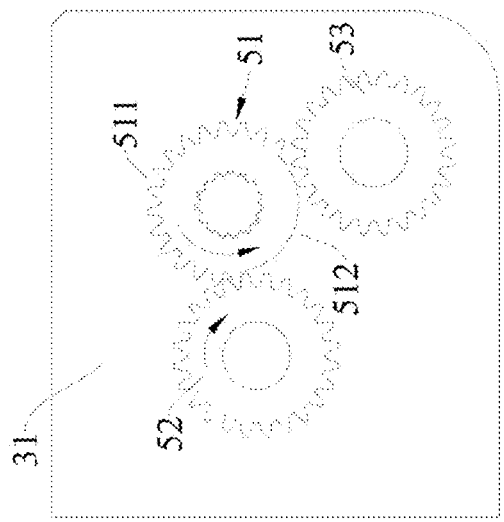
FIG. 25 is a schematic view of the transmission device shown in FIG. 24, in which the driving gear rotates from the first rotation position to an intermediate rotation position.
Figure 26:
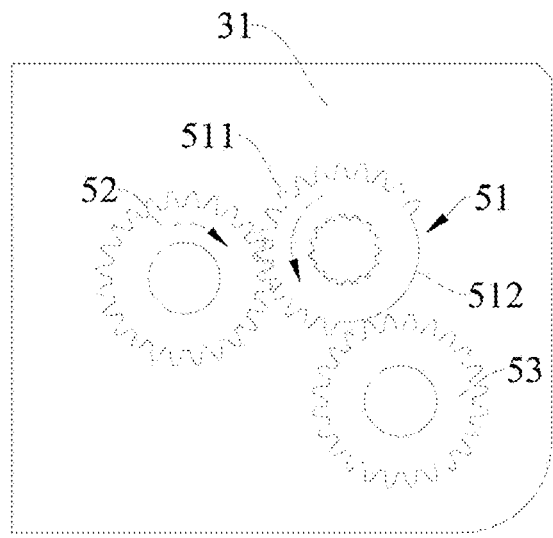
FIG. 26 is a schematic view of the transmission device shown in FIG. 24, in which the driving gear rotates from the intermediate rotation position to the second rotation position.

In some other optional embodiments, as shown in FIGS. 24-26 and 32, the driving gear 51 has a first rotation position (a position of the driving gear 51 as shown in FIG. 24 and "A" position shown in FIG. 32), a second rotation position (a position of the driving gear as shown in FIG. 26 and "B" position shown in FIG. 32), and a third rotation position ("C" position shown in FIG. 32) between the first rotation position and the second rotation position. The driving gear 51 is reciprocally rotatable between the first rotation position and the second rotation position.

In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52, in which way the locking swing arm 32 is driven to move from the locking position towards the release position.

When the driving gear 51 rotates to the third rotation position along the first direction, the toothed section 511 of the driving gear 51 starts to mesh with the first driven gear 52, so as to start to drive the step 1 to move from the retracted position towards the extended position. In a process where the driving gear 51 rotates from the third rotation position to the second rotation position along the first direction, the toothed section 511 of the driving gear 51 meshes with the second driven gear 53 and the first driven gear 52 at the same time, thereby driving the locking swing arm 32 to move towards the release position while driving the step 1 to move towards the extended position.

In still other optional embodiments, as shown in FIGS. 24-26 and 33, the driving gear 51 has a first rotation position (a position of the driving gear 51 as shown in FIG. 24 and "A" position shown in FIG. 33), a second rotation position (a position of the driving gear as shown in FIG. 26 and "B" position shown in FIG. 33), a third rotation position ("C" position shown in FIG. 33) between the first rotation position and the second rotation position, and a fourth rotation position ("D" position shown in FIG. 33) between the third rotation position and the second rotation position. The driving gear 51 is reciprocally rotatable between the first rotation position and the second rotation position.

In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52, in which way the locking swing arm 32 is driven to move from the locking position towards the release position.

When the driving gear 51 rotates to the third rotation position along the first direction, the toothed section 511 of the driving gear 51 starts to mesh with the first driven gear 52, so as to start to drive the step 1 to move from the retracted position towards the extended position. Before the driving gear 51 rotates from the third rotation position to the fourth rotation position along the first direction, the toothed section 511 of the driving gear 51 meshes with the second driven gear 53 and the first driven gear 52 at the same time, thereby driving the locking swing arm 32 to move towards the release position while driving the step 1 to move towards the extended position.

When the driving gear 51 rotates to the fourth rotation position along the first direction, the toothed section 511 of the driving gear 51 starts to disengage from the second driven gear 53, and the locking swing arm 32 rotates to the release position.

In a process where the driving gear 51 rotates from the fourth rotation position to the second rotation position along the first direction, the toothed section 511 of the driving gear 51 meshes with the first driven gear 52, and the toothless section 512 and the driving gear 51 face the second driven gear 53, to continue to drive the step 1 to move towards the extended position.

Figure 34:
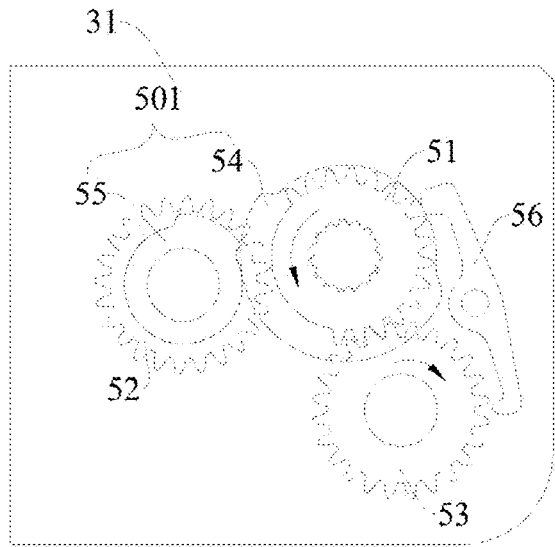
FIG. 34 is a schematic view of a transmission device according to an embodiment of the present disclosure, in which a driving gear is in a first rotation position and rotates towards a second rotation position in a counterclockwise direction, and a driving cam stops a driven cam.
Figure 35:
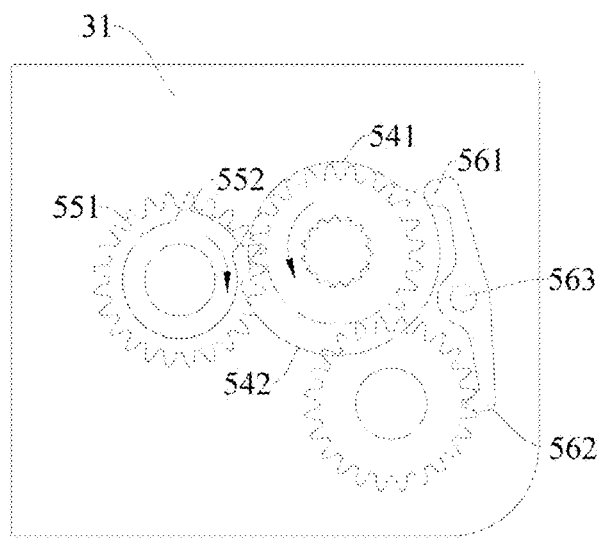
FIG. 35 is a schematic view of the transmission device shown in FIG. 34, in which the driving gear rotates from the first rotation position to an intermediate rotation position.
Figure 36:
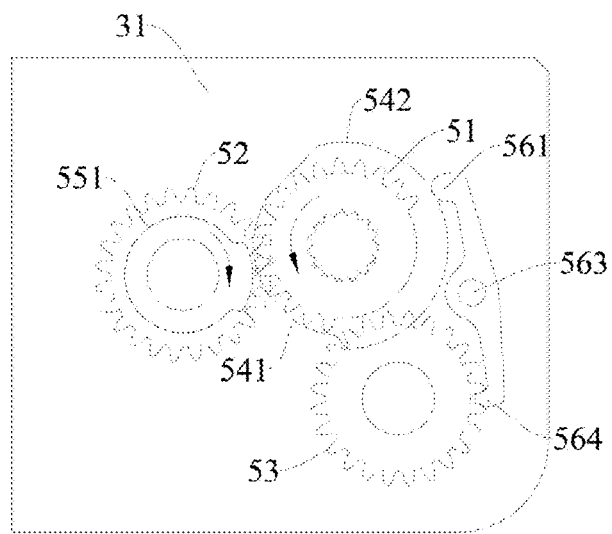
FIG. 36 is a schematic view of the transmission device shown in FIG. 34, in which the driving gear rotates from the intermediate rotation position to the second rotation position, and in the second rotation position, a stopping swing rod stops a second driven gear.

In some specific embodiments, as shown in FIGS. 34-36, the vehicle step apparatus 100 further includes a driving cam 54, a driven cam 55, and a stopping swing rod 56. The driving cam 54 is connected to the driving gear 51, and the driving cam 54 can rotate along with the driving gear 51. The driven cam 55 is connected to the first driven gear 52, and the driven cam 55 can rotate along with the first driven gear 52. The stopping swing rod 56 has a first end 561, a second end 562, and a pivoting portion 563. The pivoting portion 563 is located between the first end 561 of the stopping swing rod 56 and the second end 562 of the stopping swing rod 56. The stopping swing rod 56 is swingable around the pivoting portion 563.

When the toothed section 511 of the driving gear 51 meshes with the first driven gear 52, the driving cam 54 drives the second end 562 of the stopping swing rod 56 to engage with the second driven gear 53 to stop the second driven gear 53 from rotating, and the driving cam 54 releases the driven cam 55 to allow the first driven gear 52 to rotate.

When the toothed section 511 of the driving gear 51 meshes with the second driven gear 53, the driving cam 54 drives the second end 562 of the stopping swing rod 56 to separate from the second driven gear 53 to allow the second driven gear 53 to rotate, and the driving cam 54 stops the driven cam 55 to stop the first driven gear 52 from rotating.

Further, when the driving gear 51 meshes with the first driven gear 52, as shown in FIGS. 35-36, the first end 561 of the stopping swing rod 56 abuts against a distal rest arc segment 542 of the driving cam 54, such that the second end 562 of the stopping swing rod 56 engages with the second driven gear 53 to stop the second driven gear 53 from rotating, and a distal rest arc segment 552 of the driven cam 55 faces a proximal rest arc segment 541 of the driving cam 54.

In other words, when the driving gear 51 meshes with the first driven gear 52, the driving gear 51 drives the first driven gear 52 to rotate, and the driving cam 54 rotates together with the driving gear 51. The proximal rest arc segment 541 of the driving cam 54 faces the driven cam 55 and is spaced apart from the driven cam 55; that is, the driving cam 54 cannot restrain the movement of the driven cam 55, and the driven cam 55 can rotate together with the first driven gear 52. At the same time, the distal rest arc segment 542 of the driving cam 54 faces the first end 561 of the stopping swing rod 56, and the first end 561 of the stopping swing rod 56 abuts against the distal rest arc segment 542 of the driving cam 54. Since the stopping swing rod 56 can swing relative to the pivoting portion 563, the second end 562 of the stopping swing rod 56 approaches the second driven gear 53, and the second end 562 of the stopping swing rod 56 can engage with the second driven gear 53 to stop the second driven gear 53 from rotating.

When the toothed section 511 of the driving gear 51 meshes with the second driven gear 53, as shown in FIG. 34, the distal rest arc segment 552 of the driven cam 55 abuts against the distal rest arc segment 542 of the driving cam 54; that is, the distal rest arc segment 542 of the driving cam 54 stops the distal rest arc segment 552 of the driven cam 55, to stop the first driven gear 52 from rotating. The first end 561 of the stopping swing rod 56 abuts against the proximal rest arc segment 541 of the driving cam 54 to enable the second end 562 of the stopping swing rod 56 to separate from the second driven gear 53.

In other words, the driving cam 54 has the proximal rest arc segment 541 and the distal rest arc segment 542. The driven cam 55 has a proximal rest arc segment 551 and the distal rest arc segment 552. When the driving gear 51 meshes with the second driven gear 53, as shown in FIG. 34, the driving gear 51 drives the second driven gear 53 to rotate, the driving cam 54 rotates together with the driving gear 51, and the distal rest arc segment 542 of the driving cam 54 abuts against the driven cam 55 to stop the driven cam 55 from rotating, so as to stop the first driven gear 52 from rotating. At the same time, the proximal rest arc segment 541 of the driving cam 54 faces the first end 561 of the stopping swing rod 56, and the first end 561 of the stopping swing rod 56 abuts against the proximal rest arc segment 541 of the driving cam 54. Since the stopping swing rod 56 can swing relative to the pivoting portion 563, the second end 562 of the stopping swing rod 56 moves away from the second driven gear 53 to separate from the second driven gear 53.

In some embodiments, the driving gear 51 is integrally formed with the driving cam 54, and the first driven gear 52 is integrally formed with the driven cam 55. It can be understood that the driving gear 51 and the driving cam 54 may be two components independent of each other, and the first driven gear 52 and the driven cam 55 may be two components independent of each other.

In some specific embodiments, the transmission device 5 further includes a driving gear shaft 57, a first driven gear shaft 35, and a second driven gear shaft 36. The driving gear shaft 57 is mounted to the locking seat 31 and connected with the drive motor 6, and the driving gear 51 is mounted to the driving gear shaft 57.

The first driven gear shaft 35 is configured as a first pivot shaft 35 connecting the locking swing arm 32 with the locking seat 31. A first end of the first driven gear shaft 35 is connected to the arm assembly 23, and the first driven gear 52 is mounted to a second end of the first driven gear shaft 35. Thus, the first driven gear shaft 35 passes through the locking swing arm 32 and the locking seat 31 to be connected to the first arm 231 and/or the second arm 232 of the arm assembly 23, such that the arm assembly 23 is driven by the first driven gear 52 to extend and retract.

The second driven gear shaft 36 is configured as a second pivot shaft 36 connecting the locking seat 31 with the drive rod 33. A first end of the second driven gear shaft 36 is connected to the drive rod 33, and the second driven gear 53 is mounted to a second end of the second driven gear shaft 36. Thus, the second driven gear 53 is connected to the drive rod 33 through the second pivot shaft 36, such that the second driven gear 53 drives the drive rod 33 to rotate, so as to drive the locking swing arm 32 to swing.

It can be appreciated that the manner by which the extension-and-retraction movement of the arm assembly 23 and the swinging of the locking swing arm 32 are driven is not limited to the form of being driven by the single drive motor 6. For example, in other optional embodiments, as shown in FIGS. 19-20, the arm assembly 23 is driven by an extension-and-retraction drive motor 61, and the locking swing arm 32 is driven by a swing drive motor 62, in which the extension-and-retraction drive motor 61 drives the step 1 to move between the retracted position and the extended position through the arm assembly 23, and the swing drive motor 62 drives the locking swing arm 32 to swing between the locking position and the release position through the drive rod 33 and the connecting rod 34.

A vehicle step apparatus according to some specific embodiments of the present disclosure will be described below with reference to FIGS. 13-18 and 21-36.

As shown in FIGS. 13-15 and 21-26, a vehicle step apparatus 100 according to embodiments of the present disclosure includes a step 1, a retractable device 2, a locking seat 31, a swing arm assembly, a transmission device 5, and a single drive motor 6. The step 1 is movable between an extended position and a retracted position.

As shown in FIGS. 13-15, the retractable device 2 includes a mounting bracket 21, a step bracket 22, and an arm assembly 23. The step 1 is mounted on the step bracket 22, and the arm assembly 23 is pivotally connected to the mounting bracket 21 and the step bracket 22, to drive the step 1 to move between the extended position and the retracted position. In other words, the arm assembly 23 has a first end pivotally connected to the mounting bracket 21 and a second end pivotally connected to the step bracket 22, and the arm assembly 23 is driven by a driving device (such as a motor) to move the step 1 between the extended position and the retracted position. Specifically, the mounting bracket 21 can be mounted to a bottom surface 201 of the vehicle body 200.

The swing arm assembly includes a locking swing arm 32, a connecting rod 34, and a drive rod 33. The connecting rod 34 has a first end 341 pivotally connected to the locking swing arm 32, and a second end 342 pivotally connected to a first end 331 of the drive rod 33. The drive rod 33 has a second end 332 pivotally connected to the locking seat 31. The drive rod 33 drives, through the connecting rod 34, the locking swing arm 32 to swing between a locking position and a release position. In the locking position, the locking swing arm 32 and the locking seat 31 lock the step 1 in the retracted position. In the release position, the locking swing arm 32 and the locking seat 31 release the step 1 to enable the step 1 to move from the retracted position towards the extended position.

As shown in FIGS. 24-26, the transmission device 5 includes a driving gear 51, a first driven gear 52, and a second driven gear 53. The first driven gear 52 can be driven by the driving gear 51 and connected to the arm assembly 23, to drive the arm assembly 23 to bring the step 1 to move between the extended position and the retracted position. The second driven gear 53 can be driven by the driving gear 51 and connected to the drive rod 33, to drive, through the drive rod 33, the locking swing arm 32 to swing between the locking position and the release position.

As shown in FIGS. 21-23, the drive motor 6 is connected to the driving gear 51 to drive the arm assembly 23 through the driving gear 51 and the first driven gear 52, and to drive the drive rod 33 through the driving gear 51 and the second driven gear 53. In other words, by means of the transmission device 5, the drive motor 6 can drive the arm assembly 23 to move the step 1 between the extended position and the retracted position, and can also drive the drive rod 33 to enable the locking swing arm 32 to swing between the locking position and the release position.

In some embodiments, the locking swing arm 32 rotates from the locking position to the release position before the step 1 moves away from the retracted position towards the extended position. In other words, before the step 1 needs to move from the retracted position towards the extended position, the locking swing arm 32 first rotates from the locking position to the release position to release the engagement member 4, so that the arm assembly 23 drives the step 1 to move from the retracted position as shown in FIG. 18 to the extended position as shown in FIG. 16.

In some embodiments, the release position includes a maximum release position and a minimum release position, and the minimum release position is between the locking position and the maximum release position. Specifically, as shown in FIG. 18, the step 1 is in the retracted position, the locking swing arm 32 is in the locking position, and the locking swing arm 32 and the locking seat 31 clamp the engagement member 4 between the locking swing arm 32 and the locking seat 31 to lock the step 1. As shown in FIG. 17, the locking swing arm 32 rotates rightwards from the locking position to the minimum release position, and the engagement member 4 separates from the clamping of the locking swing arm 32 and the locking seat 31; that is, the engagement member 4 is released, and the step 1 moves to an intermediate position between the extended position and the retracted position. Subsequently, as shown in FIG. 16, the locking swing arm 32 continues rotating rightwards from the minimum release position to the maximum release position, and the step 1 moves from the intermediate position to the extended position.

The relationship between the rotation of the locking swing arm 32 and the extension-and-retraction movement of the arm assembly 23 is presented as follows.

In some embodiments, the locking swing arm 32 rotates from the locking position to the minimum release position before the step 1 moves away from the retracted position towards the extended position, and the step 1 is moving from retracted position to the extended position while the locking swing arm is rotating from the minimum release position to the maximum release position.

In some embodiments, the step 1 further has the intermediate position between the retracted position and the extended position. The locking swing arm 32 rotates from the locking position to the minimum release position before the step 1 moves away from the retracted position towards the extended position. While the locking swing arm 32 rotates from the minimum release position to the maximum release position, the step 1 moves from the retracted position to the intermediate position. During the movement of the step 1 from the intermediate position to the extended position, the locking swing arm 32 keeps stationary in the maximum release position.

It can be understood that besides the movements of the locking swing arm 32 and the step 1, the locking swing arm 32 may also first rotate from the locking position to the minimum release position.

Then, the step 1 moves from the retracted position to the intermediate position; that is, the locking swing arm 32 rotates to the minimum release position and stays for a period of time, and during this period of time, the step 1 moves from the retracted position to the intermediate position. At the end of this period of time, the step 1 is in the intermediate position between the extended position and the retracted position, and the locking swing arm 32 is in the minimum release position between the maximum release position and the locking position, for example, as shown in FIG. 17.

Further, the step 1 moves from the intermediate position to the extended position, and the locking swing arm 32 rotates from the minimum release position to the maximum release position. During this process, the movement of the step 1 and the rotation of the locking swing arm 32 can occur simultaneously, or the step 1 can move first and then the locking swing arm 32 rotates, or the locking swing arm 32 can rotate first and then the step 1 moves.

As illustrated in FIGS. 13-15 and 21-26, a vehicle step apparatus 100 according to some other embodiments of the present disclosure includes a step 1, an arm assembly 23, a locking seat 31, a locking swing arm 32, a connecting rod 34, a drive rod 33, a transmission device 5, and a single drive motor 6. The arm assembly 23 is used to drive the step 1 to move between an extended position and a retracted position.

The locking swing arm 32 is swingable between a locking position where the locking swing arm 32 and the locking seat 31 lock the step 1 in the retracted position and a release position where the locking swing arm 32 and the locking seat 31 release the step 1 to enable the step 1 to move from the retracted position towards the extended position.

The connecting rod 34 has a first end 341 pivotally connected to the locking swing arm 32. The drive rod 33 has a first end 331 pivotally connected to a second end 342 of the connecting rod 34, and a second end 332 pivotally connected to the locking seat 31. The drive rod 33 drives the locking swing arm 32 to swing by the connecting rod 34.

As shown in FIGS. 24-26, the transmission device 5 includes a driving gear 51, a first driven gear 52, and a second driven gear 53. The first driven gear 52 can be driven by the driving gear 51 and connected to the arm assembly 23, to drive the arm assembly 23 to bring the step 1 to move between the extended position and the retracted position. The second driven gear 53 can be driven by the driving gear 51 and connected to the drive rod 33, to drive, through the drive rod 33, the locking swing arm 32 to swing between the locking position and the release position.

As shown in FIGS. 21-23, the drive motor 6 is connected to the driving gear 51, so as to drive the arm assembly 23 through the driving gear 51 and the first driven gear 52, and also to drive the drive rod 33 through the driving gear 51 and the second driven gear 53. In other words, by means of the transmission device 5, the drive motor 6 can drive the arm assembly 23 to move the step 1 between the extended position and the retracted position, and can also drive the drive rod 33 to enable the locking swing arm 32 to swing between the locking position and the release position.

In some specific embodiments, as shown in FIG. 23, the transmission device 5 further includes a driving gear shaft 57, a first driven gear shaft 35, and a second driven gear shaft 36. The driving gear shaft 57 is mounted to the locking seat 31 and connected with the drive motor 6, and the driving gear 51 is mounted to the driving gear shaft 57.

The first driven gear shaft 35 is configured as a first pivot shaft 35 connecting the locking swing arm 32 with the locking seat 31. A first end of the first driven gear shaft 35 is connected to the arm assembly 23, and the first driven gear 52 is mounted to a second end of the first driven gear shaft 35. Thus, the first driven gear shaft 35 passes through the locking swing arm 32 and the locking seat 31 to be connected to the first arm 231 and/or the second arm 232 of the arm assembly 23, such that the arm assembly 23 is driven by the first driven gear 52 to extend and retract.

The second driven gear shaft 36 is configured as a second pivot shaft 36 connecting the locking seat 31 with the drive rod 33. A first end of the second driven gear shaft 36 is connected to the drive rod 33, and the second driven gear 53 is mounted to a second end of the second driven gear shaft 36. Thus, the second driven gear 53 is connected to the drive rod 33 through the second pivot shaft 36, such that the second driven gear 53 drives the drive rod 33 to rotate, so as to drive the locking swing arm 32 to swing.

In some optional embodiments, as shown in FIGS. 24-31, the driving gear 51 includes a toothed section 511 and a toothless section 512. The toothed section 511 of the driving gear 51 alternately meshes with the first driven gear 52 and the second driven gear 53 to alternately drive the first driven gear 52 and the second driven gear 53 to rotate. In other words, the toothed section 511 of the driving gear 51 does not mesh with the first driven gear 52 and the second driven gear 53 at the same time, and instead, meshes with one driven gear only after disengaging from the other driven gear.

When the step 1 is in the retracted position, as shown in FIG. 24, the second driven gear 53 meshes with the toothed section 511 of the driving gear 51, and the first driven gear 52 faces the toothless section 512 of the driving gear 51. When the step 1 is in the extended position, as shown in FIG. 26, the first driven gear 52 meshes with the toothed section 511 of the driving gear 51, and the second driven gear 53 faces the toothless section 512 of the driving gear 51.

In other words, the first driven gear 52 and the second driven gear 53 can be driven by the driving gear 51 having the toothless section 512 and the toothed section 511. When the step 1 is in the retracted position, the toothed section 511 of the driving gear 51 meshes with the second driven gear 53, whereby the second swing gear 53 drives the locking swing arm 32 to swing so as to lock the step 1 in the retracted state or drives the locking swing arm 32 to swing so as to release the step 1. Moreover, the toothless section 512 of the driving gear 51 faces the first driven gear 52, so that the driving gear 51 does not drive the first driven gear 52 to rotate. When the step 1 is in the extended position, the toothed section 511 of the driving gear 51 meshes with the first driven gear 52, and thus the first driven gear 52 drives the arm assembly 23 to extend or retract, so as to drive the step 1 to move. Moreover, the toothless section 512 of the driving gear 51 faces the second driven gear 53, so that the driving gear 51 does not drive the second driven gear 53 to rotate.

In some specific embodiments, the driving gear 51 has a first rotation position (a position of the driving gear 51 as shown in FIG. 24 and "A" position shown in FIGS. 30-31), and a second rotation position (a position of the driving gear as shown in FIG. 26 and "B" position shown in FIGS. 30-31), and the driving gear 51 is reciprocally rotatable between the first rotation position and the second rotation position. In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

In the embodiment illustrated in FIGS. 24-26 and FIG. 30, the driving gear 51 further includes a third rotation position (a position as shown in FIG. 25 and "C" position shown in FIG. 30) between the first rotation position and the second rotation position. As shown in FIGS. 24-26 and FIG. 30, before the driving gear 51 rotates from the first rotation position to the third rotation position along a first direction (a counterclockwise direction as shown in FIGS. 24-26), as shown in FIGS. 24 and 30, the toothed section 511 of the driving gear 51 meshes with the second driven gear 53, and the toothless section 512 of the driving gear 51 faces the first driven gear 52, such that the driving gear 51 drives the locking swing arm 32 to rotate from the locking position towards the release position.

When the driving gear 51 rotates to the third rotation position along the first direction, as shown in FIGS. 25 and 30, the toothed section 511 of the driving gear 51 starts to disengage from the second driven gear 53 and starts to mesh with the first driven gear 52, in which the locking swing arm 32 rotates to the release position, and the driving gear 51 starts to drive the step 1 to move from the retracted position towards the extended position.

In a process where the driving gear 51 rotates from the third rotation position to the second rotation position along the first direction, as shown in FIGS. 26 and 30, the toothed section 511 of the driving gear 51 meshes with the first driven gear 52, and the toothless section 512 of the driving gear 51 faces the second driven gear 53, such that the driving gear 51 drives the step 1 to move from the retracted position towards the extended position.

Specifically, FIGS. 30(A)-30(C) are schematic views illustrating the relationship between the locking swing arm 32 and the second arm 232 during the rotation of the driving gear 51 from the first rotation position to the second rotation position along the first direction. As shown in FIG. 30(A), the second arm 232 and the locking swing arm 32 are both in a vertical state, and the second arm 232 is in the retracted position while the locking swing arm 32 is in the locking position. First, the toothed section 511 of the driving gear 51 meshes with the second driven gear 53, to drive the locking swing arm 32 to rotate rightwards until the locking swing arm 32 rotates rightwards by an angle α; that is, the locking swing arm 32 rotates to the release position. As shown in FIG. 30(B), the toothed section 511 of the driving gear 51 disengages from the second driven gear 53 and starts to mesh with the first driven gear 52, such that the driving gear 51 starts to drive the second arm 232 to rotate leftwards when the locking swing arm 32 is in the release position, and hence the second arm 232 starts to move from the retracted position towards the extended position, and the locking swing arm 32 is stationary. When the second arm 232 rotates leftwards by an angle β, as shown in FIG. 30(C), the second arm 232 moves to the extended position.

Figure 27:
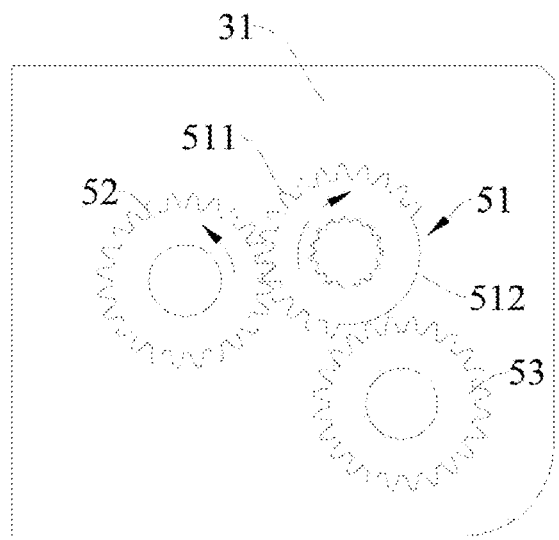
FIG. 27 is a schematic view of a transmission device according to an embodiment of the present disclosure, in which a driving gear is in a second rotation position and rotates towards a first rotation position in a clockwise direction.
Figure 28:
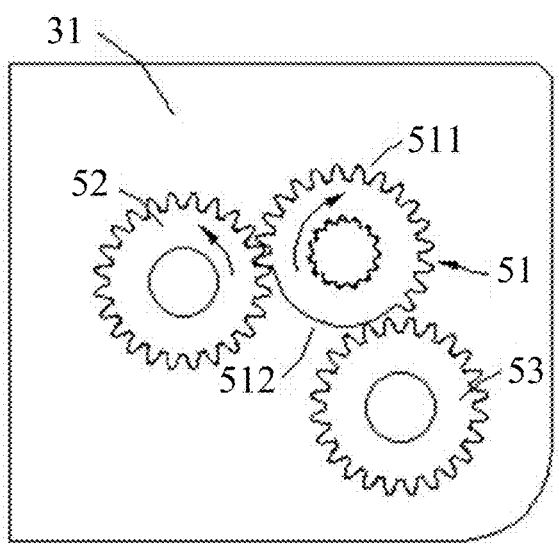
FIG. 28 is a schematic view of the transmission device shown in FIG. 27, in which the driving gear rotates from the second rotation position to an intermediate rotation position.
Figure 29:
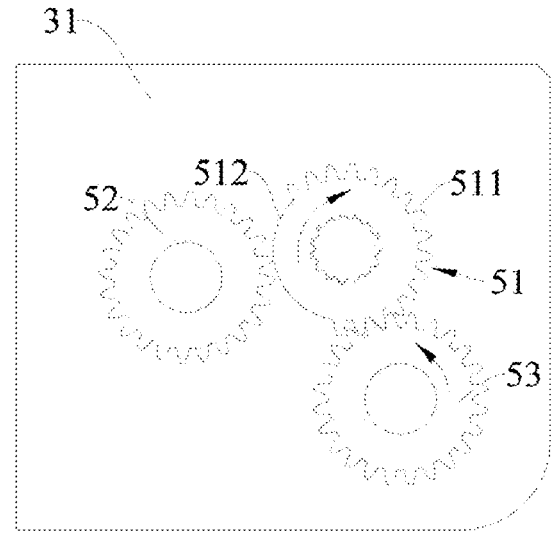
FIG. 29 is a schematic view of the transmission device shown in FIG. 27, in which the driving gear rotates from the intermediate rotation position to the first rotation position.

Further, as shown in FIGS. 27-29, before the driving gear 51 rotates from the second rotation position to the third rotation position along a second direction opposite to the first direction (a clockwise direction as shown in FIGS. 27-29), as shown in FIG. 27, the toothed section 511 of the driving gear 51 meshes with the first driven gear 52, and the toothless section 512 of the driving gear 51 faces the second driven gear 53, so that the driving gear 51 drives the step 1 to move from the extended position towards the retracted position.

When the driving gear 51 rotates to the third rotation position along the second direction, as shown in FIG. 28, the toothed section 511 of the driving gear 51 starts to disengage from the first driven gear 52 and starts to mesh with the second driven gear 53, in which the step 1 moves to the retracted position, and the driving gear 51 starts to drive the locking swing arm 32 to move from the release position towards the locking position.

In a process where the driving gear 51 rotates from the third rotation position to the first rotation position along the second direction, as shown in FIG. 29, the toothed section 511 of the driving gear 51 meshes with the second driven gear 53, and the toothless section 512 of the driving gear 51 faces the first driven gear 52, such that the driving gear 51 drives the locking swing arm 32 to move from the release position towards the locking position.

Specifically, FIGS. 30(D)-30(F) are schematic views illustrating the relationship between the locking swing arm 32 and the second arm 232 during the rotation of the driving gear 51 from the second rotation position to the first rotation position along the second direction. As shown in FIG. 30(D), the second arm 232 is in the extended position and the locking swing arm 32 is in the locking position. First, the toothed section 511 of the driving gear 51 meshes with the first driven gear 52, to drive the second arm 232 to rotate rightwards, so as to enable the second arm 232 to move from the extended position towards the retracted position until the second arm 232 rotates rightwards by an angle β; that is, the second arm 232 returns to the original vertical state. As shown in FIG. 30(E), the second arm 232 moves to the retracted position, and then the toothed section 511 of the driving gear 51 disengages from the first driven gear 52 and starts to mesh with the second driven gear 53, such that the driving gear 51 drives the locking swing arm 32 to rotate leftwards when the second arm 232 stays in the retracted position; that is, the locking swing arm 32 is driven to rotate from the release position to the locking position. When the locking swing arm 32 rotates leftwards by an angle α, as shown in FIG. 30(F), the locking swing arm 32 rotates to the locking position.

In the specific embodiment shown in FIGS. 24-26 and 31, the driving gear 51 also has a third rotation position ("C" position shown in FIG. 31) between the first rotation position ("A" position shown in FIG. 31) and the second rotation position ("B" position shown in FIG. 31), and a fourth rotation position ("D" position shown in FIG. 31) between the second rotation position and the third rotation position.

Before the driving gear 51 rotates from the first rotation position to the third rotation position along the first direction (a counterclockwise direction as shown in FIGS. 24 and 26), the toothed section 511 of the driving gear 51 meshes with the second driven gear 53, and the toothless section 512 of the driving gear 51 faces the first driven gear 52, such that the driving gear 51 drives the locking swing arm 32 to rotate from the locking position towards the release position.

When the driving gear 51 rotates to the third rotation position along the first direction, the toothed section 511 of the driving gear 51 starts to disengage from the second driven gear 53, in which the locking swing arm 32 rotates to the release position. Before the driving gear 51 rotates from the third rotation position to the fourth rotation position along the first direction, the toothless section 512 of the driving gear 51 faces the first driven gear 52 and the second driven gear 53 at the same time; that is, the driving gear 51 meshes with neither of the first driven gear 52 and the second driven gear 53, so as to keep the locking swing arm 32 stationary in the release position and keep the step 1 stationary in the retracted position.

When the driving gear 51 rotates to the fourth rotation position along the first direction, the toothed section 511 of the driving gear 51 starts to mesh with the first driven gear 52, to start to drive the step 1 to move from the retracted position towards the extended position. In the process that the driving gear 51 rotates from the fourth rotation position to the second rotation position along the first direction, the toothed section 511 of the driving gear 51 meshes with the first driven gear 52, and the toothless section 512 of the driving gear 51 faces the second driven gear 53, such that the driving gear 51 drives the step 1 to move from the retracted position towards the extended position.

Specifically, FIGS. 31(A)-31(D) are schematic views illustrating the relationship between the locking swing arm 32 and the second arm 232 during the rotation of the driving gear 51 from the first rotation position to the second rotation position along the first direction. As shown in FIG. 31(A), the second arm 232 and the locking swing arm 32 are both in a vertical state, and the second arm 232 is in the retracted position while the locking swing arm 32 is in the locking position. First, the toothed section 511 of the driving gear 51 meshes with the second driven gear 53, to drive the locking swing arm 32 to rotate rightwards until the locking swing arm 32 rotates rightwards by an angle α; that is, the locking swing arm 32 rotates to the release position. As shown in FIG. 31(B), the toothed section 511 of the driving gear 51 disengages from the second driven gear 53. Between the third rotation position and the fourth rotation position, as shown in FIG. 31(C), the locking swing arm 32 stays in the release position and the second arm 232 stays in the retracted position; that is, the toothed section 511 of the driving gear 51 neither meshes with the second driven gear 53, nor meshes with the first driven gear 52. Starting from the fourth rotation position, the toothed section 511 of the driving gear 51 meshes with the first driven gear 52, to drive the second arm 232 to rotate leftwards so as to enable the second arm 232 to move from the retracted position towards the extended position. As shown in FIG. 31(D), the second arm 232 rotates leftwards by an angle β; that is, the second arm 232 moves to the extended position.

Further, as shown in FIGS. 27, 29 and 31, before the driving gear 51 rotates from the second rotation position to the fourth rotation position along a second direction opposite to the first direction (a clockwise direction as shown in FIGS. 27 and 29), the toothed section 511 of the driving gear 51 meshes with the first driven gear 52, and the toothless section 512 of the driving gear 51 faces the second driven gear 53, so that the driving gear 51 drives the step 1 to move from the extended position towards the retracted position.

When the driving gear 51 rotates to the fourth rotation position along the second direction, the toothed section 511 of the driving gear 51 starts to disengage from the first driven gear 52, and the step 1 moves to the retracted position. Before the driving gear 51 rotates from the fourth rotation position to the third rotation position along the second direction, the toothless section 512 of the driving gear 51 faces the first driven gear 52 and the second driven gear 53 at the same time; that is, both the step 1 and the locking swing arm 32 do not move.

When the driving gear 51 rotates to the third rotation position along the second direction, the toothed section 511 of the driving gear 51 starts to mesh with the second driven gear 53; that is, the locking swing arm 32 starts to rotate from the release position towards the locking position. In the process that the driving gear 51 rotates from the third rotation position to the first rotation position along the second direction, the toothed section 511 of the driving gear 51 meshes with the second driven gear 53, and the toothless section 512 of the driving gear 51 faces the first driven gear 52, so as to drive the locking swing arm 32 to rotate towards the locking position.

Specifically, FIGS. 31(E)-30(H) are schematic views illustrating the relationship between the locking swing arm 32 and the second arm 232 during the rotation of the driving gear 51 from the second rotation position to the first rotation position along the second direction. As shown in FIG. 31(E), the second arm 232 is in the extended position and the locking swing arm 32 is in the locking position. First, the toothed section 511 of the driving gear 51 meshes with the first driven gear 52 to drive the second arm 232 rotates rightwards, so as to enable the second arm 232 to move from the extended position towards the retracted position until the second arm 232 rotates rightwards by an angle β; that is, the second arm 232 returns to the original vertical state. As shown in FIG. 31(F), the second arm 232 moves to the retracted position, and then the toothed section 511 of the driving gear 51 disengages from the first driven gear 52. Between the fourth rotation position and the third rotation position, as shown in FIG. 31(G), the locking swing arm 32 stays in the release position and the second arm 232 stays in the retracted position; that is, the toothed section 511 of the driving gear 51 neither meshes with the second driven gear 53, nor meshes with the first driven gear 52. Starting from the third rotation position, the toothed section 511 of the driving gear 51 starts to mesh with the second driven gear 53, to drive the locking swing arm 32 to rotate leftwards; that is, the locking swing arm 32 is driven to rotate from the release position to the locking position. When the locking swing arm 32 rotates leftwards by an angle α, as shown in FIG. 31(H), the locking swing arm 32 rotates to the locking position.

It can be understood that in the specific embodiment shown in FIGS. 30 and 31, the driving gear 51 alternately drives the first driven gear 52 and the second driven gear 53 to rotate, so that the extension-and-retraction movement of the second arm 232 and the swinging of the locking swing arm 32 alternately occur.

In still other optional embodiments, as shown in FIGS. 24-26 and 32, the driving gear 51 includes a toothed section 511 and a toothless section 512. The driving gear 51 has a first rotation position (a position of the driving gear 51 as shown in FIG. 24 and "A" position shown in FIG. 32), a second rotation position (a position of the driving gear as shown in FIG. 26 and "B" position shown in FIG. 32), and a third rotation position ("C" position shown in FIG. 32) between the first rotation position and the second rotation position. The driving gear 51 is reciprocally rotatable between the first rotation position and the second rotation position.

In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52, in which way the locking swing arm 32 is driven to move from the locking position towards the release position.

When the driving gear 51 rotates to the third rotation position along the first direction, the toothed section 511 of the driving gear 51 starts to mesh with the first driven gear 52, so as to start to drive the step 1 to move from the retracted position towards the extended position. During the rotation of the driving gear 51 from the third rotation position to the second rotation position along the first direction, the toothed section 511 of the driving gear 51 meshes with the second driven gear 53 and the first driven gear 52 at the same time, thereby driving the locking swing arm 32 to move towards the release position while driving the step 1 to move towards the extended position.

Further, the release position includes a maximum release position and a minimum release position, and the minimum release position is between the locking position and the maximum release position. For example, in the "C" position shown in FIG. 32, the locking swing arm 32 is in the minimum release position, and in the "B" position shown in FIG. 32, the locking swing arm 32 is in the maximum release position. Before the step 1 moves away from the retracted position towards the extended position, for example, from the "A" position to the "C" position shown in FIG. 32, the locking swing arm 32 rotates from the locking position to the minimum release position, and while the locking swing arm 32 is rotating from the minimum release position to the maximum release position, for example, from the "C" position to the "B" position shown in FIG. 32, the step 1 moves from the retracted position to the extended position.

Figure 32:
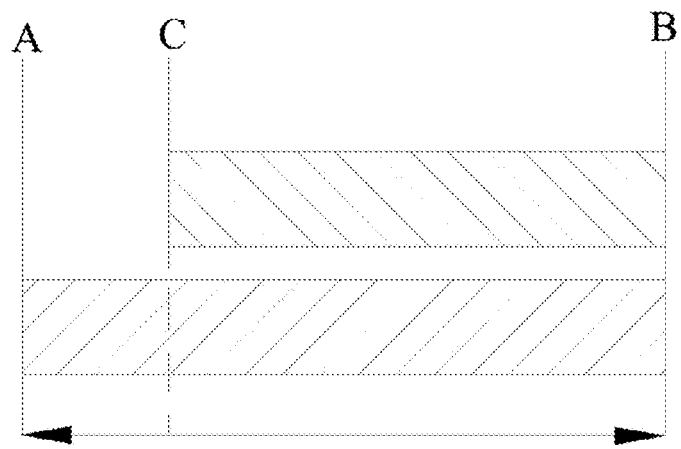
FIG. 32 is a schematic view showing a relationship of a driving gear of a transmission device driving a first driven gear and a second driven gear to rotate according to still another embodiment of the present disclosure.
Figure 32A:
FIGS. 32(A) to 32(C) are schematic views illustrating that a single drive motor drives an arm assembly to move a step from a retracted position to an extended position and drives a locking swing arm to swing from a locking position to a maximum release position by means of the transmission device shown in FIG. 32.
Figure 32B:
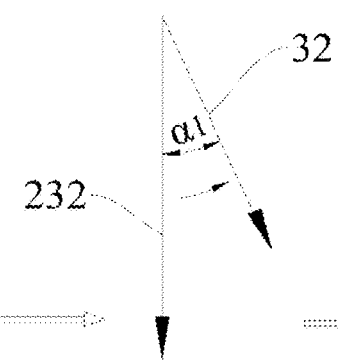
Figure 32C:
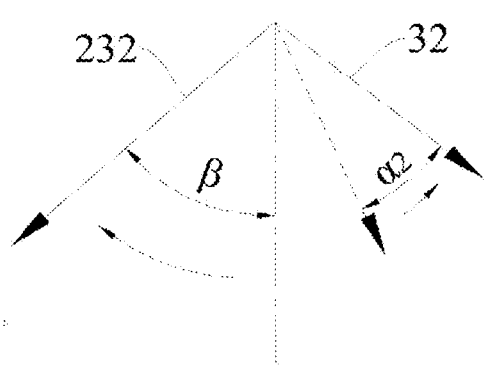

Specifically, FIGS. 32(A)-32(C) are schematic views illustrating the relationship between the locking swing arm 32 and the second arm 232 during the rotation of the driving gear 51 from the first rotation position to the second rotation position along the first direction. As shown in FIG. 32(A), the second arm 232 and the locking swing arm 32 are both in a vertical state, and the second arm 232 is in the retracted position while the locking swing arm 32 is in the locking position. First, the toothed section 511 of the driving gear 51 meshes with the second driven gear 53, to drive the locking swing arm 32 to rotate rightwards until the locking swing arm 32 rotates rightwards by an angle α1; that is, the locking swing arm 32 rotates to the minimum release position. As shown in FIG. 32(B), the toothed section 511 of the driving gear 51 starts to mesh with the first driven gear 52 while meshing with the second driven gear 53, so as to simultaneously drive the second arm 232 to rotate leftwards, thereby enabling the locking swing arm 32 to rotate from the minimum release position to the maximum release position and enabling the second arm 232 to move from the retracted position towards the extended position. As shown in FIG. 32(C), the locking swing arm 32 continues rotating rightwards by an angle α2; that is, the locking swing arm 32 rotates to the maximum release position, and the second arm 232 rotates leftwards by an angle β; that is, the second arm 232 moves to the extended position.

Further, as shown in FIGS. 27, 29 and 32, before the driving gear 51 rotates from the second rotation position to the third rotation position along a second direction opposite to the first direction (a clockwise direction as shown in FIGS. 27 and 29), the toothed section 511 of the driving gear 51 meshes with the first driven gear 52 and the second driven gear 53 at the same time, thereby driving the locking swing arm 32 to rotate from the maximum release position towards the minimum release position while driving the step 1 to move from the extended position towards the retracted position.

When the driving gear 51 rotates to the third rotation position along the second direction, the toothed section 511 of the driving gear 51 starts to disengage from the first driven gear 52, the step 1 moves to the retracted position, and the locking swing arm 32 rotates to the minimum release position.

During the rotation of the driving gear 51 from the third rotation position to the first rotation position along the second direction, the toothed section 511 of the driving gear 51 meshes with the second driven gear 53, and the toothless section 512 of the driving gear 51 faces the first driven gear 52, so as to drive the locking swing arm 32 to move from the minimum release position towards the locking position, and to keep the step 1 in the retracted position.

Figure 32F:
FIGS. 32(D) to 32(F) are schematic views illustrating that the single drive motor drives the arm assembly to move the step from the extended position to the retracted position and drives the locking swing arm to swing from the maximum release position to the locking position by means of the transmission device shown in FIG. 32.
Figure 32E:
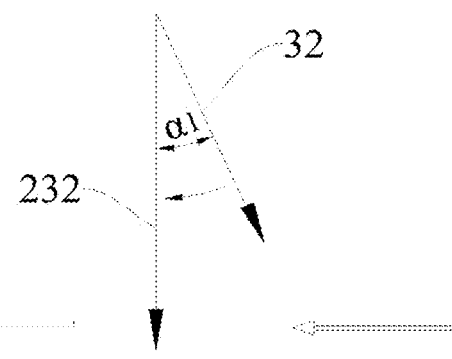
Figure 32D:
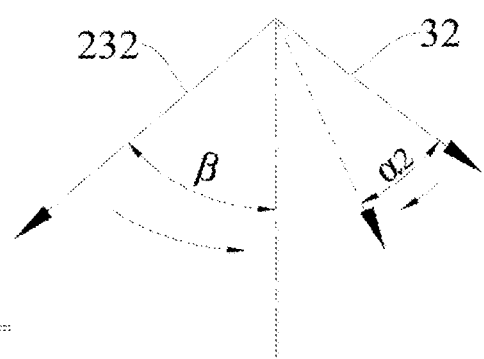

Specifically, FIGS. 32(D)-32(F) are schematic views illustrating the relationship between the locking swing arm 32 and the second arm 232 during the rotation of the driving gear 51 from the second rotation position to the first rotation position along the second direction. As shown in FIG. 32(D), the second arm 232 is in the extended position and the locking swing arm 32 is in the locking position. First, the toothed section 511 of the driving gear 51 meshes with the first driven gear 52 and the second driven gear 53 at the same time, to drive the second arm 232 to rotate rightwards while driving the locking swing arm 32 to rotate leftwards, thereby enabling the second arm 232 to move from the extended position towards the retracted position and enabling the locking swing arm 32 to move from the maximum release position towards the minimum release position, until the second arm 232 rotates rightwards by the angle β (that is, the second arm 232 returns to the original vertical state) and the locking swing arm 32 rotates leftwards by the angle α2. As shown in FIG. 32(E), the second arm 232 moves to the retracted position, and the locking swing arm 32 rotates to the minimum release position. Then, the toothed section 511 of the driving gear 51 disengages from the first driven gear 52; that is, the toothed section 511 only meshes with the second driven gear 53, to drive the locking swing arm 32 to continue rotating leftwards when the second arm 232 stays in the retracted position. That is, the locking swing arm 32 is driven to rotate from the minimum release position towards the locking position. When the locking swing arm 32 rotates leftwards by the angle α, as shown in FIG. 30(F), the locking swing arm 32 rotates to the locking position.

In still other optional embodiments, as shown in FIGS. 24-26 and 33, the driving gear 51 includes a toothed section 511 and a toothless section 512. The driving gear 51 has a first rotation position (a position of the driving gear 51 as shown in FIG. 24 and "A" position shown in FIG. 33), a second rotation position (a position of the driving gear as shown in FIG. 26 and "B" position shown in FIG. 33), a third rotation position ("C" position shown in FIG. 33) between the first rotation position and the second rotation position, and a fourth rotation position ("D" position shown in FIG. 33) between the third rotation position and the second rotation position. The driving gear 51 is reciprocally rotatable between the first rotation position and the second rotation position.

In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52, in which way the locking swing arm 32 is driven to move from the locking position towards the release position.

When the driving gear 51 rotates to the third rotation position along the first direction, the toothed section 511 of the driving gear 51 starts to mesh with the first driven gear 52, so as to start to drive the step 1 to move from the retracted position towards the extended position. Before the driving gear 51 rotates from the third rotation position to the fourth rotation position along the first direction, the toothed section 511 of the driving gear 51 meshes with the second driven gear 53 and the first driven gear 52 at the same time, thereby driving the locking swing arm 32 to move towards the release position while driving the step 1 to move towards the extended position.

When the driving gear 51 rotates to the fourth rotation position along the first direction, the toothed section 511 of the driving gear 51 starts to disengage from the second driven gear 53, and the locking swing arm 32 rotates to the release position.

In a process where the driving gear 51 rotates from the fourth rotation position to the second rotation position along the first direction, the toothed section 511 of the driving gear 51 meshes with the first driven gear 52, and the toothless section 512 and the driving gear 51 face the second driven gear 53, so as to continue driving the step 1 to move towards the extended position.

Further, the release position includes a maximum release position and a minimum release position, and the minimum release position is between the locking position and the maximum release position. For example, in the "C" position shown in FIG. 33, the locking swing arm 32 is in the minimum release position, and in the "D" position shown in FIG. 33, the locking swing arm 32 is in the maximum release position. The step 1 also has an intermediate position between the retracted position and the extended position, such as the "D" position shown in FIG. 33.

Before the step 1 moves away from the retracted position towards the extended position, for example, from the "A" position to the "C" position shown in FIG. 33, the locking swing arm 32 rotates from the locking position to the minimum release position. While the locking swing arm 32 is rotating from the minimum release position to the maximum release position, for example, from the "C" position to the "D" position shown in FIG. 33, the step 1 is moving from the retracted position to the intermediate position. During the movement of the step 1 from the intermediate position to the extended position, for example, from the "D" position to the "B" position shown in FIG. 33, the locking swing arm 32 keeps stationary in the maximum release position.

Specifically, FIGS. 33(A)-33(D) are schematic views illustrating the relationship between the locking swing arm 32 and the second arm 232 during the rotation of the driving gear 51 from the first rotation position to the second rotation position along the first direction. As shown in FIG. 33(A), the second arm 232 and the locking swing arm 32 are both in a vertical state, and the second arm 232 is in the retracted position while the locking swing arm 32 is in the locking position. First, the toothed section 511 of the driving gear 51 meshes with the second driven gear 53, to drive the locking swing arm 32 to rotate rightwards until the locking swing arm 32 rotates rightwards by an angle α1; that is, the locking swing arm 32 rotates to the minimum release position. As shown in FIG. 33(B), the toothed section 511 of the driving gear 51 starts to mesh with the first driven gear 52 while meshing with the second driven gear 53, so as to simultaneously drive the second arm 232 to rotate leftwards, thereby enabling the locking swing arm 32 to rotate from the minimum release position to the maximum release position and also enabling the second arm 232 to move from the retracted position towards the intermediate position. As shown in FIG. 33(C), the locking swing arm 32 continues rotating rightwards by an angle α2; that is, the locking swing arm 32 rotates to the maximum release position, and the second arm 232 rotates leftwards by an angle β1; that is, the second arm 232 moves to the intermediate position. The toothed section 511 of the driving gear 51 disengages from the second driven gear 53, and then the second arm 232 continues rotating leftwards by an angle β2, such that the second arm 232 moves from the intermediate position to the extended position, as shown in FIG. 33(D).

Further, as shown in FIGS. 27, 29 and 33, before the driving gear 51 rotates from the second rotation position to the fourth rotation position along a second direction opposite to the first direction (a clockwise direction as shown in FIGS. 27 and 29), the toothed section 511 of the driving gear 51 meshes with the first driven gear 52, and the toothless section 512 of the driving gear 51 faces the second driven gear 53, thereby driving the step 1 to move from the extended position towards the retracted position.

When the driving gear 51 rotates to the fourth rotation position along the second direction, the toothed section 511 of the driving gear 51 starts to mesh with the second driven gear 53, so as to start to drive the locking swing arm 32 to rotate from the maximum release position towards the locking position, and also to drive the step 1 to move to the intermediate position.

Before the driving gear 51 rotates from the fourth rotation position to the third rotation position along the second direction, the toothed section of the driving gear meshes with the first driven gear and the second driven gear at the same time, so as to drive the locking swing arm 32 to rotate and drive the step 1 to move at the same time. When the driving gear 51 rotates to the third rotation position along the second direction, the toothed section 511 of the driving gear 51 starts to disengage from the first driven gear 52, the step 1 moves to the retracted position, and the locking swing arm 32 rotates to the minimum release position.

During the rotation of the driving gear 51 from the third rotation position to the first rotation position along the second direction, the toothed section 511 of the driving gear 51 meshes with the second driven gear 53, and the toothless section of the driving gear 51 faces the first driven gear 52, so as to drive the locking swing arm 32 to move from the minimum release position towards the locking position.

Figures 33E, 33F, 33G, 33H:
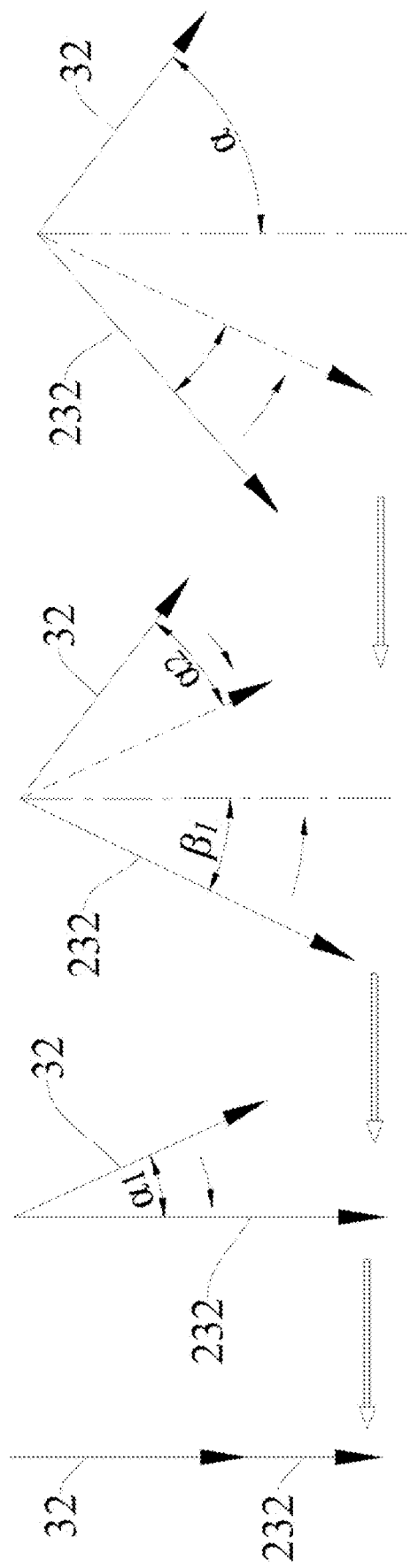
FIGS. 33(E) to 33(H) are schematic views illustrating that the single drive motor drives the arm assembly to move the step from the extended position to the retracted position and drives the locking swing arm to swing from the maximum release position to the locking position by means of the transmission device shown in FIG. 33.

Specifically, FIGS. 33(E)-33(H) are schematic views illustrating the relationship between the locking swing arm 32 and the second arm 232 during the rotation of the driving gear 51 in FIG. 33 from the second rotation position to the first rotation position along the second direction. As shown in FIG. 33(E), the second arm 232 is in the extended position and the locking swing arm 32 is in the locking position. First, the toothed section 511 of the driving gear 51 meshes with the first driven gear 52 to drive the second arm 232 rotates rightwards, so as to enable the second arm 232 to move from the extended position towards the retracted position until the second arm 232 rotates rightwards by the angle β2; that is, the second arm 232 moves to the intermediate position. As shown in FIG. 33(F), the toothed section 511 of the driving gear 51 then starts to mesh with the second driven gear 53; that is, the locking swing arm 32 is driven to rotate leftwards while the second arm 232 is driven to continue moving rightwards, so as to enable the second arm 232 to move from the intermediate position to the retracted position and enable the locking swing arm 32 to move from the maximum release position towards the minimum release position, until the second arm 232 rotates rightwards by the angle β1 to return to the vertical state and the locking swing arm 32 rotates leftwards by the angle α2. As shown in FIG. 33(G), the second arm 232 moves to the retracted position, and the locking swing arm 32 rotates to the minimum release position. The toothed section 511 of the driving gear 51 disengages from the first driven gear 52; that is, the toothed section 511 of the driving gear 51 only meshes with the second driven gear 53, so as to drive the locking swing arm 32 to continue rotating leftwards when the second arm 232 stays in the vertical state, such that the locking swing arm 32 is driven to rotate from the minimum release position towards the locking position. When the locking swing arm 32 continues rotating leftwards by the angle α1, as shown in FIG. 33(H), the locking swing arm 32 rotates to the locking position.

It can be understood that in the embodiment shown in FIGS. 32 and 33, the meshing between the toothed section 511 of the driving gear 51 and the first driven gear 52 and the meshing between the toothed section 511 of the driving gear 51 and the second driven gear 53 partially overlap; that is, in a certain period of time, the toothed section 511 of the driving gear 51 meshes with both the first driven gear 52 and the second driven gear 53.

In some embodiments, as shown in FIGS. 34-36, the vehicle step apparatus 100 further includes a driving cam 54, a driven cam 55, and a stopping swing rod 56. The driving cam 54 is connected to the driving gear 51, and the driving cam 54 can rotate along with the driving gear 51. The driven cam 55 is connected to the first driven gear 52, and the driven cam 55 can rotate along with the first driven gear 52. The stopping swing rod 56 has a first end 561, a second end 562, and a pivoting portion 563. The pivoting portion 563 is located between the first end 561 of the stopping swing rod 56 and the second end 562 of the stopping swing rod 56. The stopping swing rod 56 is swingable around the pivoting portion 563.

When the toothed section 511 of the driving gear 51 meshes with the first driven gear 52, the driving cam 54 drives the second end 562 of the stopping swing rod 56 to engage with the second driven gear 53 to stop the second driven gear 53 from rotating, and the driving cam 54 releases the driven cam 55 to allow the first driven gear 52 to rotate.

When the toothed section 511 of the driving gear 51 meshes with the second driven gear 53, the driving cam 54 drives the second end 562 of the stopping swing rod 56 to separate from the second driven gear 53 to allow the second driven gear 53 to rotate, and the driving cam 54 stops the driven cam 55 to stop the first driven gear 52 from rotating.

Further, when the driving gear 51 meshes with the first driven gear 52, as shown in FIGS. 35-36, the first end 561 of the stopping swing rod 56 abuts against a distal rest arc segment 542 of the driving cam 54, such that the second end 562 of the stopping swing rod 56 engages with the second driven gear 53 to stop the second driven gear 53 from rotating, and a distal rest arc segment 552 of the driven cam 55 faces a proximal rest arc segment 541 of the driving cam 54.

In other words, when the driving gear 51 meshes with the first driven gear 52, the driving gear 51 drives the first driven gear 52 to rotate, and the driving cam 54 rotates together with the driving gear 51. The proximal rest arc segment 541 of the driving cam 54 faces the driven cam 55 and is spaced apart from the driven cam 55; that is, the driving cam 54 cannot restrain the movement of the driven cam 55, and the driven cam 55 can rotate together with the first driven gear 52. At the same time, the distal rest arc segment 542 of the driving cam 54 faces the first end 561 of the stopping swing rod 56, and the first end 561 of the stopping swing rod 56 abuts against the distal rest arc segment 542 of the driving cam 54. Since the stopping swing rod 56 can swing relative to the pivoting portion 563, the second end 562 of the stopping swing rod 56 approaches the second driven gear 53, and the second end 562 of the stopping swing rod 56 can engage with the second driven gear 53 to stop the second driven gear 53 from rotating.

When the toothed section 511 of the driving gear 51 meshes with the second driven gear 53, as shown in FIG. 34, the distal rest arc segment 552 of the driven cam 55 abuts against the distal rest arc segment 542 of the driving cam 54; that is, the distal rest arc segment 542 of the driving cam 54 stops the distal rest arc segment 552 of the driven cam 55, so as to stop the first driven gear 52 from rotating. The first end 561 of the stopping swing rod 56 abuts against the proximal rest arc segment 541 of the driving cam 54 to enable the second end 562 of the stopping swing rod 56 to separate from the second driven gear 53.

In other words, the driving cam 54 has the proximal rest arc segment 541 and the distal rest arc segment 542. The driven cam 55 has a proximal rest arc segment 551 and the distal rest arc segment 552. When the driving gear 51 meshes with the second driven gear 53, as shown in FIG. 34, the driving gear 51 drives the second driven gear 53 to rotate, the driving cam 54 rotates together with the driving gear 51, and the distal rest arc segment 542 of the driving cam 54 abuts against the driven cam 55 to stop the driven cam 55 from rotating, so as to stop the first driven gear 52 from rotating. At the same time, the proximal rest arc segment 541 of the driving cam 54 faces the first end 561 of the stopping swing rod 56, and the first end 561 of the stopping swing rod 56 abuts against the proximal rest arc segment 541 of the driving cam 54. Since the stopping swing rod 56 can swing relative to the pivoting portion 563, the second end 562 of the stopping swing rod 56 goes away from the second driven gear 53 to separate from the second driven gear 53.

A transmission device according to embodiments of the present disclosure will be described below with reference to FIGS. 24-29, FIGS. 30-31 and FIGS. 34-36.

As shown in FIGS. 24-29, a transmission device 5 according to embodiments of the present disclosure includes a driving gear 51, a first driven gear 52, and a second driven gear 53. The driving gear 51 includes a toothed section 511 and a toothless section 512. The toothed section 511 of the driving gear 51 alternately meshes with the first driven gear 52 and the second driven gear 53 to alternately drive the first driven gear 52 and the second driven gear 53 to rotate.

In other words, the toothed section 511 of the driving gear 51 does not mesh with the first driven gear 52 and the second driven gear 53 at the same time, and instead, meshes with one driven gear only after disengaging from the other driven gear.

In some embodiments, the driving gear 51 has a first rotation position (a position of the driving gear 51 as shown in FIG. 24 and "A" position shown in FIGS. 30-31) and a second rotation position (a position of the driving gear as shown in FIG. 26 and "B" position shown in FIGS. 30-31). The driving gear 51 is reciprocally rotatable between the first rotation position and the second rotation position. In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

In some optional embodiments, the driving gear 51 also has a third rotation position (a position shown in FIG. 25 and "C" position shown in FIG. 30) between the first rotation position and the second rotation position, as shown in FIGS. 24-26 and 30. Before the driving gear 51 rotates from the first rotation position to the third rotation position along a first direction (a counterclockwise direction as shown in FIGS. 24-26), as shown in FIGS. 24 and 30, the toothed section 511 of the driving gear 51 meshes with the second driven gear 53, and the toothless section 512 of the driving gear 51 faces the first driven gear 52, such that the driving gear 51 drives the second driven gear 53 instead of the first driven gear 52.

When the driving gear 51 rotates to the third rotation position along the first direction, as shown in FIGS. 25 and 30, the toothed section 511 of the driving gear 51 starts to disengage from the second driven gear 53 and starts to mesh with the first driven gear 52.

In a process where the driving gear 51 rotates from the third rotation position to the second rotation position along the first direction, as shown in FIGS. 26 and 30, the toothed section 511 of the driving gear 51 meshes with the first driven gear 52, and the toothless section 512 of the driving gear 51 faces the second driven gear 53, such that the driving gear 51 drives the first driven gear 52 instead of the second driven gear 53.

Further, as shown in FIGS. 27-29, before the driving gear 51 rotates from the second rotation position to the third rotation position along a second direction opposite to the first direction (a clockwise direction as shown in FIGS. 27-29), as shown in FIG. 27, the toothed section 511 of the driving gear 51 meshes with the first driven gear 52, and the toothless section 512 of the driving gear 51 faces the second driven gear 53.

When the driving gear 51 rotates to the third rotation position along the second direction, as shown in FIG. 28, the toothed section 511 of the driving gear 51 starts to disengage from the first driven gear 52 and starts to mesh with the second driven gear 53.

In a process where the driving gear 51 rotates from the third rotation position to the first rotation position along the second direction, as shown in FIG. 29, the toothed section 511 of the driving gear 51 meshes with the second driven gear 53, and the toothless section 512 of the driving gear 51 faces the first driven gear 52.

In some other optional embodiments, as shown in FIGS. 24, 26 and 31, the driving gear 51 also has a third rotation position ("C" position shown in FIG. 31) between the first rotation position ("A" position shown in FIG. 31) and the second rotation position ("B" position shown in FIG. 31), and a fourth rotation position ("D" position shown in FIG. 31) between the second rotation position and the third rotation position.

Before the driving gear 51 rotates from the first rotation position to the third rotation position along the first direction (the counterclockwise direction as shown in FIGS. 24 and 26), the toothed section 511 of the driving gear 51 meshes with the second driven gear 53, and the toothless section 512 of the driving gear 51 faces the first driven gear 52.

When the driving gear 51 rotates to the third rotation position along the first direction, the toothed section 511 of the driving gear 51 starts to disengage from the second driven gear 53. Before the driving gear 51 rotates from the third rotation position to the fourth rotation position along the first direction, the toothless section 512 of the driving gear 51 faces the first driven gear 52 and the second driven gear 53 at the same time; that is, the driving gear 51 meshes with neither of the first driven gear 52 and the second driven gear 53.

When the driving gear 51 rotates to the fourth rotation position along the first direction, the toothed section 511 of the driving gear 51 starts to mesh with the first driven gear 52, so as to start to drive the step 1 to move from the retracted position towards the extended position. In the process that the driving gear 51 rotates from the fourth rotation position to the second rotation position along the first direction, the toothed section 511 of the driving gear 51 meshes with the first driven gear 52, and the toothless section 512 of the driving gear 51 faces the second driven gear 53.

Further, as shown in FIGS. 27, 29 and 31, before the driving gear 51 rotates from the second rotation position to the fourth rotation position along a second direction opposite to the first direction (a clockwise direction as shown in FIGS. 27 and 29), the toothed section 511 of the driving gear 51 meshes with the first driven gear 52, and the toothless section 512 of the driving gear 51 faces the second driven gear 53.

When the driving gear 51 rotates to the fourth rotation position along the second direction, the toothed section 511 of the driving gear 51 starts to disengage from the first driven gear 52. Before the driving gear 51 rotates from the fourth rotation position to the third rotation position along the second direction, the toothless section 512 of the driving gear 51 faces the first driven gear 52 and the second driven gear 53 at the same time.

When the driving gear 51 rotates to the third rotation position along the second direction, the toothed section 511 of the driving gear 51 starts to mesh with the second driven gear 53. In the process that the driving gear 51 rotates from the third rotation position to the first rotation position along the second direction, the toothed section 511 of the driving gear 51 meshes with the second driven gear 53, and the toothless section 512 of the driving gear 51 faces the first driven gear 52.

In some embodiments, as shown in FIGS. 34-36, the transmission device 5 further includes a first stopping member 501, and the first stopping member 501 stops the first driven gear 52 from rotating when the toothed section 511 of the driving gear 51 meshes with the second driven gear 53, and releases the first driven gear 52 when the toothed section 511 of the driving gear 51 disengages from the second driven gear 53.

In some specific embodiments, the transmission device 5 further includes a second stopping member 56, and the second stopping member 56 stops the second driven gear 53 from rotating when the toothed section 511 of the driving gear 51 meshes with the first driven gear 52, and releases the second driven gear 53 when the toothed section 511 of the driving gear 51 disengages from the first driven gear 52.

In other words, the first stopping member 501 and the second stopping member 56 can realize that the rotation of the first driven gear 52 and the rotation of the second driven gear 53 do not occur simultaneously. When the driving gear 51 drives the first driven gear 52 to rotate, the second stopping member 56 can stop the second driven gear 53 from rotating, so as to avoid the rotation of the second driven gear 53 due to factors such as inertia. When the driving gear 51 drives the second driven gear 53 to rotate, the first stopping member 501 can stop the first driven gear 52 from rotating, so as to avoid the rotation of the first driven gear 52 due to factors such as inertia.

In the position shown in FIG. 34, the first stopping member 501 stops the first driven gear 52 from rotating. In the position shown in FIG. 36 and in the position shown in FIG. 35, the second stopping member 56 stops the second driven gear 53 from rotating.

In some embodiments, the transmission device 5 further includes a driving cam 54, a driven cam 55, and a stopping swing rod 56. The driving cam 54 is connected to the driving gear 51, and the driving cam 54 can rotate along with the driving gear 51. The driven cam 55 is connected to the first driven gear 52, and the driven cam 55 can rotate along with the first driven gear 52.

The stopping swing rod 56 has a first end 561, a second end 562, and a pivoting portion 563. The pivoting portion 563 is located between the first end 561 of the stopping swing rod 56 and the second end 562 of the stopping swing rod 56. The stopping swing rod 56 is swingable around the pivoting portion 563.

Further, when the toothed section 511 of the driving gear 51 meshes with the first driven gear 52, the driving cam 54 drives the second end 562 of the stopping swing rod 56 to engage with the second driven gear 53 to stop the second driven gear 53 from rotating, and the driving cam 54 releases the driven cam 55 to allow the first driven gear 52 to rotate.

When the toothed section 511 of the driving gear 51 meshes with the second driven gear 53, the driving cam 54 drives the second end 562 of the stopping swing rod 56 to separate from the second driven gear 53 so as to allow the second driven gear 53 to rotate, and the driving cam 54 stops the driven cam 55 to stop the first driven gear 52 from rotating.

Specifically, when the driving gear 51 meshes with the first driven gear 52, as shown in FIGS. 35-36, the first end 561 of the stopping swing rod 56 abuts against a distal rest arc segment 542 of the driving cam 54, such that the second end 562 of the stopping swing rod 56 engages with the second driven gear 53 to stop the second driven gear 53 from rotating, and a distal rest arc segment 552 of the driven cam 55 faces a proximal rest arc segment 541 of the driving cam 54.

In other words, when the driving gear 51 meshes with the first driven gear 52, the driving gear 51 drives the first driven gear 52 to rotate, and the driving cam 54 rotates together with the driving gear 51. The proximal rest arc segment 541 of the driving cam 54 faces the driven cam 55 and is spaced apart from the driven cam 55; that is, the driving cam 54 cannot restrain the movement of the driven cam 55, and the driven cam 55 can rotate together with the first driven gear 52. At the same time, the distal rest arc segment 542 of the driving cam 54 faces the first end 561 of the stopping swing rod 56, and the first end 561 of the stopping swing rod 56 abuts against the distal rest arc segment 542 of the driving cam 54. Since the stopping swing rod 56 can swing relative to the pivoting portion 563, the second end 562 of the stopping swing rod 56 approaches the second driven gear 53, and the second end 562 of the stopping swing rod 56 can engage with the second driven gear 53 to stop the second driven gear 53 from rotating.

It can be understood that the stopping swing rod 56 serves as the second stopping member 56, and can stop the second driven gear 53 from rotating when the toothed section 511 of the driving gear 51 meshes with the first driven gear 52 and also can release the second driven gear 53 when the toothed section 511 of the driving gear 51 disengages from the first driven gear 52, so as to enable the driving gear 51 to drive the second driven gear 53 to rotate when the toothed segment 511 of the driving gear 51 meshes with the second driven gear 53 subsequently.

When the toothed section 511 of the driving gear 51 meshes with the second driven gear 53, as shown in FIG. 34, the distal rest arc segment 552 of the driven cam 55 abuts against the distal rest arc segment 542 of the driving cam 54; that is, the distal rest arc segment 542 of the driving cam 54 stops the distal rest arc segment 552 of the driven cam 55, so as to stop the first driven gear 52 from rotating. The first end 561 of the stopping swing rod 56 abuts against the proximal rest arc segment 541 of the driving cam 54 to enable the second end 562 of the stopping swing rod 56 to separate from the second driven gear 53.

In other words, the driving cam 54 has the proximal rest arc segment 541 and the distal rest arc segment 542. The driven cam 55 has a proximal rest arc segment 551 and the distal rest arc segment 552. When the driving gear 51 meshes with the second driven gear 53, as shown in FIG. 34, the driving gear 51 drives the second driven gear 53 to rotate, the driving cam 54 rotates together with the driving gear 51, and the distal rest arc segment 542 of the driving cam 54 abuts against the driven cam 55 to stop the driven cam 55 from rotating, so as to stop the first driven gear 52 from rotating. At the same time, the proximal rest arc segment 541 of the driving cam 54 faces the first end 561 of the stopping swing rod 56, and the first end 561 of the stopping swing rod 56 abuts against the proximal rest arc segment 541 of the driving cam 54. Since the stopping swing rod 56 can swing relative to the pivoting portion 563, the second end 562 of the stopping swing rod 56 moves away from the second driven gear 53 to separate from the second driven gear 53.

It can be understood that the driving cam 54 and the driven cam 55 together serve as the first stopping member 501, and can stop the first driven gear 52 from rotating when the toothed section 511 of the driving gear 51 meshes with the second driven gear 53 and also can release the first driven gear 52 when the toothed section 511 of the driving gear 51 disengages from the second driven gear 53, so as to enable the driving gear 51 to drive the first driven gear 52 to rotate when the toothed segment 511 of the driving gear 51 meshes with the first driven gear 52 subsequently.

When the driving gear 51 rotates from the first rotation position towards the second rotation position, as shown in FIG. 34, the toothed section 511 of the driving gear 51 first drives the second driven gear 53 to rotate, the distal rest arc segment 542 of the driving cam 54 abuts against the distal rest arc segment 552 of the driven cam 55 to stop the first driven gear 52 from rotating, and the first end 561 of the stopping swing rod 56 abuts against the proximal rest arc segment 541 of the driving cam 54 to enable the second end 562 of the stopping swing rod 56 to separate from the second driven gear 53. Then, as shown in FIG. 35, the driving gear 51 rotates, such that the toothed section 511 of the driving gear 51 disengages from the second driven gear 53 and meshes with the first driven gear 52. Moreover, the driving cam 54 rotates along with the driving gear 51, such that the proximal rest arc segment 541 of the driving cam 54 faces the driven cam 55 and is spaced apart from the driven cam 55. The proximal rest arc segment 541 of the driving cam 54 cannot restrain the movement of the driven cam 55. The first end of the stopping swing rod 56 abuts against the distal rest arc segment 542 of the driving cam 54, such that the second end 562 of the stopping swing rod 56 engages with the second driven gear 53 to stop the second driven gear 53 from rotating.

In some embodiments, the driving gear 51 is arranged coaxially with the driving cam 54, and the first driven gear 52 is arranged coaxially with the driven cam 55.

In some embodiments, the driving gear 51 is integrally formed with the driving cam 54, and the first driven gear 52 is integrally formed with the driven cam 55. It can be understood that the driving gear 51 and the driving cam 54 may be two components independent of each other, and the first driven gear 52 and the driven cam 55 may be two components independent of each other.

A transmission device according to some other embodiments of the present disclosure will be described below with reference to FIGS. 24-29, FIG. 32 and FIGS. 34-36.

As shown in FIGS. 24-29, a transmission device 5 according to embodiments of the present disclosure includes a driving gear 51, a first driven gear 52, and a second driven gear 53. The driving gear 51 has a toothless section 512 and a toothed section 511. The driving gear 51 has a first rotation position (a position of the driving gear 51 as shown in FIG. 24 and "A" position shown in FIG. 32), a second rotation position (a position of the driving gear as shown in FIG. 26 and "B" position shown in FIG. 32), and a third rotation position ("C" position shown in FIG. 32) between the first rotation position (the "A" position shown in FIG. 32) and the second rotation position (the "B" position shown in FIG. 32). The driving gear 51 is reciprocally rotatable between the first rotation position and the second rotation position.

In the first rotation position, as shown in FIG. 24, the toothed section 511 of the driving gear 51 meshes with the second driven gear 53, and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52.

When the driving gear 51 rotates to the third rotation position along the first direction, the toothed section 511 of the driving gear 51 starts to mesh with the first driven gear 52. During the rotation of the driving gear 51 from the third rotation position to the second rotation position along the first direction, the toothed section 511 of the driving gear 51 simultaneously meshes with the second driven gear 53 and the first driven gear 52.

In some specific embodiments, as shown in FIGS. 27, 29 and 32, before the driving gear 51 rotates from the second rotation position to the third rotation position along a second direction opposite to the first direction (a clockwise direction as shown in FIGS. 27 and 29), the toothed section 511 of the driving gear 51 meshes with the first driven gear 52 and the second driven gear 53 at the same time.

When the driving gear 51 rotates to the third rotation position along the second direction, the toothed section 511 of the driving gear 51 starts to disengage from the first driven gear 52. During the rotation of the driving gear 51 from the third rotation position to the first rotation position along the second direction, the toothed section 511 of the driving gear 51 meshes with the second driven gear 53, and the toothless section 512 of the driving gear 51 faces the first driven gear 52.

It can be understood that, in the embodiment shown in FIG. 33, the meshing between the toothed section 511 of the driving gear 51 and the first driven gear 52 and the meshing between the toothed section 511 of the driving gear 51 and the second driven gear 53 partially overlap; that is, in a certain period of time, the toothed section 511 of the driving gear 51 meshes with both the first driven gear 52 and the second driven gear 53.

In some embodiments, as shown in FIGS. 34-36, the transmission device 5 further includes a first stopping member 501, and the first stopping member 501 stops the first driven gear 52 from rotating when the toothed section 511 of the driving gear 51 meshes with the second driven gear 53, and releases the first driven gear 52 when the toothed section 511 of the driving gear 51 disengages from the second driven gear 53.

In some specific embodiments, the transmission device 5 further includes a second stopping member 56, and the second stopping member 56 stops the second driven gear 53 from rotating when the toothed section 511 of the driving gear 51 meshes with the first driven gear 52, and releases the second driven gear 53 when the toothed section 511 of the driving gear 51 disengages from the first driven gear 52.

In other words, the first stopping member 501 and the second stopping member 56 can realize that the rotation of the first driven gear 52 and the rotation of the second driven gear 53 do not occur simultaneously. When the driving gear 51 drives the first driven gear 52 to rotate, the second stopping member 56 can stop the second driven gear 53 from rotating, so as to avoid the rotation of the second driven gear 53 due to factors such as inertia. When the driving gear 51 drives the second driven gear 53 to rotate to drive the locking swing arm 32 to swing, the first stopping member 501 can stop the first driven gear 52 from rotating, so as to avoid the rotation of the first driven gear 52 due to factors such as inertia.

In the position shown in FIG. 34, the first stopping member 501 stops the first driven gear 52 from rotating. In the position shown in FIG. 36 and in the position shown in FIG. 35, the second stopping member 56 stops the second driven gear 53 from rotating.

In some embodiments, the transmission device 5 further includes a driving cam 54, a driven cam 55, and a stopping swing rod 56. The driving cam 54 is connected to the driving gear 51, and the driving cam 54 can rotate along with the driving gear 51. The driven cam 55 is connected to the first driven gear 52, and the driven cam 55 can rotate along with the first driven gear 52.

The stopping swing rod 56 has a first end 561, a second end 562, and a pivoting portion 563. The pivoting portion 563 is located between the first end 561 of the stopping swing rod 56 and the second end 562 of the stopping swing rod 56. The stopping swing rod 56 is swingable around the pivoting portion 563.

Further, when the toothed section 511 of the driving gear 51 meshes with the first driven gear 52, the driving cam 54 drives the second end 562 of the stopping swing rod 56 to engage with the second driven gear 53 so as to stop the second driven gear 53 from rotating, and the driving cam 54 releases the driven cam 55 to allow the first driven gear 52 to rotate.

When the toothed section 511 of the driving gear 51 meshes with the second driven gear 53, the driving cam 54 drives the second end 562 of the stopping swing rod 56 to separate from the second driven gear 53 to allow the second driven gear 53 to rotate, and the driving cam 54 stops the driven cam 55 to stop the first driven gear 52 from rotating.

Specifically, when the driving gear 51 meshes with the first driven gear 52, as shown in FIGS. 35-36, the first end 561 of the stopping swing rod 56 abuts against a distal rest arc segment 542 of the driving cam 54, such that the second end 562 of the stopping swing rod 56 engages with the second driven gear 53 to stop the second driven gear 53 from rotating, and a distal rest arc segment 552 of the driven cam 55 faces a proximal rest arc segment 541 of the driving cam 54.

In other words, when the driving gear 51 meshes with the first driven gear 52, the driving gear 51 drives the first driven gear 52 to rotate, and the driving cam 54 rotates together with the driving gear 51. The proximal rest arc segment 541 of the driving cam 54 faces the driven cam 55 and is spaced apart from the driven cam 55; that is, the driving cam 54 cannot restrain the movement of the driven cam 55, and the driven cam 55 can rotate together with the first driven gear 52. At the same time, the distal rest arc segment 542 of the driving cam 54 faces the first end 561 of the stopping swing rod 56, and the first end 561 of the stopping swing rod 56 abuts against the distal rest arc segment 542 of the driving cam 54. Since the stopping swing rod 56 can swing relative to the pivoting portion 563, the second end 562 of the stopping swing rod 56 approaches the second driven gear 53, and the second end 562 of the stopping swing rod 56 can engage with the second driven gear 53 to stop the second driven gear 53 from rotating.

It can be understood that the stopping swing rod 56 serves as the second stopping member 56, and can stop the second driven gear 53 from rotating when the toothed section 511 of the driving gear 51 meshes with the first driven gear 52 and also can release the second driven gear 53 when the toothed section 511 of the driving gear 51 disengages from the first driven gear 52, so as to enable the driving gear 51 to drive the second driven gear 53 to rotate when the toothed segment 511 of the driving gear 51 meshes with the second driven gear 53 subsequently.

When the toothed section 511 of the driving gear 51 meshes with the second driven gear 53, as shown in FIG. 34, the distal rest arc segment 552 of the driven cam 55 abuts against the distal rest arc segment 542 of the driving cam 54; that is, the distal rest arc segment 542 of the driving cam 54 stops the distal rest arc segment 552 of the driven cam 55, so as to stop the first driven gear 52 from rotating. The first end 561 of the stopping swing rod 56 abuts against the proximal rest arc segment 541 of the driving cam 54 to enable the second end 562 of the stopping swing rod 56 to separate from the second driven gear 53.

In other words, the driving cam 54 includes the proximal rest arc segment 541 and the distal rest arc segment 542. The driven cam 55 includes a proximal rest arc segment 551 and the distal rest arc segment 552. When the driving gear 51 meshes with the second driven gear 53, as shown in FIG. 34, the driving gear 51 drives the second driven gear 53 to rotate, the driving cam 54 rotates together with the driving gear 51, and the distal rest arc segment 542 of the driving cam 54 abuts against the driven cam 55 to stop the driven cam 55 from rotating, so as to stop the first driven gear 52 from rotating. At the same time, the proximal rest arc segment 541 of the driving cam 54 faces the first end 561 of the stopping swing rod 56, and the first end 561 of the stopping swing rod 56 abuts against the proximal rest arc segment 541 of the driving cam 54. Since the stopping swing rod 56 can swing relative to the pivoting portion 563, the second end 562 of the stopping swing rod 56 goes away from the second driven gear 53 to separate from the second driven gear 53.

It can be understood that the driving cam 54 and the driven cam 55 together serve as the first stopping member 501, and can stop the first driven gear 52 from rotating when the toothed section 511 of the driving gear 51 meshes with the second driven gear 53 and also can release the first driven gear 52 when the toothed section 511 of the driving gear 51 disengages from the second driven gear 53, so as to enable the driving gear 51 to drive the first driven gear 52 to rotate when the toothed segment 511 of the driving gear 51 meshes with the first driven gear 52 subsequently.

When the driving gear 51 rotates from the first rotation position towards the second rotation position, as shown in FIG. 34, the toothed section 511 of the driving gear 51 first drives the second driven gear 53 to rotate, the distal rest arc segment 542 of the driving cam 54 abuts against the distal rest arc segment 552 of the driven cam 55 to stop the first driven gear 52 from rotating, and the first end 561 of the stopping swing rod 56 abuts against the proximal rest arc segment 541 of the driving cam 54 to enable the second end 562 of the stopping swing rod 56 to separate from the second driven gear 53. Then, as shown in FIG. 35, the driving gear 51 rotates, such that the toothed section 511 of the driving gear 51 disengages from the second driven gear 53 and meshes with the first driven gear 52. Moreover, the driving cam 54 rotates along with the driving gear 51, such that the proximal rest arc segment 541 of the driving cam 54 faces the driven cam 55 and is spaced apart from the driven cam 55. The proximal rest arc segment 541 of the driving cam 54 cannot restrain the movement of the driven cam 55. The first end of the stopping swing rod 56 abuts against the distal rest arc segment 542 of the driving cam 54, such that the second end 562 of the stopping swing rod 56 engages with the second driven gear 53 to stop the second driven gear 53 from rotating.

In some embodiments, the driving gear 51 is arranged coaxially with the driving cam 54, and the first driven gear 52 is arranged coaxially with the driven cam 55.

In some embodiments, the driving gear 51 is integrally formed with the driving cam 54, and the first driven gear 52 is integrally formed with the driven cam 55. It can be understood that the driving gear 51 and the driving cam 54 may be two components independent of each other, and the first driven gear 52 and the driven cam 55 may be two components independent of each other.

A transmission device according to still other embodiments of the present disclosure will be described below with reference to FIGS. 24-29, FIG. 33 and FIGS. 34-36.

As shown in FIGS. 24-29, a transmission device 5 according to embodiments of the present disclosure includes a driving gear 51, a first driven gear 52, and a second driven gear 53. The driving gear 51 has a toothless section 512 and a toothed section 511. The driving gear 51 has a first rotation position (a position of the driving gear 51 as shown in FIG. 24 and "A" position shown in FIG. 33), a second rotation position (a position of the driving gear as shown in FIG. 26 and "B" position shown in FIG. 33), a third rotation position ("C" position shown in FIG. 33) between the first rotation position (the "A" position shown in FIG. 33) and the second rotation position (the "B" position shown in FIG. 33), and a fourth rotation position ("D" position shown in FIG. 33) between the second rotation position and the third rotation position. The driving gear 51 is reciprocally rotatable between the first rotation position and the second rotation position.

In the first rotation position, as shown in FIG. 24, the toothed section 511 of the driving gear 51 meshes with the second driven gear 53 and the toothless section 512 of the driving gear 51 faces the first driven gear 52. In the second rotation position, as shown in FIG. 26, the toothed section 511 of the driving gear 51 meshes with the first driven gear 52, and the toothless section 512 of the driving gear 51 faces the second driven gear 53.

Before the driving gear 51 rotates from the first rotation position to the third rotation position along a first direction (a counterclockwise direction as shown in FIGS. 24 and 26), the toothed section 511 of the driving gear 51 meshes with the second driven gear 53 and the toothless section 512 of the driving gear 51 faces the first driven gear 52.

When the driving gear 51 rotates to the third rotation position along the first direction, the toothed section 511 of the driving gear 51 starts to mesh with the first driven gear 52. Before the driving gear 51 rotates from the third rotation position to the fourth rotation position along the first direction, the toothed section 511 of the driving gear 51 simultaneously meshes with the second driven gear 53 and the first driven gear 52.

When the driving gear 51 rotates to the fourth rotation position along the first direction, the toothed section 511 of the driving gear 51 starts to disengage from the second driven gear 53.

In a process where the driving gear 51 rotates from the fourth rotation position to the second rotation position along the first direction, the toothed section 511 of the driving gear 51 meshes with the first driven gear 52, and the toothless section 512 of the driving gear 51 faces the second driven gear 53.

In some specific embodiments, as shown in FIGS. 27, 29 and 33, before the driving gear 51 rotates from the second rotation position to the fourth rotation position along a second direction opposite to the first direction (a clockwise direction as shown in FIGS. 27 and 29), the toothed section 511 of the driving gear 51 meshes with the first driven gear 52, and the toothless section 512 of the driving gear 51 faces the second driven gear 53.

When the driving gear 51 rotates to the fourth rotation position along the second direction, the toothed section 511 of the driving gear 51 starts to mesh with the second driven gear 53.

Before the driving gear 51 rotates from the fourth rotation position to the third rotation position along the second direction, the toothed section of the driving gear meshes with the first driven gear and the second driven gear at the same time, to simultaneously drive the locking swing arm 32 to rotate and drive the step 1 to move. When the driving gear 51 rotates to the third rotation position along the second direction, the toothed section 511 of the driving gear 51 starts to disengage from the first driven gear 52.

During the rotation of the driving gear 51 from the third rotation position to the first rotation position along the second direction, the toothed section 511 of the driving gear 51 meshes with the second driven gear 53, and the toothless section of the driving gear 51 faces the first driven gear 52.

It can be understood that, in the embodiment shown in FIG. 33, the meshing between the toothed section 511 of the driving gear 51 and the first driven gear 52 and the meshing between the toothed section 511 of the driving gear 51 and the second driven gear 53 partially overlap; that is, in a certain period of time, the toothed section 511 of the driving gear 51 meshes with both the first driven gear 52 and the second driven gear 53.

In some embodiments, as shown in FIGS. 34-36, the transmission device 5 further includes a first stopping member 501, and the first stopping member 501 stops the first driven gear 52 from rotating when the toothed section 511 of the driving gear 51 meshes with the second driven gear 53, and releases the first driven gear 52 when the toothed section 511 of the driving gear 51 disengages from the second driven gear 53.

In some specific embodiments, the transmission device 5 further includes a second stopping member 56, and the second stopping member 56 stops the second driven gear 53 from rotating when the toothed section 511 of the driving gear 51 meshes with the first driven gear 52, and releases the second driven gear 53 when the toothed section 511 of the driving gear 51 disengages from the first driven gear 52.

In other words, the first stopping member 501 and the second stopping member 56 can realize that the rotation of the first driven gear 52 and the rotation of the second driven gear 53 do not occur simultaneously. When the driving gear 51 drives the first driven gear 52 to rotate, the second stopping member 56 can stop the second driven gear 53 from rotating, so as to avoid the rotation of the second driven gear 53 due to factors such as inertia. When the driving gear 51 drives the second driven gear 53 to rotate, the first stopping member 501 can stop the first driven gear 52 from rotating, so as to avoid the rotation of the first driven gear 52 due to factors such as inertia.

In the position shown in FIG. 34, the first stopping member 501 stops the first driven gear 52 from rotating. In the position shown in FIG. 36 and in the position shown in FIG. 35, the second stopping member 56 stops the second driven gear 53 from rotating.

In some embodiments, the transmission device 5 further includes a driving cam 54, a driven cam 55, and a stopping swing rod 56. The driving cam 54 is connected to the driving gear 51, and the driving cam 54 can rotate along with the driving gear 51. The driven cam 55 is connected to the first driven gear 52, and the driven cam 55 can rotate along with the first driven gear 52.

The stopping swing rod 56 has a first end 561, a second end 562, and a pivoting portion 563. The pivoting portion 563 is located between the first end 561 of the stopping swing rod 56 and the second end 562 of the stopping swing rod 56. The stopping swing rod 56 is swingable around the pivoting portion 563.

Further, when the toothed section 511 of the driving gear 51 meshes with the first driven gear 52, the driving cam 54 drives the second end 562 of the stopping swing rod 56 to engage with the second driven gear 53 so as to stop the second driven gear 53 from rotating, and the driving cam 54 releases the driven cam 55 to allow the first driven gear 52 to rotate.

When the toothed section 511 of the driving gear 51 meshes with the second driven gear 53, the driving cam 54 drives the second end 562 of the stopping swing rod 56 to separate from the second driven gear 53 so as to allow the second driven gear 53 to rotate, and the driving cam 54 stops the driven cam 55 to stop the first driven gear 52 from rotating.

Specifically, when the driving gear 51 meshes with the first driven gear 52, as shown in FIGS. 35-36, the first end 561 of the stopping swing rod 56 abuts against a distal rest arc segment 542 of the driving cam 54, such that the second end 562 of the stopping swing rod 56 engages with the second driven gear 53 to stop the second driven gear 53 from rotating, and a distal rest arc segment 552 of the driven cam 55 faces a proximal rest arc segment 541 of the driving cam 54.

In other words, when the driving gear 51 meshes with the first driven gear 52, the driving gear 51 drives the first driven gear 52 to rotate, and the driving cam 54 rotates together with the driving gear 51. The proximal rest arc segment 541 of the driving cam 54 faces the driven cam 55 and is spaced apart from the driven cam 55; that is, the driving cam 54 cannot restrain the movement of the driven cam 55, and the driven cam 55 can rotate together with the first driven gear 52. At the same time, the distal rest arc segment 542 of the driving cam 54 faces the first end 561 of the stopping swing rod 56, and the first end 561 of the stopping swing rod 56 abuts against the distal rest arc segment 542 of the driving cam 54. Since the stopping swing rod 56 can swing relative to the pivoting portion 563, the second end 562 of the stopping swing rod 56 approaches the second driven gear 53, and the second end 562 of the stopping swing rod 56 can engage with the second driven gear 53 to stop the second driven gear 53 from rotating.

It can be understood that the stopping swing rod 56 serves as the second stopping member 56, and can stop the second driven gear 53 from rotating when the toothed section 511 of the driving gear 51 meshes with the first driven gear 52 and also can release the second driven gear 53 when the toothed section 511 of the driving gear 51 disengages from the first driven gear 52, so as to enable the driving gear 51 to drive the second driven gear 53 to rotate when the toothed segment 511 of the driving gear 51 meshes with the second driven gear 53 subsequently.

When the toothed section 511 of the driving gear 51 meshes with the second driven gear 53, as shown in FIG. 34, the distal rest arc segment 552 of the driven cam 55 abuts against the distal rest arc segment 542 of the driving cam 54; that is, the distal rest arc segment 542 of the driving cam 54 stops the distal rest arc segment 552 of the driven cam 55, so as to stop the first driven gear 52 from rotating. The first end 561 of the stopping swing rod 56 abuts against the proximal rest arc segment 541 of the driving cam 54 to enable the second end 562 of the stopping swing rod 56 to separate from the second driven gear 53.

In other words, the driving cam 54 includes the proximal rest arc segment 541 and the distal rest arc segment 542. The driven cam 55 includes a proximal rest arc segment 551 and the distal rest arc segment 552. When the driving gear 51 meshes with the second driven gear 53, as shown in FIG. 34, the driving gear 51 drives the second driven gear 53 to rotate, the driving cam 54 rotates together with the driving gear 51, and the distal rest arc segment 542 of the driving cam 54 abuts against the driven cam 55 to stop the driven cam 55 from rotating, so as to stop the first driven gear 52 from rotating. At the same time, the proximal rest arc segment 541 of the driving cam 54 faces the first end 561 of the stopping swing rod 56, and the first end 561 of the stopping swing rod 56 abuts against the proximal rest arc segment 541 of the driving cam 54. Since the stopping swing rod 56 can swing relative to the pivoting portion 563, the second end 562 of the stopping swing rod 56 goes away from the second driven gear 53 to separate from the second driven gear 53.

It can be understood that the driving cam 54 and the driven cam 55 together serve as the first stopping member 501, and can stop the first driven gear 52 from rotating when the toothed section 511 of the driving gear 51 meshes with the second driven gear 53 and also can release the first driven gear 52 when the toothed section 511 of the driving gear 51 disengages from the second driven gear 53, so as to enable the driving gear 51 to drive the first driven gear 52 to rotate when the toothed segment 511 of the driving gear 51 meshes with the first driven gear 52 subsequently.

When the driving gear 51 rotates from the first rotation position towards the second rotation position, as shown in FIG. 34, the toothed section 511 of the driving gear 51 first drives the second driven gear 53 to rotate, the distal rest arc segment 542 of the driving cam 54 abuts against the distal rest arc segment 552 of the driven cam 55 to stop the first driven gear 52 from rotating, and the first end 561 of the stopping swing rod 56 abuts against the proximal rest arc segment 541 of the driving cam 54 to enable the second end 562 of the stopping swing rod 56 to separate from the second driven gear 53. Then, as shown in FIG. 35, the driving gear 51 rotates, such that the toothed section 511 of the driving gear 51 disengages from the second driven gear 53 and meshes with the first driven gear 52. Moreover, the driving cam 54 rotates along with the driving gear 51, such that the proximal rest arc segment 541 of the driving cam 54 faces the driven cam 55 and is spaced apart from the driven cam 55. The proximal rest arc segment 541 of the driving cam 54 cannot restrain the movement of the driven cam 55. The first end of the stopping swing rod 56 abuts against the distal rest arc segment 542 of the driving cam 54, such that the second end 562 of the stopping swing rod 56 engages with the second driven gear 53 to stop the second driven gear 53 from rotating.

In some embodiments, the driving gear 51 is arranged coaxially with the driving cam 54, and the first driven gear 52 is arranged coaxially with the driven cam 55.

In some embodiments, the driving gear 51 is integrally formed with the driving cam 54, and the first driven gear 52 is integrally formed with the driven cam 55. It can be understood that the driving gear 51 and the driving cam 54 may be two components independent of each other, and the first driven gear 52 and the driven cam 55 may be two components independent of each other.

A vehicle step apparatus and a vehicle according to some other embodiments of the present disclosure will be described below with reference to FIGS. 1-3 and 13-20.

As shown in FIGS. 1-3 and 13, a vehicle 1000 according to embodiments of the present disclosure includes a vehicle body 200, a step 1, a retractable device 2, a locking seat 31, and a locking swing arm 32.

The retractable device 2 includes a step bracket 22 and an arm assembly 23. The step 1 is mounted on the step bracket 22. The arm assembly 23 is pivotally connected to the vehicle body 200 and the step bracket 22 to drive the step 1 to move between an extended position and a retracted position. In other words, the arm assembly 23 has a first end pivotally connected to a bottom surface 201 of the vehicle body 200, and a second end pivotally connected to the step bracket 22, and the arm assembly 23 is driven by a driving device (such as a motor) to move the step 1 between the extended position and the retracted position.

It can be understood that in this embodiment, the vehicle step apparatus 100 does not include a mounting bracket 21, and the first end of the arm assembly 23 is directly pivotally connected to the bottom surface 201 of the vehicle body 200.

The locking swing arm 32 is swingable between a locking position where the locking swing arm 32 and the locking seat 31 lock the step 1 in the retracted position and a release position where the locking swing arm 32 and the locking seat 31 release the step 1 to enable the step 1 to move from the retracted position towards the extended position.

In some embodiments, the locking swing arm 32 rotates from the locking position to the release position before the step 1 moves away from the retracted position towards the extended position. In other words, before the step 1 needs to move from the retracted position towards the extended position, the locking swing arm 32 first rotates from the locking position to the release position to release the engagement member 4, so that the arm assembly 23 drives the step 1 to move from the retracted position shown in FIG. 18 to the extended position shown in FIG. 16.

In some embodiments, the release position includes a maximum release position and a minimum release position, and the minimum release position is between the locking position and the maximum release position. Specifically, as shown in FIG. 18, the step 1 is in the retracted position, the locking swing arm 32 is in the locking position, and the locking swing arm 32 and the locking seat 31 clamp the engagement member 4 between the locking swing arm 32 and the locking seat 31 to lock the step 1. As shown in FIG. 17, the locking swing arm 32 rotates rightwards from the locking position to the minimum release position, and the engagement member 4 separates from the clamping of the locking swing arm 32 and the locking seat 31; that is, the engagement member 4 is released, and the step 1 moves to an intermediate position between the extended position and the retracted position. Subsequently, as shown in FIG. 16, the locking swing arm 32 continues rotating rightwards from the minimum release position to the maximum release position, and the step 1 moves from the intermediate position to the extended position.

The relationship between the rotation of the locking swing arm 32 and the extension-and-retraction movement of the arm assembly 23 is presented as follows.

In some embodiments, the locking swing arm 32 rotates from the locking position to the minimum release position before the step 1 moves away from the retracted position towards the extended position, and the step 1 is moving from retracted position to the extended position while the locking swing arm is rotating from the minimum release position to the maximum release position.

In some embodiments, the step 1 further has the intermediate position between the retracted position and the extended position. The locking swing arm 32 rotates from the locking position to the minimum release position before the step 1 moves away from the retracted position towards the extended position. While the locking swing arm 32 rotates from the minimum release position to the maximum release position, the step 1 moves from the retracted position to the intermediate position. During the movement of the step 1 from the intermediate position to the extended position, the locking swing arm 32 keeps stationary in the maximum release position.

It can be understood that besides the movements of the locking swing arm 32 and the step 1, the locking swing arm 32 may also first rotate from the locking position to the minimum release position.

Then, the step 1 moves from the retracted position to the intermediate position; that is, the locking swing arm 32 rotates to the minimum release position and stays for a period of time, and during this period of time, the step 1 moves from the retracted position to the intermediate position. At the end of this period of time, the step 1 is in the intermediate position between the extended position and the retracted position, and the locking swing arm 32 is in the minimum release position between the maximum release position and the locking position, for example, as shown in FIG. 17.

Further, the step 1 moves from the intermediate position to the extended position, and the locking swing arm 32 rotates from the minimum release position to the maximum release position. During this process, the movement of the step 1 and the rotation of the locking swing arm 32 can occur simultaneously, or the step 1 can move first and then the locking swing arm 32 rotates, or the locking swing arm 32 can rotate first and then the step 1 moves.

In some embodiments, the step 1 in the retracted position abuts against a lower edge of a lateral surface of the vehicle body 200. For example, the step 1 is oriented in the vertical direction and abuts against the lower edge of the lateral surface of the vehicle body 200, such that the step 1 covers the lower edge of the vehicle body 200. In other embodiments, the step 1 abuts obliquely against a junction between the bottom surface 201 of the vehicle body 200 and the lateral surface of the vehicle body 200. In other words, the step 1 is disposed obliquely with respect to the lateral surface of the vehicle body 200 and abuts against the junction between the bottom surface 201 of the vehicle body and the lateral surface of the vehicle body 200, such that the step 1 can cover an outer edge of the bottom surface 201 of the vehicle body and the lower edge of the lateral surface of the vehicle body 200. Thus, by locking the step 1 in the retracted position through the locking member 3, the step 1 can act as a bumper of the vehicle to play a protective role, so as to protect the vehicle body and prevent the vehicle 1000 from being hit or scratched.

In some embodiments, one of the step 1 and the step bracket 22 has an engagement member 4, and in the retracted position, the locking swing arm 32 and the locking seat 31 clamp the engagement member 4 therebetween to lock the step 1. In other words, the step 1 has the engagement member 4 or the step bracket 22 has the engagement member 4, and when the step 1 moves to the retracted position, the engagement member 4 can be clamped by the locking swing arm 32 and the locking seat 31, thereby realizing the locking of the step 1.

The manner by which the engagement member 4 is connected with the step 1 or the step bracket 22 is not limited in the described embodiments. For example, the engagement member 4 is detachably connected to the step 1 or the step bracket 22, or the engagement member 4 is integrally formed with the step 1 or the step bracket 22. For example, as shown in FIG. 13, the engagement member 4 is coupled to the step 1, and the engagement member 4 is integrally formed with the step 1. When the engagement member 4 is detachably connected to the step 1, the engagement member 4 and the step 1 can be regarded as separate members that are different from each other; when the engagement member 4 is integrally formed with the step 1, the engagement member 4 and the step 1 can be regarded as a whole.

In some specific embodiments, as shown in FIGS. 13-16, the engagement member 4 includes an engagement shaft 41, and in the retracted position, the locking swing arm 32 and the locking seat 31 clamp the engagement shaft 41 therebetween to lock the step 1.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

In some specific embodiments, as shown in FIGS. 13 and 14, the locking seat 31 has a first snap groove 313, and the locking swing arm 32 has a second snap groove 321. In the retracted position, the engagement shaft 41 is locked between the first snap groove 313 and the second snap groove 321, thereby locking the step 1 in the retracted position. In other words, the first snap groove 313 and the second snap groove 321 form a locking groove, and the engagement member 4 is configured to engage in or separate from the locking groove.

As shown in FIG. 18, when the locking swing arm 32 rotates to the locking position, the engagement member 4 is clamped between the second snap groove 321 of the locking swing arm 32 and the first snap groove 313 of the locking seat 31, and since the engagement member 4 is locked between the first snap groove 313 and the second snap groove 321, the step 1 is locked in the retracted position. In a specific example, the engagement member 4 includes an engagement shaft 41, and when the locking swing arm 32 rotates to the locking position, the engagement shaft 41 is clamped between the second snap groove 321 and the first snap groove 313, whereby the step 1 is locked in the retracted position.

In some specific embodiments, the locking seat 31 has an extension arm portion 311, and the first snap groove 313 is provided in a free end 3111 of the extension arm portion 311 (a lower end of the extension arm portion 311 as shown in FIG. 14). The locking swing arm 32 has a pivot end 322 (an upper end of the locking swing arm 32 as shown in FIG. 15) and a free end 323 (a lower end of the locking swing arm 32 as shown in FIG. 15). The pivot end 322 of the locking swing arm 32 is pivotally connected with the locking seat 31, and the second snap groove 321 is provided in the free end 323 of the locking swing arm 32.

As shown in FIGS. 1-3 and 13-20, a vehicle 1000 according to other embodiments of the present disclosure includes a vehicle body 200, a step 1, an arm assembly 23, a locking seat 31, and a locking swing arm 32. The arm assembly 23 is connected to a bottom surface 201 of the vehicle body 200 and the step bracket 22, respectively, so as to drive the step 1 to move between an extended position and a retracted position. In other words, the arm assembly 23 has a first end connected to the bottom surface 201 of the vehicle body 200, and a second end connected to the step bracket 22, so as to drive the step 1 to move between the extended position and the retracted position.

The locking swing arm 32 is swingable between a locking position and a release position, to cooperate with the locking seat 31 to lock the step 1 in the retracted position. It can be understood that in the locking position, the locking swing arm 32 can cooperate with the locking seat 31 to lock the step 1 in the retracted position, and the locking swing arm 32 can also cooperate with the locking seat 31 to release the step 1 so as to allow the step 1 to move from the retracted position towards the extended position.

As shown in FIGS. 13-15, a vehicle step apparatus 100 according to embodiments of the present disclosure includes a step 1, a retractable device 2, a locking seat 31, and a locking swing arm 32. The step 1 is movable between an extended position and a retracted position. The retractable device 2 includes a step bracket 22 and an arm assembly 23, and the step 1 is mounted on the step bracket 22. The arm assembly 23 is pivotally connected to the step bracket 22 and is adapted to be pivotally connected to a bottom surface 201 of the vehicle body 200 of the vehicle 1000, so as to drive the step 1 to move between the extended position and the retracted position.

The locking swing arm 32 is movable between a locking position where the locking swing arm 32 and the locking seat 31 lock the step 1 in the retracted position and a release position where the locking swing arm 32 and the locking seat 31 release the step 1 to enable the step 1 to move from the retracted position towards the extended position.

In some embodiments, one of the step 1 and the step bracket 22 has an engagement member 4, and in the retracted position, the locking swing arm 32 and the locking seat 31 clamp the engagement member 4 therebetween to lock the step 1. In other words, the step 1 has the engagement member 4 or the step bracket 22 has the engagement member 4, and when the step 1 moves to the retracted position, the engagement member 4 can be clamped by the locking swing arm 32 and the locking seat 31, thereby realizing the locking of the step 1.

In some specific embodiments, as shown in FIGS. 13-16, the engagement member 4 includes an engagement shaft 41, and in the retracted position, the locking swing arm 32 and the locking seat 31 clamp the engagement shaft 41 therebetween to lock the step 1.

In some embodiments, the engagement member 4 further includes a first support lug 42 and a second support lug 43 that are spaced apart from each other. The engagement shaft 41 has a first end connected with the first support lug 42 and a second end connected with the second support lug 43. When the engagement member 4 is coupled to the step 1, the first support lug 42 and the second support lug 43 are coupled to the step 1 and spaced apart from each other. When the engagement member 4 is coupled to the step bracket 22, the first support lug 42 and the second support lug 43 are coupled to the step bracket 22 and spaced apart from each other.

In some specific embodiments, as shown in FIGS. 13 and 14, the locking seat 31 has a first snap groove 313, and the locking swing arm 32 has a second snap groove 321. In the retracted position, the engagement shaft 41 is locked between the first snap groove 313 and the second snap groove 321, thereby locking the step 1 in the retracted position.

As shown in FIG. 18, when the locking swing arm 32 rotates to the locking position, the engagement shaft 41 is clamped between the second snap groove 321 of the locking swing arm 32 and the first snap groove 313 of the locking seat 31, and since the engagement shaft 41 is locked between the first snap groove 313 and the second snap groove 321, the step 1 is locked in the retracted position.

In some specific embodiments, the locking seat 31 has an extension arm portion 311, and the first snap groove 313 is provided in a free end 3111 of the extension arm portion 311 (a lower end of the extension arm portion 311 as shown in FIG. 14). The locking swing arm 32 has a pivot end 322 (an upper end of the locking swing arm 32 as shown in FIG. 15) and a free end 323 (a lower end of the locking swing arm 32 as shown in FIG. 15). The pivot end of the locking swing arm 32 is pivotally connected with the locking seat 31, and the second snap groove 321 is provided in the free end 323 of the locking swing arm 32.

In some embodiments, as shown in FIGS. 13-14, the first snap groove 313 and the second snap groove 321 are both substantially V-shaped, but the shapes of the first snap groove 313 and the second snap groove 321 are not limited thereto, as long as the engagement member 4 can be reliably clamped between the first snap groove 313 and the second snap groove 321. In a specific example, the engagement member 4 includes an engagement shaft 41, a portion of an outer peripheral contour of the engagement shaft 41 is matched with an inner peripheral contour of the second snap groove 321, and another portion of the outer peripheral contour of the engagement shaft 41 is matched with an inner peripheral contour of the first snap groove 313, such that the engagement shaft 41 can be better clamped between the first snap groove 313 and the second snap groove 321.

In some embodiments, the engagement shaft 41 has a non-circular cross section, such as a quadrangle, a hexagon or other polygons. FIGS. 13 and 16-18 illustrate the cross section of the engagement shaft 41 is a regular hexagon. It is to be understood that the cross section of the engagement shaft 41 is not limited thereto.

The technical features described in the above specific examples can be implemented in various configurations. Some examples of the configurations are provided below.

In some configurations, a vehicle includes: a vehicle body; a step; a retractable device including a step bracket and an arm assembly, the step being mounted on the step bracket, and the arm assembly being pivotally connected with the vehicle body and the step bracket to drive the step to move between an extended position and a retracted position; and a locking member mounted to the vehicle body, the locking member being configured to engage with or separate from one of the step and the step bracket, wherein in the retracted position, the locking member engages with the one of the step and the step bracket to lock the step in the retracted position, and when the step moves from the retracted position towards the extended position, the locking member separates from the one of the step and the step bracket.

In a further configuration, in the retracted position, the step abuts against a lower edge of a lateral surface of the vehicle body or abuts obliquely against a junction between a bottom surface of the vehicle body and the lateral surface of the vehicle body.

In a further configuration, the one of the step and the step bracket separates from the locking member against a locking force of the locking member, when the step moves from the retracted position towards the extended position.

In a further configuration, the one of the step and the step bracket has an engagement member, and the locking member is configured to engage with or separate from the engagement member.

In a further configuration, the engagement member is detachably mounted to the step or integrally formed with the step.

In a further configuration, the engagement member includes an engagement shaft, the locking member includes a locking seat having a locking groove, and the engagement shaft is configured to engage in or separate from the locking groove.

In a further configuration, the engagement shaft has a non-circular cross section, and a contour of the cross section of the engagement shaft is matched with the locking groove.

In a further configuration, the engagement member further includes a first support lug and a second support lug, the first support lug and the second support lug are coupled to the step and spaced apart from each other, and the engagement shaft has a first end connected to the first support lug and a second end connected to the second support lug.

In a further configuration, the engagement member is configured as an engagement projection, and the engagement projection is detachably mounted to or integrally formed with the one of the step and the step bracket. The locking member includes a locking seat having a locking groove. The engagement projection is configured to engage in or separate from the locking groove.

In some configurations, a vehicle includes: a vehicle body; a step; an arm assembly connected to a bottom surface of the vehicle body and the step, to drive the step to move between an extended position and a retracted position; and a locking member mounted to the vehicle body, the locking member is configured to engage with the step to lock the step in the retracted position and to separate from the step to allow the step to move from the retracted position towards the extended position.

In some configurations, a vehicle includes: a step movable between an extended position and a retracted position; a retractable device configured to drive the step to move between the extended position and the retracted position; and a locking member configured to lock the step in the retracted position and allow the step to move away from the retracted position towards the extended position.

In some configurations, a vehicle step apparatus includes: a step; a retractable device including a step bracket and an arm assembly, the step being mounted on the step bracket, and the arm assembly being pivotally connected to the step bracket and adapted to be pivotally connected to a bottom surface of a vehicle body of a vehicle, to drive the step to move between the extended position and the retracted position; a locking member mounted to the bottom surface of the vehicle body, the locking member being configured to engage with or separate from one of the step and the step bracket, wherein in the retracted position, the locking member engages with the one of the step and the step bracket to lock the step in the retracted position, and when the step moves from the retracted position towards the extended position, the locking member separates from the one of the step and the step bracket.

In a further configuration, in the retracted position, the step abuts against a lower edge of a lateral surface of the vehicle body or abuts obliquely against a junction between a bottom surface of the vehicle body and the lateral surface of the vehicle body.

In a further configuration, the one of the step and the step bracket separates from the locking member against a locking force of the locking member, when the step moves from the retracted position towards the extended position.

In a further configuration, the one of the step and the step bracket has an engagement member, and the locking member is configured to engage with or separate from the engagement member.

In a further configuration, the engagement member is detachably mounted to the step or integrally formed with the step.

In a further configuration, the engagement member includes an engagement shaft, the locking member includes a locking seat having a locking groove, and the engagement shaft is configured to engage in or separate from the locking groove.

In a further configuration, the engagement shaft has a non-circular cross section, and a contour of the cross section of the engagement shaft is matched with the locking groove.

In a further configuration, the engagement member further includes a first support lug and a second support lug, the first support lug and the second support lug are coupled to the step and spaced apart from each other, and the engagement shaft has a first end connected to the first support lug and a second end connected to the second support lug.

In a further configuration, the engagement member is configured as an engagement projection, and the engagement projection is detachably mounted to or integrally formed with the one of the step and the step bracket. The locking member includes a locking seat having a locking groove. The engagement projection is configured to engage in or separate from the locking groove.

In some configurations, a vehicle step apparatus includes: a mounting bracket; a step bracket; a step mounted on the step bracket; an arm assembly pivotally connected to the mounting bracket and the step bracket, to drive the step to move between an extended position and a retracted position; an engagement shaft mounted to the step or the step bracket; a locking seat having a locking groove, the engagement shaft being configured to engage in or separate from the locking groove, wherein in the retracted position, the engagement shaft engages in the locking groove to lock the step in the retracted position, and when the step moves from the retracted position towards the extended position, the engagement shaft separates from the locking groove.

In a further configuration, the engagement shaft has a non-circular cross section, and a contour of the cross section of the engagement shaft is matched with the locking groove.

In a further configuration, the engagement shaft has a regular hexagonal cross section.

In a further configuration, the locking seat has an extension arm portion extending downwards, and the locking groove is provided in a free end surface of the extension arm portion.

In a further configuration, the step is provided with a first support lug and a second support lug, the first support lug and the second support lug are spaced apart from each other, and the engagement shaft has a first end connected to the first support lug and a second end connected to the second support lug.

In a further configuration, the engagement shaft is threadedly mounted to the step bracket.

In a further configuration, the locking seat is connected to or integrally formed with the mounting bracket.

In a further configuration, the step is locked in the retracted position by a clamping force exerted on the engagement shaft by the locking groove, and when the step moves from the retracted position towards the extended position, the engagement shaft separates from the locking groove against the clamping force of the locking groove.

In a further configuration, the arm assembly includes: a first arm having a first end pivotally connected to the mounting bracket, and a second end pivotally connected to the step bracket; and a second arm having a first end pivotally connected to the mounting bracket, and a second end pivotally connected to the step bracket.

In a further configuration, the arm assembly includes: a first arm having a first end pivotally connected to the mounting bracket, and a second end pivotally connected to the step bracket; a second arm having a first end pivotally connected to the mounting bracket; and a third arm having a first end pivotally connected to a second end of the second arm, and a second end pivotally connected to the step bracket.

In a further configuration, the arm assembly includes: a first arm having a first end pivotally connected to the mounting bracket, and a second end pivotally connected to the step bracket; a second arm having a first end pivotally connected to the mounting bracket; a third arm having a first end pivotally connected to a second end of the second arm, and a second end pivotally connected to the step bracket; and a fourth arm having a first end pivotally connected to the first arm, and a second end pivotally connected to at least one of the second arm and the third arm.

In some configurations, a vehicle includes: a vehicle body; and a vehicle step apparatus configured as the vehicle step apparatus in the above configurations, the mounting bracket being mounted to a bottom surface of the vehicle body.

In a further configuration, in the retracted position, the step abuts against a lower edge of a lateral surface of the vehicle body or abuts obliquely against a junction between the bottom surface of the vehicle body and the lateral surface of the vehicle body.

In some configurations, a vehicle step apparatus includes: a step movable between an extended position and a retracted position; a retractable device including a mounting bracket, a step bracket, and an arm assembly, the step being mounted on the step bracket, and the arm assembly being pivotally connected with the mounting bracket and the step bracket to drive the step to move between the extended position and the retracted position; a locking seat; and a locking swing arm, the locking swing arm being swingable between a locking position where the locking swing arm and the locking seat lock the step in the retracted position and a release position where the locking swing arm and the locking seat release the step.

In a further configuration, the locking swing arm rotates from the locking position to the release position before the step moves away from the retracted position towards the extended position.

In a further configuration, the release position includes a maximum release position and a minimum release position, and the minimum release position is between the locking position and the maximum release position.

In a further configuration, the locking swing arm rotates from the locking position to the minimum release position before the step moves away from the retracted position towards the extended position, and the step moves from the retracted position to the extended position while the locking swing arm rotates from the minimum release position to the maximum release position.

In a further configuration, the step further has an intermediate position between the retracted position and the extended position. The locking swing arm rotates from the locking position to the minimum release position before the step moves away from the retracted position towards the extended position. While the locking swing arm rotates from the minimum release position to the maximum release position, the step moves from the retracted position to the intermediate position. During the movement of the step from the intermediate position to the extended position, the locking swing arm keeps stationary in the maximum release position.

In a further configuration, one of the step and the step bracket has an engagement member, and in the retracted position, the locking swing arm and the locking seat clamp the engagement member therebetween to lock the step.

In a further configuration, the engagement member includes an engagement shaft, and in the retracted position, the locking swing arm and the locking seat clamp the engagement shaft therebetween to lock the step.

In a further configuration, the engagement member further includes a first support lug and a second support lug, the first support lug and the second support lug are coupled to the step and spaced apart from each other, and the engagement shaft has a first end connected to the first support lug and a second end connected to the second support lug.

In a further configuration, the locking seat has a first snap groove, and in the retracted position, the engagement shaft is locked between the locking swing arm and the first snap groove.

In a further configuration, the locking swing arm has a second snap groove, and in the retracted position, the engagement shaft is locked between the first snap groove and the second snap groove.

In a further configuration, the locking seat has an extension arm portion, and the first snap groove is provided in a free end of the extension arm portion. The locking swing arm has a pivot end and a free end, the pivot end is pivotally connected with the locking seat, and the second snap groove is provided in the free end of the locking swing arm.

In a further configuration, the first snap groove and the second snap groove are both substantially V-shaped.

In a further configuration, the engagement shaft has a non-circular cross section.

In a further configuration, the engagement member is detachably mounted to or integrally formed with the one of the step and the step bracket.

In a further configuration, the locking seat is detachably mounted to or integrally formed with the mounting bracket.

In some configurations, a vehicle step apparatus includes: a step; an arm assembly configured to drive the step to move between an extended position and a retracted position; a locking seat; a locking swing arm, the locking swing arm being swingable between a locking position where the locking swing arm and the locking seat lock the step in the retracted position and a release position where the locking swing arm and the locking seat release the step to allow the step to move from the retracted position to the extended position.

In a further configuration, the arm assembly and the locking swing arm are driven by a single drive motor. The single drive motor is connected to the arm assembly to drive the arm assembly to move the step between the extended position and the retracted position. The single drive motor is connected to the locking swing arm to drive the locking swing arm to swing between the locking position and the release position.

In a further configuration, the arm assembly is driven by an extension-and-retraction drive motor to move the step between the retracted position and the extended position, and the locking swing arm is driven by a swing drive motor to swing between the locking position and the release position.

In some configurations, a vehicle includes: a vehicle body; and a vehicle step apparatus configured as the vehicle step apparatus in the above configurations, and having a mounting bracket mounted to a bottom surface of the vehicle body.

In some configurations, a vehicle includes: a vehicle body; a step bracket; a step mounted on the step bracket; an arm assembly connected to a bottom surface of the vehicle body and the step bracket, to drive the step to move between an extended position and a retracted position; an engagement shaft coupled to one of the step and the step bracket; a locking seat having a first snap groove and mounted to the bottom surface of the vehicle body; a locking swing arm, the locking swing arm being swingable between a locking position and a release position, and the locking swing arm having a pivot end pivotally connected with the locking seat and a free end provided with a second snap groove, wherein in the locking position, the engagement shaft is clamped between the first snap groove and the second snap groove to lock the step in the retracted position, and in the release position, the engagement shaft separates from the first snap groove and the second snap groove to allow the step to move from the retracted position towards the extended position.

In some configurations, a vehicle includes: a vehicle body; a step; a retractable device including a step bracket and an arm assembly, the step being mounted on the step bracket, and the arm assembly being pivotally connected with a bottom surface of the vehicle body and the step bracket to drive the step to move between an extended position and a retracted position; a locking seat; and a locking swing arm, the locking swing arm being swingable between a locking position where the locking swing arm and the locking seat lock the step in the retracted position and a release position where the locking swing arm and the locking seat release the step.

In a further configuration, the locking swing arm rotates from the locking position to the release position before the step moves away from the retracted position towards the extended position.

In a further configuration, the release position includes a maximum release position and a minimum release position, and the minimum release position being between the locking position and the maximum release position.

In a further configuration, the locking swing arm rotates from the locking position to the minimum release position before the step moves away from the retracted position towards the extended position, and the step moves from the retracted position to the extended position while the locking swing arm rotates from the minimum release position to the maximum release position.

In a further configuration, the step further has an intermediate position between the retracted position and the extended position. The locking swing arm rotates from the locking position to the minimum release position before the step moves away from the retracted position towards the extended position. While the locking swing arm rotates from the minimum release position to the maximum release position, the step moves from the retracted position to the intermediate position. During the movement of the step from the intermediate position to the extended position, the locking swing arm keeps stationary in the maximum release position.

In a further configuration, in the retracted position, the step abuts against a lower edge of a lateral surface of the vehicle body or abuts obliquely against a junction between the bottom surface of the vehicle body and the lateral surface of the vehicle body.

In a further configuration, one of the step and the step bracket has an engagement member, and in the retracted position, the locking swing arm and the locking seat clamp the engagement member therebetween to lock the step.

In a further configuration, the engagement member includes an engagement shaft, and in the retracted position, the locking swing arm and the locking seat clamp the engagement shaft therebetween to lock the step.

In a further configuration, the engagement member further includes a first support lug and a second support lug, the first support lug and the second support lug are coupled to the step and spaced apart from each other, and the engagement shaft has a first end connected to the first support lug and a second end connected to the second support lug.

In a further configuration, the locking seat has a first snap groove, the locking swing arm has a second snap groove, and in the retracted position, the engagement shaft is locked between the first snap groove and the second snap groove.

In a further configuration, the locking seat has an extension arm portion, and the first snap groove is provided in a free end of the extension arm portion. The locking swing arm has a pivot end and a free end, the pivot end is pivotally connected with the locking seat, and the second snap groove is provided in the free end of the locking swing arm.

In a further configuration, the engagement member is detachably mounted to or integrally formed with the one of the step and the step bracket.

In some configurations, a vehicle includes: a vehicle body; a step; an arm assembly pivotally connected to a bottom surface of the vehicle body and the step to drive the step to move between an extended position and a retracted position; a locking seat; and a locking swing arm, the locking swing arm being swingable between a locking position and a release position and configured to cooperate with the locking seat to lock the step in the retracted position.

In some configurations, a vehicle step apparatus includes: a step movable between an extended position and a retracted position; a retractable device including a step bracket and an arm assembly, the step being mounted on the step bracket, and the arm assembly being pivotally connected to the step bracket and adapted to be pivotally connected to a bottom surface of a vehicle body of a vehicle, to drive the step to move between the extended position and the retracted position; a locking seat; a locking swing arm, the locking swing arm being swingable between a locking position where the locking swing arm and the locking seat lock the step in the retracted position and a release position where the locking swing arm and the locking seat release the step.

In a further configuration, one of the step and the step bracket has an engagement member, and in the retracted position, the locking swing arm and the locking seat clamp the engagement member therebetween to lock the step.

In a further configuration, the engagement member includes an engagement shaft, and in the retracted position, the locking swing arm and the locking seat clamp the engagement shaft therebetween to lock the step.

In a further configuration, the engagement member further includes a first support lug and a second support lug, the first support lug and the second support lug are coupled to the step and spaced apart from each other, and the engagement shaft has a first end connected to the first support lug and a second end connected to the second support lug.

In a further configuration, the locking seat has a first snap groove, the locking swing arm has a second snap groove, and in the retracted position, the engagement shaft is locked between the first snap groove and the second snap groove.

In a further configuration, the locking seat has an extension arm portion, and the first snap groove is provided in a free end of the extension arm portion. The locking swing arm has a pivot end and a free end, the pivot end is pivotally connected with the locking seat, and the second snap groove is provided in the free end of the locking swing arm.

In a further configuration, the first snap groove and the second snap groove are both substantially V-shaped, and the engagement shaft has a non-circular cross section.

In some configurations, a vehicle step apparatus includes: a mounting bracket; a step bracket; a step mounted on the step bracket and movable between an extended position and a retracted position; an arm assembly connected to the mounting bracket and the step bracket to drive the step to move between the extended position and the retracted position; an engagement shaft coupled to one of the step and the step bracket; a locking seat having a first snap groove, and connected to or integrally formed with the mounting bracket; a locking swing arm, the locking swing arm being swingable between a locking position and a release position, and the locking swing arm having a pivot end pivotally connected with the locking seat and a free end provided with a second snap groove, wherein in the locking position, the engagement shaft is clamped between the first snap groove and the second snap groove to lock the step in the retracted position, and in the release position, the engagement shaft is configured to separate from the first snap groove and the second snap groove to allow the step to move from the retracted position towards the extended position.

In a further configuration, the engagement shaft has a non-circular cross section, and a contour of the cross section of the engagement shaft is matched with the first snap groove and the second snap groove.

In a further configuration, the step is provided with a first support lug and a second support lug, the first support lug and the second support lug are spaced apart from each other, and the engagement shaft has a first end connected to the first support lug and a second end connected to the second support lug.

In a further configuration, the first support lug and the second support lug are detachably connected to or integrally formed with the step.

In a further configuration, a connecting rod and a drive rod are further provided. The connecting rod has a first end pivotally connected to the locking swing arm, and a second end pivotally connected to a first end of the drive rod. The drive rod has a second end pivotally connected to the locking seat.

In a further configuration, the first end of the drive rod is provided with a U-shaped recess, and the second end of the connecting rod is fitted in the U-shaped recess.

In a further configuration, a middle portion of the locking swing arm is further provided with a through slot, and the first end of the connecting rod is fitted in the through slot.

In a further configuration, the arm assembly and the locking swing arm are driven by a single drive motor. The single drive motor drives the step to move between the extended position and the retracted position through the arm assembly, and the single drive motor drives the locking swing arm to swing between the locking position and the release position through the drive rod and the connecting rod.

In a further configuration, the vehicle step apparatus further includes a transmission device, and the transmission device includes: a driving gear, the drive motor being connected with the driving gear to drive the driving gear to rotate, and the driving gear having a toothless section and a toothed section; a first driven gear connected to the arm assembly to drive the arm assembly to move the step between the extended position and the retracted position; and a second driven gear connected to the locking swing arm to drive the locking swing arm to swing between the locking position and the release position, wherein the toothed section of the driving gear alternately meshes with the first driven gear and the second driven gear to alternately drive the first driven gear and the second driven gear to rotate.

In a further configuration, the vehicle step apparatus further includes a transmission device, and the transmission device includes: a driving gear, the drive motor being connected with the driving gear to drive the driving gear to rotate, the driving gear having a toothless section and a toothed section, wherein the driving gear has a first rotation position, a second rotation position, and a third rotation position between the first rotation position and the second rotation position, and the driving gear is reciprocally rotatable between the first rotation position and the second rotation position; a first driven gear connected to the arm assembly to drive the arm assembly to move the step between the extended position and the retracted position; and a second driven gear connected to the locking swing arm to drive the locking swing arm to swing between the locking position and the release position, wherein in the first rotation position, the toothed section of the driving gear meshes with the second driven gear and the toothless section of the driving gear faces the first driven gear, and in the second rotation position, the toothed section of the driving gear simultaneously meshes with the first driven gear and the second driven gear, wherein before the driving gear rotates from the first rotation position to the third rotation position along a first direction, the toothed section of the driving gear meshes with the second driven gear and the toothless section of the driving gear faces the first driven gear, wherein when the driving gear rotates to the third rotation position along the first direction, the toothed section of the driving gear starts to mesh with the first driven gear, wherein during rotation of the driving gear from the third rotation position to the second rotation position along the first direction, the toothed section of the driving gear simultaneously meshes with the second driven gear and the first driven gear.

In a further configuration, the vehicle step apparatus further includes a transmission device, and the transmission device includes: a driving gear, the drive motor being connected with the driving gear to drive the driving gear to rotate, the driving gear having a toothless section and a toothed section, wherein the driving gear has a first rotation position, a second rotation position, a third rotation position between the first rotation position and the second rotation position, and a fourth rotation position between the third rotation position and the second rotation position, and the driving gear is reciprocally rotatable between the first rotation position and the second rotation position; a first driven gear connected to the arm assembly to drive the arm assembly to move the step between the extended position and the retracted position; and a second driven gear connected to the locking swing arm to drive the locking swing arm to swing between the locking position and the release position, wherein in the first rotation position, the toothed section of the driving gear meshes with the second driven gear and the toothless section of the driving gear faces the first driven gear, and in the second rotation position, the toothed section of the driving gear meshes with the first driven gear and the toothless section of the driving gear faces the second driven gear, wherein before the driving gear rotates from the first rotation position to the third rotation position along a first direction, the toothed section of the driving gear meshes with the second driven gear and the toothless section of the driving gear faces the first driven gear, wherein when the driving gear rotates to the third rotation position along the first direction, the toothed section of the driving gear starts to mesh with the first driven gear, wherein before the driving gear rotates from the third rotation position to the fourth rotation position along the first direction, the toothed section of the driving gear simultaneously meshes with the second driven gear and the first driven gear, wherein when the driving gear rotates to the fourth rotation position along the first direction, the toothed section of the driving gear starts to disengage from the second driven gear, wherein during rotation of the driving gear from the fourth rotation position to the second rotation position along the first direction, the toothed section of the driving gear meshes with the first driven gear and the toothless section of the driving gear faces the second driven gear.

In a further configuration, the vehicle step apparatus further includes: a driving cam connected to the driving gear; a driven cam connected to the first driven gear; and a stopping swing rod having a first end, a second end, and a pivoting portion between the first end and the second end, the stopping swing rod being swingable around the pivoting portion, wherein when the toothed section of the driving gear meshes with the first driven gear, the driving cam drives the second end of the stopping swing rod to engage with the second driven gear to stop the second driven gear from rotating, and the driving cam releases the driven cam to allow the first driven gear to rotate, wherein when the toothed section of the driving gear meshes with the second driven gear, the driving cam drives the second end of the stopping swing rod to separate from the second driven gear to allow the second driven gear to rotate, and the driving cam stops the driven cam to stop the first driven gear from rotating.

In a further configuration, when the toothed section of the driving gear meshes with the first driven gear, the first end of the stopping swing rod abuts against a distal rest arc segment of the driving cam, and a distal rest arc segment of the driven cam faces a proximal rest arc segment of the driving cam; when the toothed section of the driving gear meshes with the second driven gear, the distal rest arc segment of the driving cam stops the distal rest arc segment of the driven cam, and the first end of the stopping swing rod abuts against the proximal rest arc segment of the driving cam.

In a further configuration, the driving gear is integrally formed with the driving cam, and the first driven gear is integrally formed with the driven cam.

In a further configuration, the transmission device further includes: a driving gear shaft mounted to the locking seat and connected with the drive motor, the driving gear being mounted to the driving gear shaft; a first driven gear shaft having a first end connected to the arm assembly, the first driven gear being mounted to a second end of the first driven gear shaft; and a second driven gear shaft having a first end connected to the drive rod, the second driven gear being mounted to a second end of the second driven gear shaft.

In a further configuration, the locking swing arm is driven by a swing drive motor, and the arm assembly is driven by an extension-and-retraction drive motor. The swing drive motor drives the locking swing arm to swing between the locking position and the release position by means of the drive rod and the connecting rod. The extension-and-retraction drive motor drives the step to move between the extended position and the retracted position by means of the arm assembly.

In some configurations, a vehicle step apparatus includes: a step movable between an extended position and a retracted position; a retractable device including a mounting bracket, a step bracket, and an arm assembly, the step being mounted on the step bracket, and the arm assembly being pivotally connected with the mounting bracket and the step bracket to drive the step to move between the extended position and the retracted position; a locking seat; a swing arm assembly including a locking swing arm, a connecting rod, and a drive rod, wherein the connecting rod has a first end pivotally connected to the locking swing arm, and a second end pivotally connected to a first end of the drive rod; the drive rod has a second end pivotally connected to the locking seat; the drive rod drives, through the connecting rod, the locking swing arm to swing between a locking position where the locking swing arm and the locking seat lock the step in the retracted position and a release position where the locking swing arm and the locking seat release the step; a transmission device including a driving gear, a first driven gear, and a second driven gear, the first driven gear being configured to be driven by the driving gear and being connected to the arm assembly, and the second driven gear being configured to be driven by the driving gear and being connected to the drive rod; a single drive motor configured to drive the arm assembly by the driving gear and the first driven gear and to drive the drive rod by the driving gear and the second driven gear.

In a further configuration, the locking swing arm rotates from the locking position to the release position before the step moves away from the retracted position towards the extended position.

In a further configuration, the release position includes a maximum release position and a minimum release position, and the minimum release position is between the locking position and the maximum release position. The locking swing arm rotates from the locking position to the minimum release position before the step moves away from the retracted position towards the extended position. The step moves from the retracted position to the extended position while the locking swing arm rotates from the minimum release position to the maximum release position.

In a further configuration, the release position includes a maximum release position and a minimum release position, and the minimum release position is between the locking position and the maximum release position. The step further has an intermediate position between the retracted position and the extended position. The locking swing arm rotates from the locking position to the minimum release position before the step moves away from the retracted position towards the extended position. While the locking swing arm rotates from the minimum release position to the maximum release position, the step moves from the retracted position to the intermediate position. During the movement of the step from the intermediate position to the extended position, the locking swing arm keeps stationary in the maximum release position.

In some configurations, a vehicle step apparatus includes: a step; an arm assembly configured to drive the step to move between an extended position and a retracted position; a locking seat; a locking swing arm, the locking swing arm being swingable between a locking position where the locking swing arm and the locking seat lock the step in the retracted position and a release position where the locking swing arm and the locking seat release the step to allow the step to move from the retracted position to the extended position; a connecting rod having a first end pivotally connected to the locking swing arm; a drive rod having a first end pivotally connected to a second end of the connecting rod and a second end pivotally connected to the locking seat, and configured to drive the locking swing arm to swing by means of the connecting rod; a transmission device including a driving gear, a first driven gear, and a second driven gear, the first driven gear being configured to be driven by the driving gear and being connected to the arm assembly, and the second driven gear being configured to be driven by the driving gear and being connected to the drive rod; and a single drive motor configured to drive the arm assembly by the driving gear and the first driven gear and to drive the drive rod by the driving gear and the second driven gear.

In a further configuration, the driving gear has a toothless section and a toothed section. The toothed section of the driving gear alternately meshes with the first driven gear and the second driven gear to alternately drive the first driven gear and the second driven gear to rotate.

In a further configuration, the driving gear has a toothless section and a toothed section, the driving gear has a first rotation position, a second rotation position, and a third rotation position between the first rotation position and the second rotation position, and the driving gear is reciprocally rotatable between the first rotation position and the second rotation position, wherein in the first rotation position, the toothed section of the driving gear meshes with the second driven gear and the toothless section of the driving gear faces the first driven gear, and in the second rotation position, the toothed section of the driving gear simultaneously meshes with the first driven gear and the second driven gear, wherein before the driving gear rotates from the first rotation position to the third rotation position along a first direction, the toothed section of the driving gear meshes with the second driven gear and the toothless section of the driving gear faces the first driven gear, wherein when the driving gear rotates to the third rotation position along the first direction, the toothed section of the driving gear starts to mesh with the first driven gear, wherein during rotation of the driving gear from the third rotation position to the second rotation position along the first direction, the toothed section of the driving gear simultaneously meshes with the second driven gear and the first driven gear.

In a further configuration, the driving gear has a toothless section and a toothed section, the driving gear has a first rotation position, a second rotation position, a third rotation position between the first rotation position and the second rotation position, and a fourth rotation position between the third rotation position and the second rotation position, and the driving gear is reciprocally rotatable between the first rotation position and the second rotation position, wherein in the first rotation position, the toothed section of the driving gear meshes with the second driven gear and the toothless section of the driving gear faces the first driven gear, and in the second rotation position, the toothed section of the driving gear meshes with the first driven gear and the toothless section of the driving gear faces the second driven gear, wherein before the driving gear rotates from the first rotation position to the third rotation position along a first direction, the toothed section of the driving gear meshes with the second driven gear and the toothless section of the driving gear faces the first driven gear, wherein when the driving gear rotates to the third rotation position along the first direction, the toothed section of the driving gear starts to mesh with the first driven gear, wherein before the driving gear rotates from the third rotation position to the fourth rotation position along the first direction, the toothed section of the driving gear simultaneously meshes with the second driven gear and the first driven gear, wherein when the driving gear rotates to the fourth rotation position along the first direction, the toothed section of the driving gear starts to disengage from the second driven gear, wherein during rotation of the driving gear from the fourth rotation position to the second rotation position along the first direction, the toothed section of the driving gear meshes with the first driven gear and the toothless section of the driving gear faces the second driven gear.

In a further configuration, the vehicle step apparatus further includes: a driving cam connected to the driving gear; a driven cam connected to the first driven gear; and a stopping swing rod having a first end, a second end, and a pivoting portion between the first end and the second end, the stopping swing rod being swingable around the pivoting portion, wherein when the toothed section of the driving gear meshes with the first driven gear, the driving cam drives the second end of the stopping swing rod to engage with the second driven gear to stop the second driven gear from rotating, and the driving cam releases the driven cam to allow the first driven gear to rotate, wherein when the toothed section of the driving gear meshes with the second driven gear, the driving cam drives the second end of the stopping swing rod to separate from the second driven gear to allow the second driven gear to rotate, and the driving cam stops the driven cam to stop the first driven gear from rotating.

In a further configuration, when the toothed section of the driving gear meshes with the first driven gear, the first end of the stopping swing rod abuts against a distal rest arc segment of the driving cam, and a distal rest arc segment of the driven cam faces a proximal rest arc segment of the driving cam; when the toothed section of the driving gear meshes with the second driven gear, the distal rest arc segment of the driving cam stops the distal rest arc segment of the driven cam, and the first end of the stopping swing rod abuts against the proximal rest arc segment of the driving cam.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Additionally, different embodiments or examples as well as features in different embodiments or examples described in the present disclosure can be combined by those skilled in the art without any contradiction.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections or mutual communication; may also be direct connections or indirect connections via intervening structures; may also be inner communications of two elements or mutual interaction of two elements, which could be understood by those skilled in the art according to specific situations.

Although embodiments have been shown and described, it would be appreciated by those skilled in the art that the above embodiments are explanatory and cannot be construed to limit the present disclosure, and changes, modifications, options, and variations can be made in the above embodiments without departing from the scope of the present disclosure.

It is intended that the specification, together with the drawings, be considered exemplary only, where exemplary means an example. As used herein, the singular forms "a," "an," and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A vehicle step apparatus, comprising:
a step movable between an extended position and a retracted position;
a retractable device connected to the step and configured to drive the step to move between the extended position and the retracted position; and
a locking member configured to lock the step in the retracted position or to allow the step to move away from the retracted position towards the extended position,
wherein the retractable device comprises a mounting bracket, a step bracket, and an arm assembly, the step is mounted on the step bracket, and the arm assembly is pivotally connected with the mounting bracket and the step bracket to drive the step to move between the extended position and the retracted position,
wherein the locking member is configured to engage with or separate from one of the step or the step bracket, wherein in the retracted position, the locking member engages with the one of the step or the step bracket to lock the step in the retracted position,
wherein the one of the step or the step bracket has an engagement member, and the locking member is configured to engage with or separate from the engagement member,
wherein the engagement member comprises an engagement shaft, the locking member comprises a locking seat having a locking groove, and the engagement shaft is configured to engage in or separate from the locking groove,
wherein the engagement member further comprises a first support lug and a second support lug, the first support lug and the second support lug are coupled to the step and spaced apart from each other, and the engagement shaft has a first end connected to the first support lug and a second end connected to the second support lug.

2. The vehicle step apparatus according to claim 1,
wherein when the step moves from the retracted position towards the extended position, the one of the step or the step bracket separates from the locking member against a locking force of the locking member.

3. The vehicle step apparatus according to claim 1,
wherein the engagement member is detachably mounted to the one of the step and the step bracket, or is integrally formed with the one of the step and the step bracket.

4. The vehicle step apparatus according to claim 1,
wherein the locking seat is connected to the mounting bracket or is integrally formed with the mounting bracket.

5. The vehicle step apparatus according to claim 1,
wherein the locking member is configured to engage with the step to lock the step in the retracted position or to separate from the step to allow the step to move from the retracted position towards the extended position.

6. A vehicle step apparatus, comprising:
a step movable between an extended position and a retracted position;
a retractable device connected to the step and configured to drive the step to move between the extended position and the retracted position; and
a locking member configured to lock the step in the retracted position or to allow the step to move away from the retracted position towards the extended position,
wherein the retractable device comprises a mounting bracket, a step bracket, and an arm assembly, the step is mounted on the step bracket, and the arm assembly is pivotally connected with the mounting bracket and the step bracket to drive the step to move between the extended position and the retracted position,
wherein the locking member is configured to engage with or separate from one of the step or the step bracket, wherein in the retracted position, the locking member engages with the one of the step or the step bracket to lock the step in the retracted position,
wherein the one of the step or the step bracket has an engagement member, and the locking member is configured to engage with or separate from the engagement member,
wherein the engagement member comprises an engagement shaft, the locking member comprises a locking seat having a locking groove, and the engagement shaft is configured to engage in or separate from the locking groove,
wherein a cross section of the engagement shaft is non-circular and has a contour that is matched with the locking groove.

7. The vehicle step apparatus according to claim 6,
wherein when the step moves from the retracted position towards the extended position, the one of the step or the step bracket separates from the locking member against a locking force of the locking member.

8. The vehicle step apparatus according to claim 6,
wherein the engagement member is detachably mounted to the one of the step and the step bracket, or is integrally formed with the one of the step and the step bracket.

9. The vehicle step apparatus according to claim 6,
wherein the engagement member further comprises a first support lug and a second support lug, the first support lug and the second support lug are coupled to the step and spaced apart from each other, and the engagement shaft has a first end connected to the first support lug and a second end connected to the second support lug.

10. The vehicle step apparatus according to claim 6,
wherein the locking seat is connected to the mounting bracket or is integrally formed with the mounting bracket.

11. The vehicle step apparatus according to claim 6,
wherein the locking member is configured to engage with the step to lock the step in the retracted position or to separate from the step to allow the step to move from the retracted position towards the extended position.

12. A vehicle step apparatus, comprising:
a step movable between an extended position and a retracted position;
a retractable device connected to the step and configured to drive the step to move between the extended position and the retracted position; and
a locking member configured to lock the step in the retracted position or to allow the step to move away from the retracted position towards the extended position,
wherein the retractable device comprises a mounting bracket, a step bracket, and an arm assembly, the step is mounted on the step bracket, and the arm assembly is pivotally connected with the mounting bracket and the step bracket to drive the step to move between the extended position and the retracted position,
wherein the locking member is configured to engage with or separate from one of the step or the step bracket, wherein in the retracted position, the locking member engages with the one of the step or the step bracket to lock the step in the retracted position,
wherein the one of the step or the step bracket has an engagement member, and the locking member is configured to engage with or separate from the engagement member,
wherein the engagement member is configured as an engagement projection, the locking member comprises a locking seat having a locking groove, and the engagement projection is configured to engage in or separate from the locking groove.

13. The vehicle step apparatus according to claim 12, wherein when the step moves from the retracted position towards the extended position, the one of the step or the step bracket separates from the locking member against a locking force of the locking member.

14. The vehicle step apparatus according to claim 12, wherein the locking seat is connected to the mounting bracket or is integrally formed with the mounting bracket.

15. The vehicle step apparatus according to claim 12, wherein the engagement projection is detachably mounted to the one of the step or the step bracket or is integrally formed with the one of the step or the step bracket.

16. The vehicle step apparatus according to claim 12, wherein the locking member is configured to engage with the step to lock the step in the retracted position or to separate from the step to allow the step to move from the retracted position towards the extended position.

17. The vehicle step apparatus according to claim 16, wherein when the step moves from the retracted position towards the extended position, the step separates from the locking member against a locking force of the locking member.

18. A vehicle, comprising:
a vehicle body; and
a vehicle step apparatus, the vehicle step apparatus comprising:
 a step movable between an extended position and a retracted position;
 a retractable device connected to the step and configured to drive the step to move between the extended position and the retracted position; and
 a locking member configured to lock the step in the retracted position or to allow the step to move away from the retracted position towards the extended position,
wherein in the retracted position, the step abuts against a lower edge of a lateral surface of the vehicle body or abuts obliquely against a junction between a bottom surface of the vehicle body and the lateral surface of the vehicle body.

19. The vehicle according to claim 18, wherein the retractable device comprises a mounting bracket, a step bracket, and an arm assembly, the mounting bracket is mounted to a bottom surface of the vehicle body, the step is mounted on the step bracket, and the arm assembly is pivotally connected with the mounting bracket and the step bracket to drive the step to move between the extended position and the retracted position, the locking member is configured to engage with or separate from one of the step and the step bracket, wherein in the retracted position, the locking member engages with the one of the step and the step bracket to lock the step in the retracted position.

20. The vehicle according to claim 19, wherein when the step moves from the retracted position towards the extended position, the one of the step and the step bracket separates from the locking member against a locking force of the locking member.

21. The vehicle according to claim 19, wherein the one of the step and the step bracket has an engagement member, and the locking member is configured to engage with or separate from the engagement member.

22. The vehicle according to claim 21, wherein the engagement member comprises an engagement shaft, the locking member comprises a locking seat having a locking groove, and the engagement shaft is configured to engage in or separate from the locking groove.

23. The vehicle according to claim 22, wherein the engagement member further comprises a first support lug and a second support lug, the first support lug and the second support lug are coupled to the step and spaced apart from each other, and the engagement shaft has a first end connected to the first support lug and a second end connected to the second support lug.

* * * * *